United States Patent
Sakumoto

(10) Patent No.: US 9,490,978 B2
(45) Date of Patent: Nov. 8, 2016

(54) INFORMATION PROCESSING APPARATUS AND INFORMATION PROCESSING METHOD

(75) Inventor: Koichi Sakumoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 11 days.

(21) Appl. No.: 14/237,030

(22) PCT Filed: Jun. 26, 2012

(86) PCT No.: PCT/JP2012/066232
§ 371 (c)(1),
(2), (4) Date: Feb. 4, 2014

(87) PCT Pub. No.: WO2013/024630
PCT Pub. Date: Feb. 21, 2013

(65) Prior Publication Data
US 2014/0205088 A1    Jul. 24, 2014

(30) Foreign Application Priority Data
Aug. 12, 2011    (JP) .................. 2011-177332

(51) Int. Cl.
*H04L 29/06* (2006.01)
*H04L 9/30* (2006.01)
*H04L 9/32* (2006.01)

(52) U.S. Cl.
CPC ............ *H04L 9/30* (2013.01); *H04L 9/3093* (2013.01); *H04L 9/3221* (2013.01)

(58) Field of Classification Search
CPC ..... H04L 9/30; H04L 9/3093; H04L 9/3221; H04L 63/08
USPC ............................................ 380/28, 30, 268
See application file for complete search history.

(56) References Cited

U.S. PATENT DOCUMENTS

| 4,969,189 A | 11/1990 | Ohta et al. |
| 5,263,085 A | 11/1993 | Shamir |

(Continued)

FOREIGN PATENT DOCUMENTS

JP    2-266464 A    10/1990

OTHER PUBLICATIONS

Jacques Patarin, et al., "Quartz, 128-Bit Long Digital Signatures", http://www.minrank.org/quartz/, CT-RSA 2001, LNCS 2020, (2001) pp. 282-297.

(Continued)

*Primary Examiner* — Sarah Su
(74) *Attorney, Agent, or Firm* — Oblon, McClelland, Maier & Neustadt, L.L.P.

(57) ABSTRACT

Provided is an information processing apparatus including a message generating unit that generates a message based on a multi-order multivariate polynomial set $F=(f_1, \ldots, f_m)$ defined on a ring K and a vector s that is an element of a set $K^n$, a message providing unit that provides the message to a verifier holding the multi-order multivariate polynomial set F and a vector $y=(y_1, \ldots, y_m)=(f_1(s), \ldots, f_m(s))$, and a response providing unit that provides the verifier with response information corresponding to a verification pattern selected by the verifier from among k (where k≥3) verification patterns. The vector s is a secret key. The multi-order multivariate polynomial set F and the vector y are public keys. The message is information obtained by performing an operation prepared for a verification pattern corresponding to the response information in advance using the public keys and the response information.

20 Claims, 39 Drawing Sheets

(56) References Cited

U.S. PATENT DOCUMENTS

| | | | |
|---|---|---|---|
| 8,522,033 B2* | 8/2013 | Sakumoto et al. | 713/176 |
| 8,832,438 B2* | 9/2014 | Akiyama et al. | 713/168 |
| 8,959,355 B2* | 2/2015 | Sakumoto et al. | 713/176 |
| 2002/0095581 A1* | 7/2002 | Imai et al. | 713/180 |
| 2008/0013716 A1* | 1/2008 | Ding | 380/30 |
| 2013/0042116 A1* | 2/2013 | Sakumoto | 713/176 |
| 2014/0075199 A1* | 3/2014 | Hiwatari et al. | 713/176 |
| 2014/0075201 A1* | 3/2014 | Hiwatari et al. | 713/176 |
| 2014/0122899 A1* | 5/2014 | Hiwatari et al. | 713/189 |
| 2014/0211940 A1* | 7/2014 | Sakumoto et al. | 380/46 |
| 2014/0215222 A1* | 7/2014 | Sakumoto et al. | 713/176 |
| 2014/0223193 A1* | 8/2014 | Sakumoto et al. | 713/189 |
| 2015/0010144 A1* | 1/2015 | Sakumoto et al. | 380/30 |

OTHER PUBLICATIONS

Jacques Patarin, "Asymmetric Cryptography with a Hidden Monomial and a candidate algorithm for ≈64 bits asymmetric signatures", CP8 TRANSAC, Springer-Verlag, (1998), pp. 45-60.

Koichi Sakumoto, et al. "Public-Key Identification Schemes Based on Multivariate Quadratic Polynomials", Advances in Cryptology-CRYPTO 2011 31$^{st}$ Annual Cryptology Conference, Aug. 14-18, 2011, Proceedings (LNCS 6841), Aug. 6, 2011, vol. 6841, pp. 706-723.

Shigeo Tsujii et al., "3. Public Key Cryptosystem", Ango to Joho Security, 1$^{st}$ Edition, Shokodo Co., Ltd., Mar. 29, 1990, pp. 57-59 with English language translation.

International Search Report issued Jul. 31, 2012 in PCT/JP2012/066232.

U.S. Appl. No. 14/131,554, filed Jan. 8, 2014, Sakumoto.
U.S. Appl. No. 14/236,959, filed Feb. 4, 2014, Sakumoto.
U.S. Appl. No. 14/237,010, filed Feb. 4, 2014, Sakumoto.
U.S. Appl. No. 14/236,703, filed Feb. 3, 2014, Sakumoto.
U.S. Appl. No. 14/235,240, filed Jan. 27, 2014, Sakumoto.
U.S. Appl. No. 14/239,931, filed Feb. 20, 2014, Hiwatari, et al.
U.S. Appl. No. 14/237,460, filed Feb. 6, 2014, Hiwatari, et al.
U.S. Appl. No. 14/239,926, filed Feb. 20, 2014, Sakumoto, et al.
U.S. Appl. No. 14/370,817, filed Jul. 7, 2014, Sakumoto, et al.

Office Action issued Apr. 7, 2015 in Japanese Patent Application No. 2011-177332 (with English language translation).

Extended European Search Report issued on Aug. 7, 2015 in European Application No. 12824020.7.

* cited by examiner

PUBLIC-KEY AUTHENTICATION SCHEME

DIGITAL SIGNATURE SCHEME

STREAMLINING OF DIGITAL SIGNATURE SCHEME
(3-PASS)

FIG. 39

CHART: EFFICIENCY COMPARISON OF 3-PASS AND 5-PASS

| | 3-PASS | 5-PASS | | | | |
|---|---|---|---|---|---|---|
| ELEMENT NUMBER q OF RING | — | $q = 2^4$ | $q = 2^5$ | $q = 2^6$ | $q = 2^7$ | $q = 2^8$ |
| PROBABILITY OF SUCCESSFUL FORGERY OF ONE TIME | 0.667 | 0.531 | 0.516 | 0.508 | 0.504 | 0.502 |
| NUMBER OF REPETITIONS NECESSARY FOR n-BIT SECURITY | $1.710n$ | $1.096n$ | $1.046n$ | $1.023n$ | $1.011n$ | $1.006n$ |
| NUMBER OF REPETITIONS NECESSARY FOR 80-BIT SECURITY | 137 | 88 | 84 | 82 | 81 | 81 |
| NUMBER OF REPETITIONS NECESSARY FOR 128-BIT SECURITY | 219 | 141 | 134 | 131 | 130 | 129 |

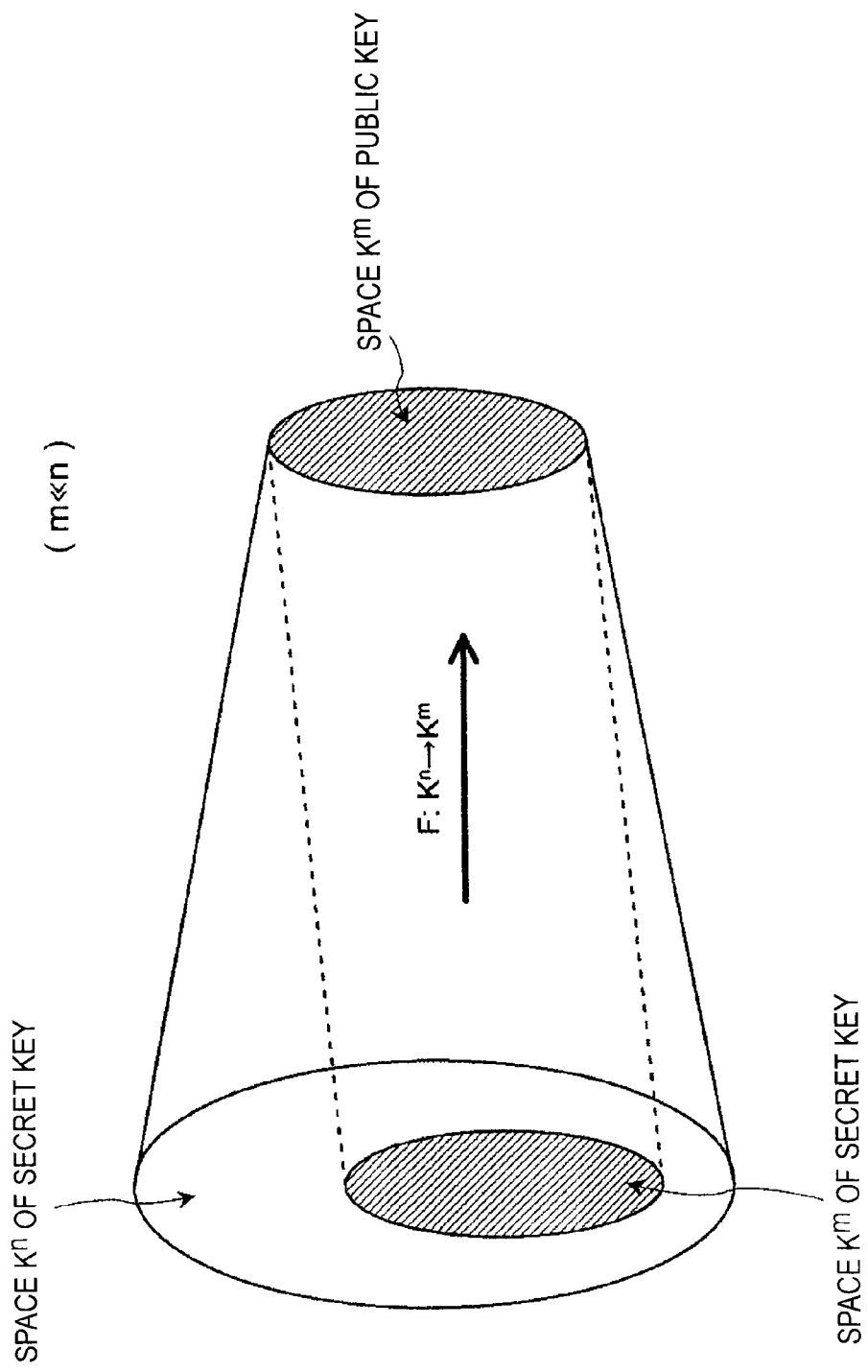

INFORMATION PROCESSING APPARATUS AND INFORMATION PROCESSING METHOD

TECHNICAL FIELD

The present technology relates to an information processing apparatus and an information processing method.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in the following non-patent literatures 1 and 2.

CITATION LIST

Non-Patent Literature

Non-Patent Literature 1: Jacques Patarin, Asymmetric Cryptography with a Hidden Monomial, CRYPTO 1996, pp. 45-60.

Non-Patent Literature 2: Patarin, J., Courtois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag, pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n) = y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n))) = y'$ related to $x_1, \ldots, x_n$. On the other hand, the equation $B(F(A(x_1, \ldots, x_n))) = y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n))) = y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n))) = y$ of a combined form of three functions (trapdoors) B, F, and A that can be relatively easily solved has been used, and thus it is difficult to ensure sufficient security.

It is desirable to provide an information processing apparatus and an information processing method, which are novel and improved and capable of realizing a public-key authentication scheme or a digital signature scheme with high security using a multi-order multivariate simultaneous equation for which an efficient solving means (trapdoor) is not known.

Solution to Problem

According to an aspect of the present technology, there is provided an information processing apparatus including a message generating unit that generates a message based on a multi-order multivariate polynomial set $F=(f_1, \ldots, f_m)$ defined on a ring K and a vector s that is an element of a set $K^n$, a message providing unit that provides the message to a verifier holding the multi-order multivariate polynomial set F and a vector $y=(y_1, \ldots, y_m)=(f_1(s), \ldots, f_m(s))$, and a response providing unit that provides the verifier with response information corresponding to a verification pattern selected by the verifier from among k (where k≥3) verification patterns. The vector s is a secret key. The multi-order multivariate polynomial set F and the vector y are public keys. The message is information obtained by performing an operation prepared for a verification pattern corresponding to the response information in advance using the public keys and the response information. The multi-order multivariate polynomial set F is generated using information differing according to a user.

According to another aspect of the present technology, there is provided an information processing apparatus including an information holding unit that holds a multi-order multivariate polynomial set $F=(f_1, \ldots, f_m)$ defined on a ring K and a vector $y=(y_1, \ldots, y_m)=(f_1(s), \ldots, f_m(s))$, a message acquiring unit that acquires a message generated based on the multi-order multivariate polynomial set F and a vector s that is an element of a set $K^n$, a pattern information providing unit that provides a prover that has provided the message with information on a single verification pattern randomly selected from among k (where k≥3) verification patterns, a response acquiring unit that acquires response information corresponding to the selected verification pattern from the prover, and a verifying unit that verifies whether the prover holds the vector s based on the message, the multi-order multivariate polynomial set F, the vector y, and the response information. The vector s is a secret key. The multi-order multivariate polynomial set F and the vector y are public keys. The message is information obtained by performing an operation prepared for a verification pattern corresponding to the response information in advance using the public keys and the response information. The multi-order multivariate polynomial set F is generated using information differing according to a user.

According to another aspect of the present technology, there is provided an information processing apparatus including a message generating unit that generates a message based on a multi-order multivariate polynomial set $F=(f_1, \ldots, f_m)$ defined on a ring K and a vector s that is an element of a set $K^n$, a message providing unit that provides the message to a verifier holding the multi-order multivariate polynomial set F and a vector $y=(y_1, \ldots, y_m)=(f_1(s), \ldots, f_m(s))$, and an interim information generating unit that generates third information using first information randomly selected by the verifier and second information obtained when the message is generated, an interim information providing unit that provides the verifier with the third information, and a response providing unit that provides the verifier with response information corresponding to a verification pattern selected by the verifier from among k (where k≥2) verification patterns. The vector s is a secret key. The multi-order multivariate polynomial set F and the vector y are public keys. The message is information obtained by performing an operation prepared for a verification pattern corresponding to the response information in advance using the public keys, the first information, the third information, and the response information. The multi-order multivariate polynomial set F is generated using information differing according to a user.

According to another aspect of the present technology, there is provided an information processing apparatus including an information holding unit that holds a multi-order multivariate polynomial set $F=(f_1, \ldots, f_m)$ defined on a ring K and a vector $y=(y_1, \ldots, y_m)=(f_1(s), \ldots, f_m(s))$, a message acquiring unit that acquires a message generated based on the multi-order multivariate polynomial set F and a vector s that is an element of a set $K^n$, an information providing unit that provides a prover that has provided the message with randomly selected first information, an interim information acquiring unit that acquires third information generated by the prover using the first information and second information obtained when the message is generated, a pattern information providing unit that provides the prover with information on a single verification pattern randomly selected from among k (where k≥3) verification patterns, a response acquiring unit that acquires response information corresponding to the selected verification pattern from the prover, and a verifying unit that verifies whether the prover holds the vector s based on the message, the first information, the third information, the multi-order multivariate polynomial set F, and the response information. The vector s is a secret key. The multi-order multivariate polynomial set F and the vector y are public keys. The message is information obtained by performing an operation prepared for a verification pattern corresponding to the response information in advance using the public keys, the first information, the third information, and the response information. The multi-order multivariate polynomial set F is generated using information differing according to a user.

According to another aspect of the present technology, there is provided an information processing method including generating a message based on a multi-order multivariate polynomial set $F=(f_1, \ldots, f_m)$ defined on a ring K and a vector s that is an element of a set $K^n$, providing the message to a verifier holding the multi-order multivariate polynomial set F and a vector $y=(y_1, \ldots, y_m)=(f_1(s), \ldots, f_m(s))$, and providing the verifier with response information corresponding to a verification pattern selected by the verifier from among k (where k≥3) verification patterns. The vector s is a secret key. The multi-order multivariate polynomial set F and the vector y are public keys. The message is information obtained by performing an operation prepared for a verification pattern corresponding to the response information in advance using the public keys and the response information. The multi-order multivariate polynomial set F is generated using information differing according to a user.

According to another aspect of the present technology, there is provided an information processing method performed by an information processing apparatus that holds a multi-order multivariate polynomial set $F=(f_1, \ldots, f_m)$ defined on a ring K and a vector $y=(y_1, \ldots, y_m)=(f_1(s), \ldots, f_m(s))$, the information processing method including acquiring a message generated based on the multi-order multivariate polynomial set F and a vector s that is an element of a set $K^n$, providing a prover that has provided the message with information on a single verification pattern randomly selected from among k (where k≥3) verification patterns, acquiring response information corresponding to the selected verification pattern from the prover, and verifying whether the prover holds the vector s based on the message, the multi-order multivariate polynomial set F, the vector y, and the response information. The vector s is a secret key. The multi-order multivariate polynomial set F and the vector y are public keys. The message is information obtained by performing an operation prepared for a verification pattern corresponding to the response information in advance using the public keys and the response information. The multi-order multivariate polynomial set F is generated using information differing according to a user.

According to another aspect of the present technology, there is provided an information processing method including generating a message based on a multi-order multivariate polynomial set $F=(f_1, \ldots, f_m)$ defined on a ring K and a vector s that is an element of a set $K^n$, providing the message to a verifier holding the multi-order multivariate polynomial set F and a vector $y=(y_1, \ldots, y_m)=(f_1(s), \ldots, f_m(s))$, generating third information using first information randomly selected by the verifier and second information obtained when the message is generated, providing the verifier with the third information, and providing the verifier with response information corresponding to a verification pattern selected by the verifier from among k (where k≥2) verification patterns. The vector s is a secret key. The multi-order multivariate polynomial set F and the vector y are public keys. The message is information obtained by performing an operation prepared for a verification pattern corresponding to the response information in advance using the public keys, the first information, the third information, and the response information. The multi-order multivariate polynomial set F is generated using information differing according to a user.

According to another aspect of the present technology, there is provided an information processing method performed by an information processing apparatus that holds a multi-order multivariate polynomial set $F=(f_1, \ldots, f_m)$ defined on a ring K and a vector $y=(y_1, \ldots, y_m)=(f_1(s), \ldots, f_m(s))$, the information processing method including acquiring a message generated based on the multi-order multivariate polynomial set F and a vector s that is an element of a set $K^n$, providing a prover that has provided the message with randomly selected first information, acquiring third information generated by the prover using the first information and second information obtained when the message is generated, providing the prover with information of a single verification pattern randomly selected from among k (where k≥3) verification patterns, a response acquiring unit that acquires response information corresponding to the selected verification pattern from the prover, and verifying whether the prover holds the vector s based on the message, the first information, the third information, the multi-order multivariate polynomial set F, and the response information. The vector s is a secret key. The multi-order multivariate polynomial set F and the vector y are public keys. The message is information obtained by performing an operation prepared for a verification pattern corresponding to the response information in advance using the public keys, the first information, the third information, and the response information. The multi-order multivariate polynomial set F is generated using information differing according to a user.

According to another aspect of the present technology, there is provided a program for causing a computer to realize a function of each unit included in the information processing apparatus. According to still another aspect of the present technology, there is provided a computer-readable recording medium having the program recorded thereon.

Advantageous Effects of Invention

According to the present technology described above, it is possible to realize a public-key authentication scheme and a digital signature scheme of high security using a multi-order multivariate simultaneous equation for which an efficient solving means (trapdoor) is not known.

BRIEF DESCRIPTION OF DRAWINGS

FIG. 39 is a chart illustrating a comparison of efficiency of the public-key authentication schemes according to the first and second embodiments of the present technology; and FIG. 40 is an explanatory diagram for describing a very suitable method of setting a parameter used in the public-key authentication scheme according to the first and second embodiments of the present technology and the advantageous effects.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Figure 4:
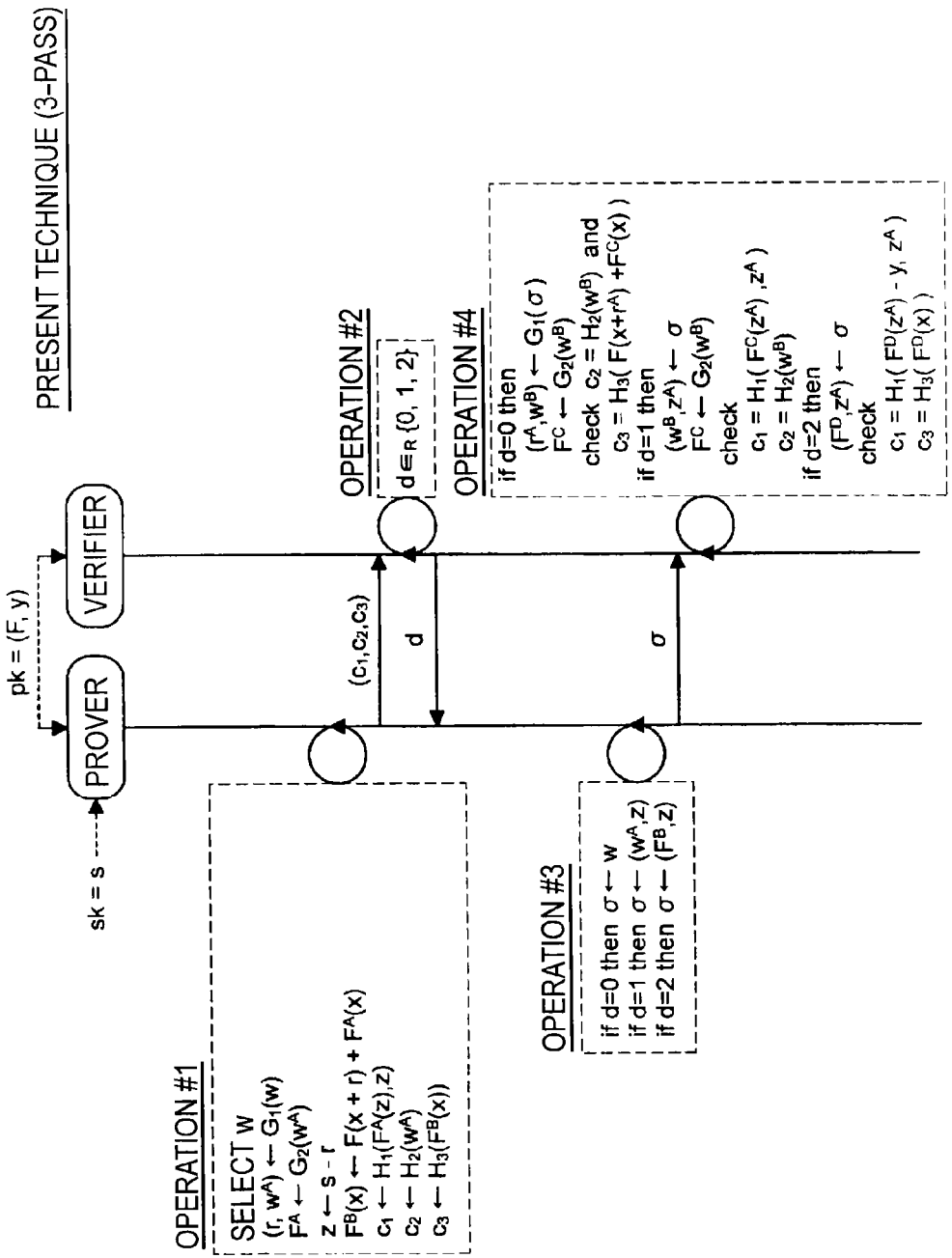
FIG. 4 is an explanatory diagram for describing an algorithm of a public-key authentication scheme according to a first embodiment (3-pass) of the present technology.

Then, an algorithm of a public-key authentication scheme according to a first embodiment (3-pass) of the present technology will be described with reference to FIG. 4. Then, an extended algorithm of the public-key authentication scheme according to the same embodiment will be described with reference to FIG. 5. Then, a parallelized algorithm of the public-key authentication scheme according to the same embodiment will be described with reference to FIG. 6. Then, a specific algorithm of the public-key authentication scheme according to the same embodiment will be described with reference to FIG. 7. Then, an efficient algorithm of the public-key authentication scheme according to the same embodiment and a modified example thereof will be described with reference to FIGS. 8 to 15.

Figure 16:
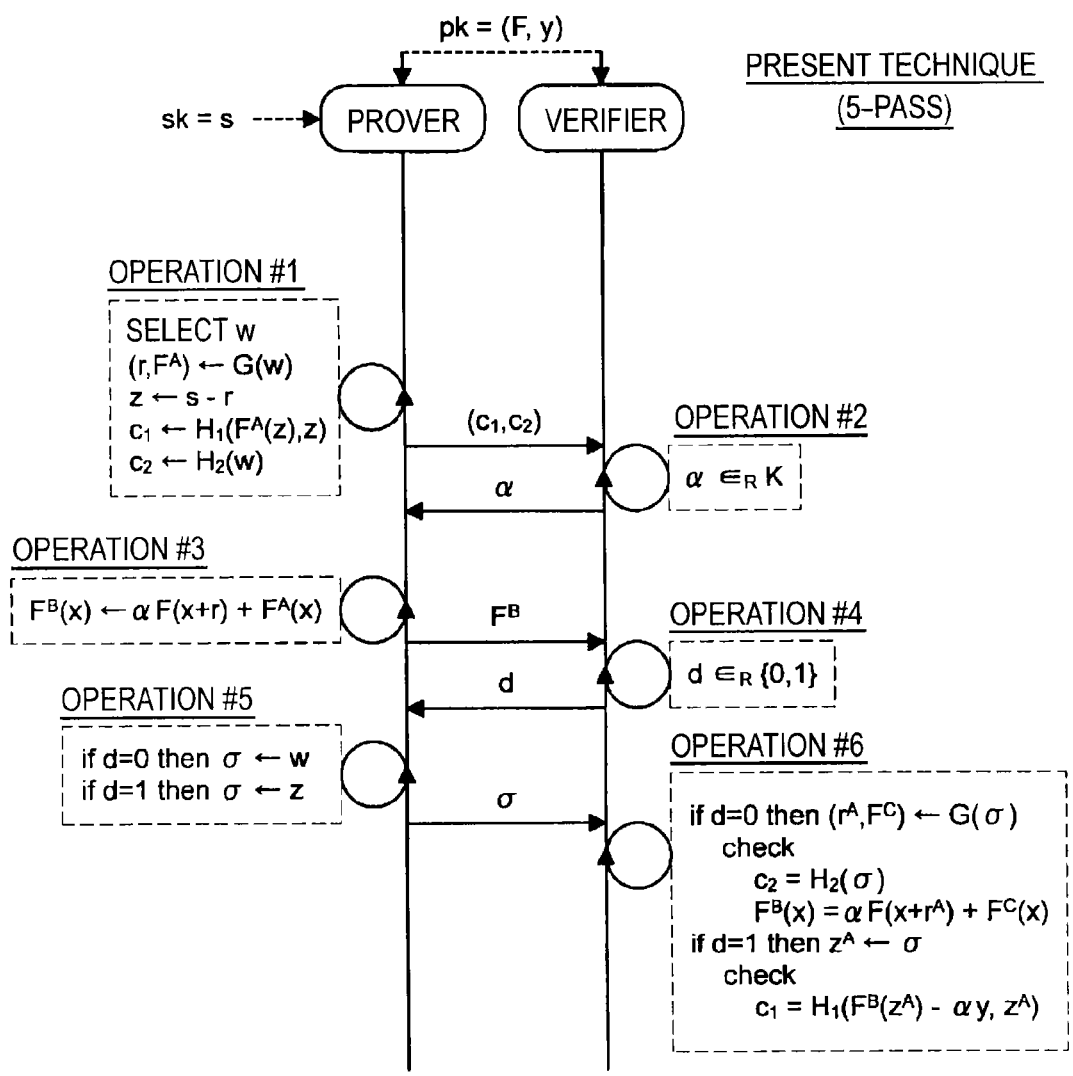
FIG. 16 is an explanatory diagram for describing an algorithm of a public-key authentication scheme according to a second embodiment (5-pass) of the present technology.

Then, an algorithm of a public-key authentication scheme according to a second embodiment (5-pass) of the present technology will be described with reference to FIG. 16. Then, an extended algorithm of the public-key authentication scheme according to the same embodiment will be described with reference to FIG. 17. Then, a parallelized algorithm of the public-key authentication scheme according to the same embodiment will be described with reference to FIGS. 18 and 19. Then, a specific algorithm of the public-key authentication scheme according to the same embodiment will be described with reference to FIG. 20. Then, an efficient algorithm of the public-key authentication scheme according to the same embodiment and a modified example thereof will be described with reference to FIGS. 21 to 35.

Then, an extended technique for applying the efficient algorithms according to the first and second embodiments of the present technology to a second- or higher-order multivariate polynomial will be described. Then, a mechanism of increasing robustness of an interactive protocol according to the first and second embodiments of the present technology will be described. Further, a mechanism of avoiding leakage of the secret key caused by an irregular challenge and a mechanism of eliminating a risk of forgery will be described with reference to FIGS. 36 and 37. Then, a hardware configuration example of an information processing apparatus capable of realizing the algorithms according to the first and second embodiments of the present technology will be described with reference to FIG. 38.

Finally, a summary of the technical spirit of the present embodiments and operational advantageous effects obtained from the technical spirit will be described in brief (Detailed Articles)
1: Introduction
1-1: Algorithm of Public-Key Authentication Scheme
1-2: Algorithm for Digital Signature Scheme
1-3: N-pass Public-Key Authentication Scheme
2: First Embodiment
2-1: Algorithm of Public-Key Authentication Scheme
2-2: Extended Algorithm
2-3: Parallelized Algorithm
2-4: Specific Example (when Second-Order Polynomial Is Used)
2-5: Efficient Algorithm
2-6: Modification into Digital Signature Scheme
2-6-1: Transforming Method
2-6-2: Streamlining of Digital Signature Algorithm
2-7: Form of Multi-Order Multivariate Simultaneous Equation
2-7-1: Form Related to Common Key Block Cipher
2-7-2: Form Related to Hash Function
2-7-3: Form Related to Stream Cipher
2-8: Serial Parallel Hybrid Algorithm
3: Second Embodiment
3-1: Algorithm of Public-Key Authentication Scheme
3-2: Extended Algorithm
3-3: Parallelized Algorithm
3-4: Specific Example (when Second-Order Polynomial Is Used)
3-5: Efficient Algorithm
3-6: Serial Parallel Hybrid Algorithm
4: Extension of Efficient Algorithm
4-1: High-Order Multivariate Polynomial
4-2: Extension Scheme (Addition of High-Order Term)
5: Mechanism of Increasing Robustness
5-1: Method of Setting System Parameters
5-2: Method of Responding To Irregular Challenge
5-2-1: Responding Method by Prover
5-2-2: Responding Method by Verifier
6: Hardware Configuration
7: Conclusion
<1: Introduction>

First, before embodiments of the present technology are described in detail. overviews of an algorithm of a public-key authentication scheme, an algorithm of a digital signature scheme, and an n-pass public-key authentication scheme will be described in brief.

[1-1: Algorithm of Public-Key Authentication Scheme]

Figure 1:
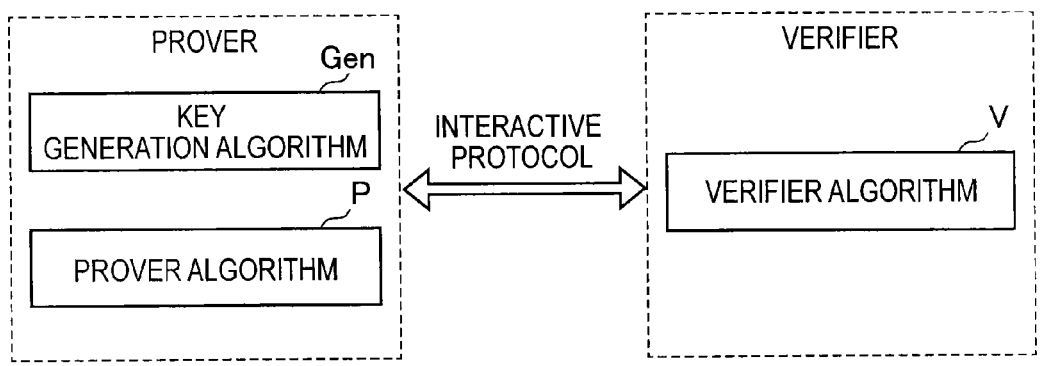
FIG. 1 is an explanatory diagram for describing an algorithm structure of a public-key authentication scheme.

First, an overview of an algorithm of a public-key authentication scheme will be described with reference to FIG. 1. FIG. 1 is an explanatory diagram for describing an algorithm structure of a public-key authentication scheme.

A public-key authentication is used when a person (prover) convinces another person (verifier) that she is the prover herself by using a public key pk and a secret key sk. For example, a public key $pk_A$ of a prover A is made known to the verifier B. On the other hand, a secret key skA of the prover A is secretly managed by the prover A. According to the public-key authentication scheme, a person who knows the secret key $sk_A$ corresponding to the public key $pk_A$ is regarded as the prover A herself.

In order for the prover A to prove to the verifier B that she is the prover A herself using the public-key authentication setup, the prover A, via a interactive protocol, presents proof to the verifier B indicating that she knows the secret key $sk_A$ corresponding to the public key $pk_A$. The proof indicating the prover A knows the secret key $sk_A$ is then presented to verifier B, and in the case where the verifier B is able to confirm that proof, the validity of the prover A(the fact that the prover A is herself) is proven.

However, a public-key authentication setup demands the following conditions in order to ensure safety.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the exclusion of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

Conducting public-key authentication safely involves using an interactive protocol exhibiting both soundness and zero-knowledge. If an authentication process were hypothetically conducted using an interactive protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

In a model of the public-key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public-key authentication scheme is configured from two entities, namely the prover and the verifier, and three algorithms, namely the key generation algorithm Gen, the prover algorithm P and the verifier algorithm V.

Figure 38:
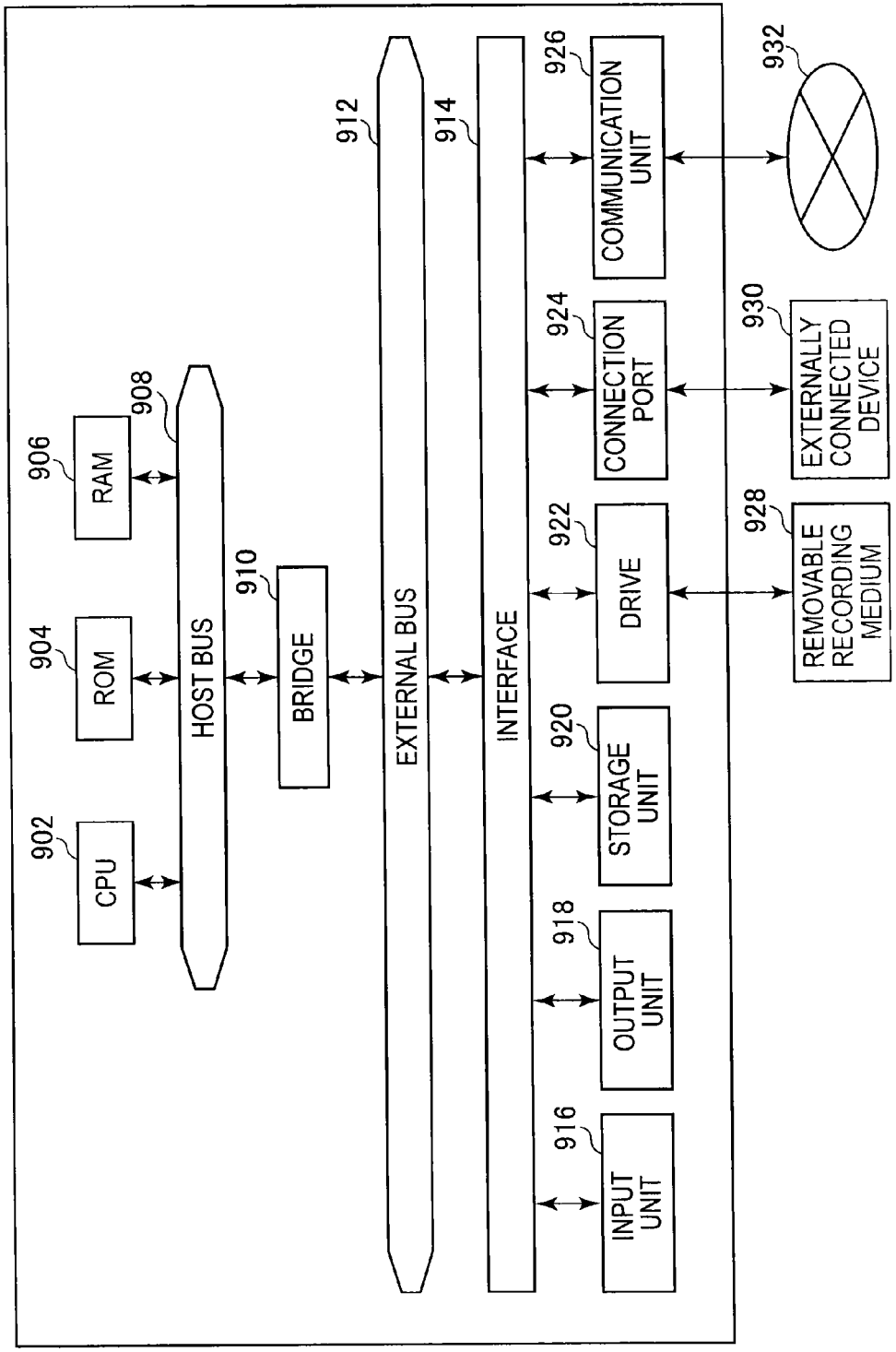
FIG. 38 is an explanatory diagram for describing a hardware configuration example of an information processing apparatus capable of executing the algorithm according to each embodiment of the present technology.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 38, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter $1\lambda$ ($\lambda$ is an integer of 0 or more) as an input and outputs the secret key sk and the public key pk.

[Math 1]

$$(sk, pk) \leftarrow \text{Gen}(1^\lambda) \qquad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following formula (2).

[Math 2]

$$0/1 \leftarrow V(pk) \qquad (2)$$

As above, realizing meaningful public-key authentication involves having the interactive protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key generation algorithm Gen, prover algorithm P, and verifier algorithm V are skillfully designed to satisfy these requirements.

The foregoing thus summarizes the algorithms in a public-key authentication scheme.

[1-2: Algorithms for Digital Signature Scheme]

Figure 2:
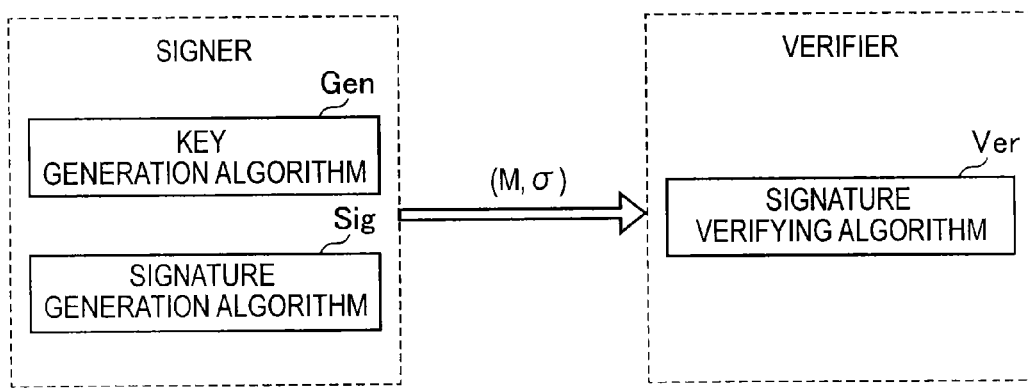
FIG. 2 is an explanatory diagram for describing an algorithm structure of a digital signature scheme.

Next, algorithms for a digital signature scheme will be summarized with reference to FIG. 2. FIG. 2 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. Further, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature q to attach to a message M. In other words, the signer is an entity that attaches a digital signature to a message M. Meanwhile, the verifier uses the signature verifying algorithm Ver to verify the digital signature attached to the message M. In other words, the verifier is an entity that verifies the digital signature q in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 38, for example. In other words, the key generation algorithm Gen, the signature generation algorithm Sig, and the signature verifying algorithm Ver are executed by a device such as a CPU 902 on the basis of a program recorded onto a device such as ROM 904, RAM 906, a storage unit 920, or a removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature q to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow \text{Gen}(1^\lambda) \qquad (3)$$

(Signature Generation Algorithm Sig)

The signature generation algorithm Sig is used by the signer. The signature generation algorithm Sig is an algorithm that generates a digital signature q to be attached to a message M. The signature generation algorithm Sig is an algorithm that accepts a signature key sk and a message M as input, and outputs a digital signature q. The signature generation algorithm Sig may be expressed formally as in the following formula (4).

[Math 4]

$$\sigma \leftarrow \text{Sig}(sk, M) \quad (4)$$

(Signature Verifying Algorithm Ver)

The signature verifying algorithm Ver is used by the verifier. The signature verifying algorithm Ver is an algorithm that verifies whether or not the digital signature q is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver may be expressed formally as in the following formula (5). At this point, the verifier decides that the digital signature q is invalid in the case where the signature verifying algorithm Ver outputs 0 (the case where the verification key pk rejects the message M and the digital signature q), and decides that the digital signature q is valid in the case where the signature verifying algorithm Ver outputs 1 (the case where the verification key pk accepts the message M and the digital signature q).

[Math 5]

$$0/1 \leftarrow \text{Ver}(pk, M, \sigma) \quad (5)$$

The foregoing thus summarizes the algorithms in a digital signature scheme.

[1-3: N-Pass Public-Key Authentication Scheme]

Figure 3:
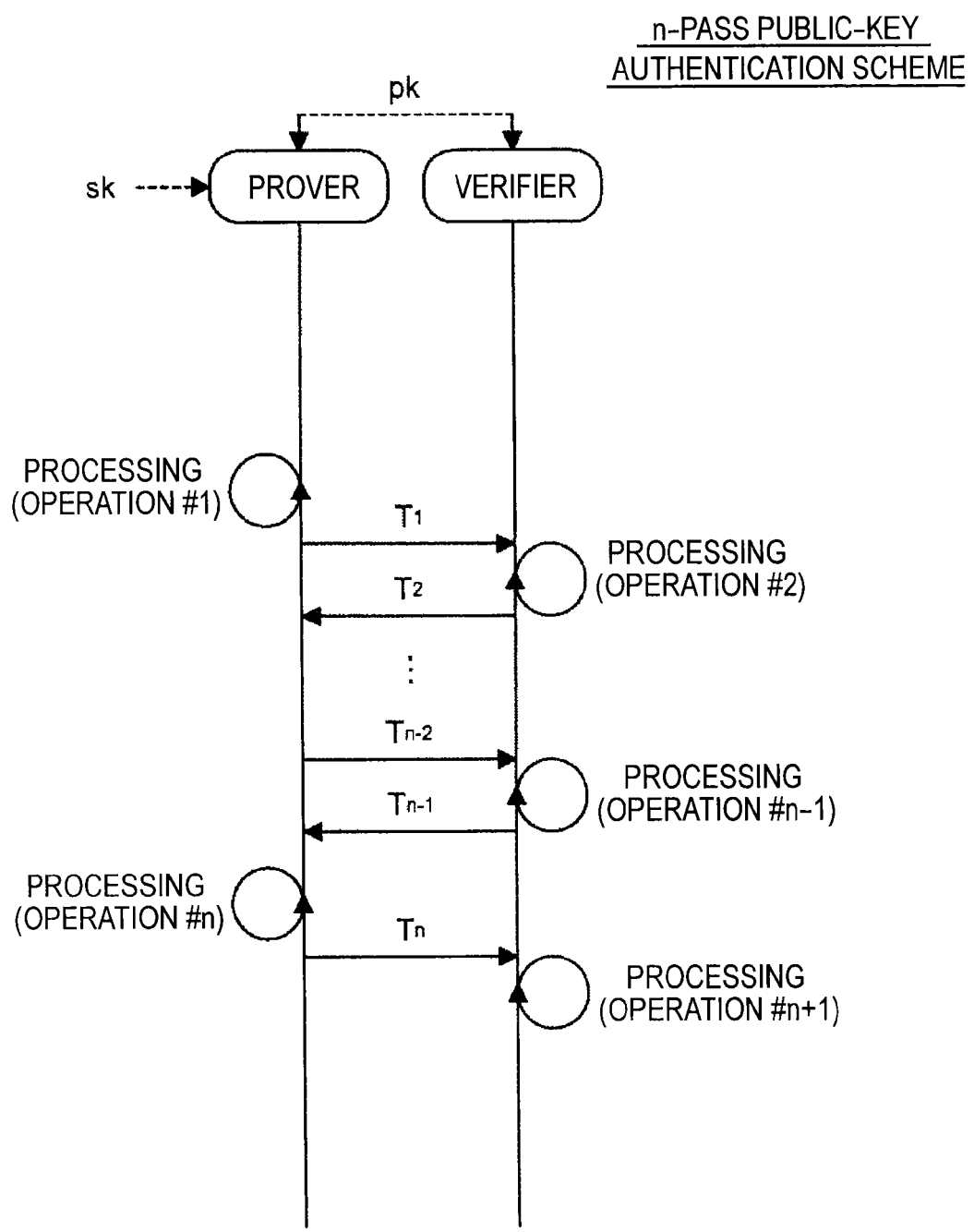
FIG. 3 is an explanatory diagram for describing an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during an interactive protocol. Further, the interactive protocol has to satisfy the two conditions of soundness and zero-knowledge. For this reason, during the interactive protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n (operation #k), and lastly, a process (operation #n+1) is executed. Transmitting and receiving information n times in this way is thus called an "n-pass" public-key authentication scheme.

The foregoing thus describes an n-pass public-key authentication scheme.

<2: First Embodiment>

Hereinafter, description will be given on the first embodiment of the present technology. The embodiments herein relate to a public-key authentication scheme and a digital signature scheme that base their safety on the difficulty of solving multi-order multivariate simultaneous equations. However, the embodiments herein differ from techniques of the related art such as HFE digital signature schemes, and relate to a public-key authentication scheme and a digital signature scheme that utilize multi-order multivariate simultaneous equations that lack a means of efficient solving (trapdoors).

[2-1: Algorithm of Public-Key Authentication Scheme]

First of all, an algorithm of a public-key authentication scheme (hereinafter, a "present technique") according to the present embodiment will be described with reference to FIG. 4. FIG. 4 is an explanatory diagram for describing an algorithm according to the present technique. The present technique is configured with a key generation algorithm Gen, a prover algorithm P, and a verifier algorithm V. The structures of the respective algorithms will be described below.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $f_1(x_1, \ldots, x_n), \ldots, f_m(x_1, \ldots, x_n), y$ in the public key pk and sets s as a secret key. Hereinafter, a vector $(x_1, \ldots, x_n)$ is represented as x and a pair of multivariate polynomials $(f_1(x), \ldots, f_m(x))$ is represented as F(x).

(Prover Algorithm P, Verifier Algorithm V)

Next, a process performed by the prover algorithm P and a process performed by the verifier algorithm V during the interactive protocol will be described with reference to FIG. 4.

During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

First, the prover algorithm P selects any number of w. Subsequently, the prover algorithm P generates a vector r which is an element of the set $K^n$ and a number $w^A$ by applying the number w to a pseudo-random number generator $G_1$. That is, the prover algorithm P calculates $(r, w^A) \leftarrow G_1(w)$. Subsequently, the prover algorithm P generates a multivariate polynomial $F^A(x)=(f^A_1(x), \ldots, f^A_m(x))$ by applying the number $w^A$ to the pseudo-random number generator $G_2$. That is, the prover algorithm P calculates $F^A \leftarrow G_2(w^A)$.

Operation #1 (Continued):

Subsequently, the prover algorithm P calculates $z \leftarrow s-r$. This calculation is equivalent to masking the secret key s with the vector r. Additionally, the prover algorithm P calculates $F^B(x) \leftarrow F(x+r)+F^A(x)$. This calculation is equivalent to masking the multivariate polynomial F(x+r) for x with the multivariate polynomial $F^A(x)$.

Operation #1 (Continued):

Subsequently, the prover algorithm P generates a hash value $c_1$ of z and $F^A(z)$. That is, the prover algorithm P calculates $c_1 \leftarrow H_1(F^A(z), z)$. Also, the prover algorithm P generates a hash value $c_2$ of the number wA. That is, the prover algorithm P calculates $c_2 \leftarrow H_2(w^A)$. Also, the prover algorithm P generates a hash value $c_3$ of a multivariate polynomial $F^B$. That is, the prover algorithm P calculates $c_3 \leftarrow H_3(F^B(x))$. Note that the above $H_1(\ldots), H_2(\ldots), H_3(\ldots)$ are hash functions. The hash values $(c_1, c_2, c_3)$ are sent as a message to the verifier algorithm V. At this time, it should be noted that information on s, information on r, and information on z are not at all leaked to the verifier.

Operation #2:

Upon receiving the message $(c_1, c_2, c_3)$, the verifier algorithm V selects which verification pattern to use from among three verification patterns. For example, the verifier algorithm V may select a numerical value from among three numerical values {0, 1, 2} representing verification patterns, and set the selected numerical value in a challenge d. This challenge d is sent to the prover algorithm P.

Operation #3:

Upon receiving the challenge d, the prover algorithm P generates a response Rsp to send to the verifier algorithm V in response to the received challenge d. In the case where d=0, the prover algorithm P generates a response σ=w. In the case where d=1, the prover algorithm P generates a response σ=($w^A$, z). In the case where d=2, the prover algorithm P generates a response σ=($F^B_{(z)}$, z). The response σ generated in operation #3 is sent to the verifier algorithm V. At this time, it should be noted that the information on z is not at all leaked to the verifier in the case where d=0, and the information on r is not at all leaked to the verifier in the case where d=1 or 2.

Operation #4:

The verifier algorithm V that has received the response σ performs the following verification process using the received response σ.

In the case where d=0, the verifier algorithm V calculates ($r^A$, $w^B$)<-$G_1$(σ). Also, the verifier algorithm V calculates $F^C$<-$G_2$($w^B$). Then, the verifier algorithm V verifies whether or not the equality of $c_2$=$H_2$($w^B$) holds. In addition, the verifier algorithm V verifies whether or not the equality of $c_3$=$H_3$(F(x+$r^A$)+$F^C$(x)) holds. The verifier algorithm V outputs the value 1 to indicate authentication success in the case where these verifications all succeed, and outputs the value 0 to indicate authentication failure in the case where a verification fails.

In the case where d=1, the verifier algorithm V sets ($w^B$, $z^A$)<-σ. Also, the verifier algorithm V calculates $F^C$<-$-_2$($w^B$). Then, the verifier algorithm V verifies whether or not the equality of $c_1$=$H_1$($F^C$($z^A$), $z^A$) holds. In addition, the verifier algorithm V verifies whether or not the equality of $c_2$=$H_2$($w^B$) holds. The verifier algorithm V outputs the value 1 to indicate authentication success in the case where these verifications all succeed, and outputs the value 0 to indicate authentication failure in the case where a verification fails.

In the case where d=2, the verifier algorithm V sets ($F^D$, $z^A$)<-σ. Then, the verifier algorithm V verifies whether or not the equality of $c_1$=$H_1$($F^D$($z^A$)-y, $z^A$) holds. In addition, the verifier algorithm V verifies whether or not the equality of $c_3$=$H_3$($F^D$) holds. The verifier algorithm V outputs the value 1 to indicate authentication success in the case where these verifications all succeed, and outputs the value 0 to indicate authentication failure in the case where a verification fails.

The example of the each algorithm structure related to the present technique has been described above.

(Soundness of the Present Technique)

Here, the description of the soundness of the present technique will be supplemented. The soundness of the present technique is ensured based on the logic that $F^D$, $F^C$, $r^A$, $z^A$ and $r_1$ satisfying the following formula (6) and formula (7) below can be calculated when the prover algorithm P returns an appropriate response σ for all of the challenges d=0, 1, and 2 selectable by the verifier algorithm V."

[Math 6]

$$F^D(x) = F(x+r^A) + F^C(x) \quad (6)$$

$$F^D(z^A) - y = F^C(z^A) \quad (7)$$

By ensuring the foregoing soundness, the fact that successful forgery with a probability higher than 2/3 is not possible is ensured as long as the problem of solving the multi-order multivariate simultaneous equations is not solved. That is, to appropriately make the response to all of the challenges d=0, 1, 2 of the verifier, the falsifier has to calculate $F^D$, $F^C$, $r^A$, and $z^A$ satisfying the foregoing formula (6) and formula (7). In other words, the falsifier has to calculate s satisfying F(s)=y. However, there remains a probability of the falsifier making appropriate responses for two higher challenges among the challenges d=0, 1, 2 of the verifier. Therefore, the success probability of the false verification becomes 2/3. Further, by repeatedly executing the foregoing interactive protocol a sufficiently large number of times, the probability of a successful forgery becomes negligibly small.

The soundness of the present technique has been described above.

(Modified Example)

Here, a modified example of the above algorithm will be introduced. The key generation algorithm Gen calculates y<-F(s) and sets (F,y) as the public key. However, in the present modified example, the key generation algorithm Gen calculates ($y_1$, ..., $y_m$)<-F(s) and ($f_1^*$(x), ..., $f_m^*$(x))<-(x)-$y_1$, ..., $f_m$(x)-$y_m$), and sets ($f_1^*$, ..., $f_m^*$) as the public key. In the case of this modification, it is possible to perform the interactive protocol at y=0.

Further, the prover algorithm P generates the message $c_1$ based on $F^B$(z) and z. However, due to a relation of $F^B$(z)=$F^A$(z), even when a modification is made so that the message $c_1$ is generated based on $F^A$(z) and z, a similar interactive protocol is realized. Further, the structure of the prover algorithm P may be modified so that a hash value of $F^B$(z) and a hash value of z are separately calculated and then sent to the verifier algorithm V as messages.

Further, the prover algorithm P generates the vector r and the number $w^A$ by applying the number w to the pseudo random number generator $G_1$. Further, the prover algorithm P generates the multivariate polynomial $F^A$(x) by applying the number $w^A$ to the pseudo random number generator $G_2$. However, the structure of the prover algorithm P may be modified so that w=(r,$F^A$) is calculated from the beginning using identity mapping as $G_1$. In this case, the number w need not be applied to $G_1$. This is the same for $G_2$.

Further, in the interactive protocol, (F,y) is used as the public key. The multivariate polynomial F included in the public key is a parameter that does not depend on the secret key sk. For this reason, the common multivariate polynomial F may be used in the entire system without setting the multivariate polynomial F for each prover. In this case, y is sufficient as the public key set for each prover, and thus it is possible to reduce the size of the public key. However, it is desirable to set the multivariate polynomial F for each prover in view of security. A method of setting the multivariate polynomial F in this case will be described later in detail.

Further, in the interactive protocol, ($f_1$, ..., $f_m$,y) is used as the public key, and F=($f_1$, ..., $f_m$) is a parameter which can be appropriately selected. For this reason, for example, the prover and the verifier may prepare a seed $w_{pk}$ of a random number and calculate F<-$G^*$($w_{pk}$) using a pseudo random number generator $G^*$. In this case, even when the public key is ($w_{pk}$,y) and (F,y) is made known as the public key, it is possible to reduce the size of the public key.

In the algorithm, $c_1$, $c_2$, and $c_3$ are calculated using the hash functions $H_1$, $H_2$, and $H_3$, but a commitment function COM may be used instead of the hash function. The commitment function COM is a function in which a character string S and a random number ρ are factors. An example of the commitment function includes a scheme published in the international conference CRYPTO 1996 by Shai Halevi and Silvio Micali.

When the commitment function is used, random numbers $\rho_1$, $\rho_2$, and $\rho_3$ are prepared before $c_1$, $c_2$, and $c_3$ are calculated, and $c_1$, $c_2$, and $c_3$ are generated by applying commitment functions COM($\bullet$,$\rho_1$), COM($\bullet$,$\rho_2$), and COM ($\bullet$,$\rho_2$) instead of applying hash functions $H_1(\bullet)$, $H_2(\bullet)$, and $H_3(\bullet)$. Here, $\rho_i$ necessary for the verifier to generate $c_i$ is set to be included in a response $\sigma$ and sent. This modification can be applied to the entire algorithm which will be described later.

The modified example of the present technique has been described above.

[2-2: Extended Algorithm]

Figure 5:
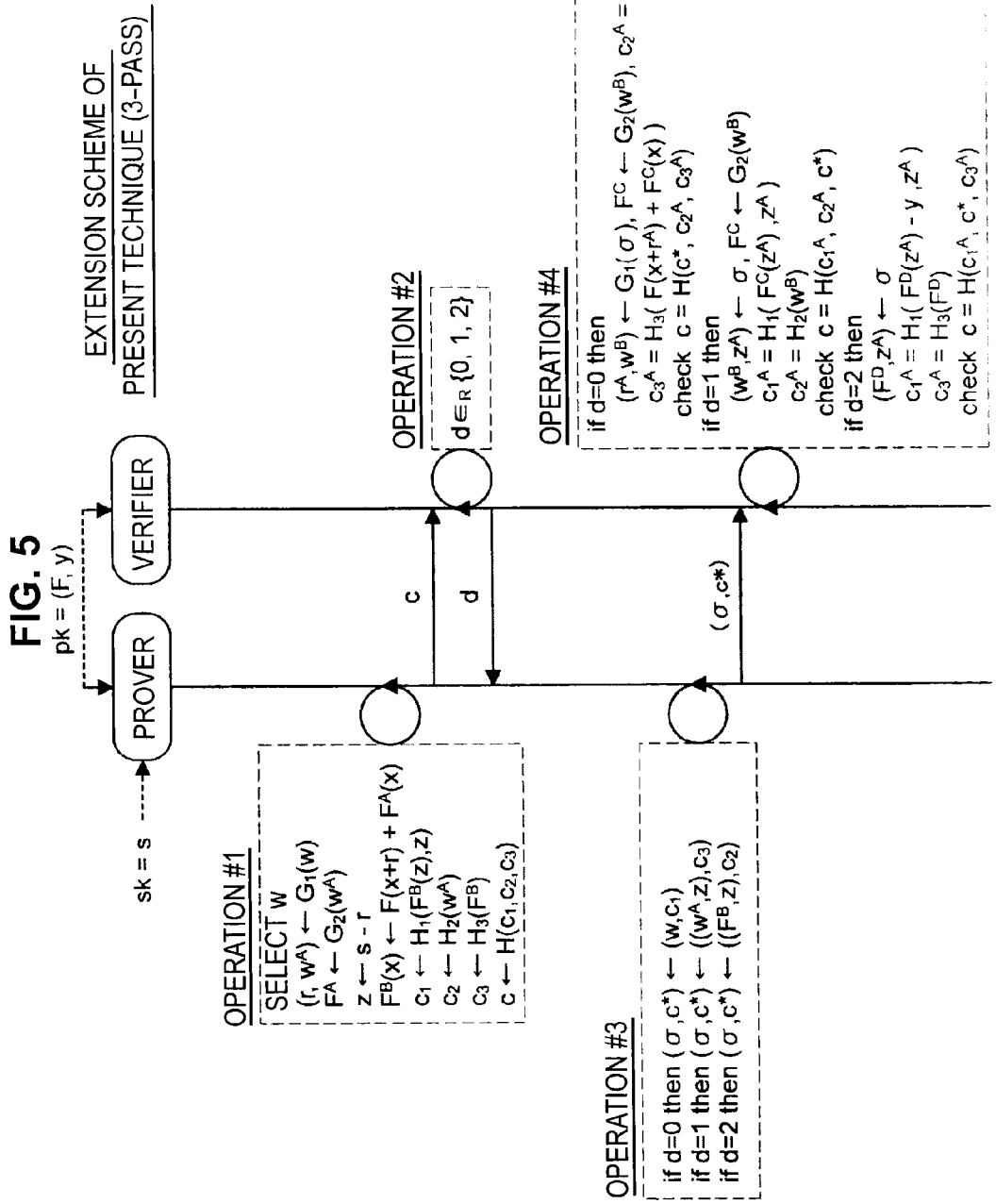
FIG. 5 is an explanatory diagram for describing an extended algorithm of the public-key authentication scheme according to the same embodiment.

Next, an algorithm of a public-key authentication scheme (hereinafter referred to as an "extended technique") extended from the present technique will be described with reference to FIG. 5. FIG. 5 is an explanatory diagram for describing the flow of the interactive protocol based on the extended technique.

In the extended technique described herein, the message $(c_1,c_2,c_3)$ transmitted at the first pass is converted into one hash value c and sent to the verifier. Here, a message that is hardly restored using the response $\sigma$ sent at the third pass is sent to the verifier together with the response $\sigma$. By applying the extended technique, the amount of information sent to the verifier during the interactive protocol can be reduced. Next, the structure of each algorithm related to the extended technique will be described in detail.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m)<-(f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as F(x).

(Prover Algorithm P, Verifier Algorithm V)

Next, a process performed by the prover algorithm P and a process performed by the verifier algorithm V during the interactive protocol will be described with reference to FIG. 5.

During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 5.

Operation #1:

First, the prover algorithm P selects any number of w. Subsequently, the prover algorithm P generates a vector r which is an element of the set $K^n$ and a number $w^A$ by applying the number w to a pseudo-random number generator $G_1$. That is, the prover algorithm P calculates $(r, w^A)<-G_1(w)$. Subsequently, the prover algorithm P generates a multivariate polynomial $F^A(x)=(f^A_1(x), \ldots, f^A_m(x))$ by applying the number $w^A$ to the pseudo-random number generator $G_2$. That is, the prover algorithm P calculates $F^A<-G_2(w^A)$.

Operation #1 (Continued):

Subsequently, the prover algorithm P calculates $z<-s-r$. This calculation is equivalent to masking the secret key s with the vector r. Additionally, the prover algorithm P calculates $F^B(x)<-F(x+r)+F^A(x)$. This calculation is equivalent to masking the polynomial set F(x+r) for x with the polynomial set $F^A(x)$.

Operation #1 (Continued):

Next, the prover algorithm P generates a hash value $c_1$ of $F^B(z)$ and z. In other words, the prover algorithm P calculates $c_1<-H_1(F^B(z),z)$. Further, the prover algorithm P generates a hash value $c_2$ of the number $w^A$. In other words, the prover algorithm P calculates $c_2<-H_2(w^A)$. Further, the prover algorithm P generates a hash value $c_3$ of a polynomial set $F^B$. In other words, the prover algorithm P calculates $c_3<-H_3(F^B)$. $H_1(\ldots)$, $H_2(\ldots)$, and $H_3(\ldots)$ are hash functions. In the case of the extension scheme, the prover algorithm P applies a hash value set $(c_1,c_2,c_3)$ to the hash function H to generate the hash value c, and sends the hash value c to the verifier algorithm V.

Operation #2:

Upon receiving the hash value c, the verifier algorithm V selects which verification pattern to use from among three verification patterns. For example, the verifier algorithm V may select a numerical value from among three numerical values {0, 1, 2} representing verification patterns, and set the selected numerical value in a challenge d. This challenge d is sent to the prover algorithm P.

Operation #3:

Upon receiving the challenge d, the prover algorithm P generates a response $\sigma$ to send to the verifier algorithm V in response to the received challenge d. In the case where d=0, the prover algorithm P generates a response $(\sigma, c^*)=(w, c_1)$. In the case where d=1, the prover algorithm P generates a response $(\sigma, c^*)=(w^A, z), c_3)$. In the case where d=2, the prover algorithm P generates a response $(\sigma, c^*)=(F^B, z), c_2)$. The response $(\sigma, c^*)$ generated in operation #3 is sent to the verifier algorithm V.

Operation #4:

Upon receiving the response $\sigma$, the verifier algorithm V executes the following verification process using the received response $(\sigma, c^*)$.

When d=0, the verifier algorithm V calculates $(r^A,w^B)<-G_1(\sigma)$. Next, the verifier algorithm V calculates $F^C<-G_2(w^B)$. Next, the verifier algorithm V calculates $c_2^A=H_2(w^B)$. Next, the verifier algorithm V calculates $c_3^A=H_3(F(x+r^A)+F^C(x))$. Thereafter, the verifier algorithm V verifies whether or not the equality of $c=H(c^*,c_2^A,c_3^A)$ holds. Then, the verifier algorithm V outputs a value 1 representing authentication success when the verification succeeds, and outputs the value 0 representing an authentication failure when the verification fails.

When d=1, the verifier algorithm V sets $(w^B,z^A)<-\sigma$. Next, the verifier algorithm V calculates $F^C<-G_2(w^B)$. Next, the verifier algorithm V calculates $c_1^A=H_1(F^C(z^A),z^A)$. Next, the verifier algorithm V calculates $c_2^A=H_2(w^B)$. Thereafter, the verifier algorithm V verifies whether or not the equality of $c=H(c_1^A,c_2^A,c^*)$ holds. Then, the verifier algorithm V outputs a value 1 representing authentication success when the verification succeeds, and outputs a value 0 representing an authentication failure when the verification fails.

When d is 2, the verifier algorithm V sets $(F^D,z^A)<-\sigma$. Next, the verifier algorithm V calculates $c_1^A=H_1(F^D(z^A)-y, z^A)$. Next, the verifier algorithm V calculates $c_3^A=H_3(F^D)$. Thereafter, the verifier algorithm V verifies whether or not the equality of $c=H(c_1^A,c^*,c_3^A)$ holds. Then, the verifier algorithm V outputs a value 1 representing authentication success when the verification succeeds, and outputs a value 0 representing authentication failure when the verification fails.

The structure of each algorithm related to the extended technique has been described above. By applying the extended technique, the amount of information transmitted and received during the interactive protocol can be reduced.

[2-3: Parallelized Algorithm]

As described above, applying the session protocol according to the present technique and the extended technique makes it possible to keep the probability of a successful forgery to $2/3$ or less. Consequently, executing the session protocol twice makes it possible to keep the probability of a successful forgery to $(2/3)2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Figure 6:
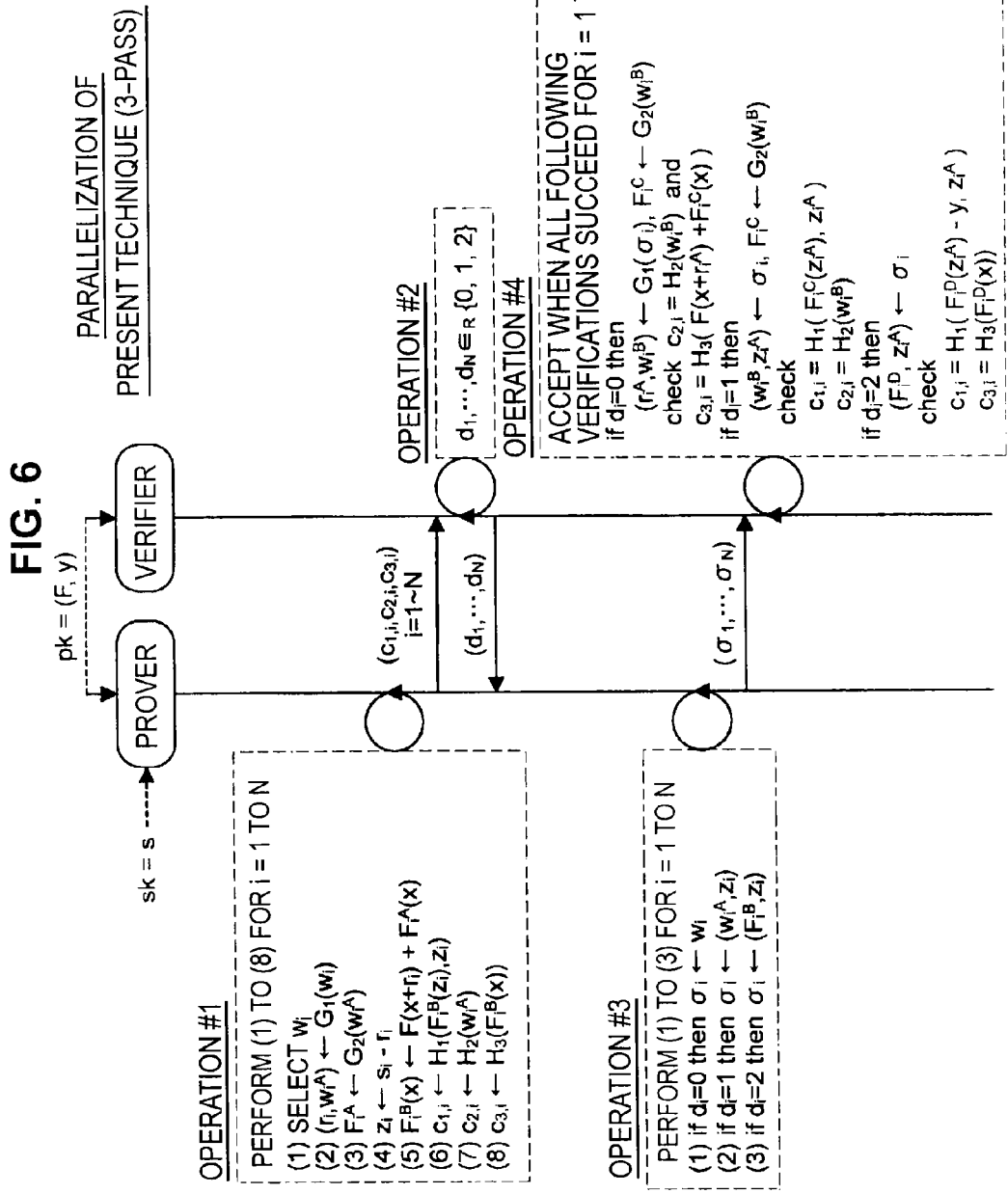
FIG. 6 is an explanatory diagram for describing a parallelized algorithm of the public-key authentication scheme according to the same embodiment.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Here, a method of extending the interactive protocol according to the present technique to an interactive protocol (hereinafter referred to as a "parallelized algorithm") related to the parallel method will be described. For example, the parallelized algorithm is illustrated in FIG. 6. Next, the details of the parallelized algorithm will be described with reference to FIG. 6.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $x_1, \ldots, x_n$ is represented as x and a pair of multivariate polynomials $(f_1(x), \ldots, f_m(x))$ is represented as $F(x)$.

(Prover Algorithm P, Verifier Algorithm V)

Next, a process performed by the prover algorithm P and a process performed by the verifier algorithm V during the interactive protocol will be described with reference to FIG. 6.

During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 6.

Operation #1:

First of all, the prover algorithm P performs the following processes (1) to (8) for i=1 to N.

Process (1): The prover algorithm P arbitrarily selects a number $w_i$.

Process (2): The prover algorithm P applies the number $w_i$ to the pseudo random number generator $G_1$ and generates a vector $r_i$ that is an element of the set $K^n$ and a number $w_i^A$. In other words, the prover algorithm P calculates $(r_i, w_i^A) \leftarrow G_1(w_i)$.

Process (3): The prover algorithm P applies the number $w_i^A$ to the pseudo random number generator $G_2$ and generates a multivariate polynomial set $F_i^A(x)$. In other words, the prover algorithm P calculates $F_i^A \leftarrow G_2(w_i^A)$.

Process (4): The prover algorithm P calculates $z_i \leftarrow s_i - r_i$. This calculation corresponds to an operation of masking the secret key $s_i$ using a vector $r_i$.

Process (5): The prover algorithm P calculates $F_i^B(x) \leftarrow F(x+r_i) + F_i^A(x)$. This calculation corresponds to an operation of masking a polynomial set $F(x+r_i)$ for x using a polynomial set $F_i^A(x)$.

Process (6): The prover algorithm P generates a hash value $c_{1,1}$ of $F_i^B(z_i)$ and $z_i$. In other words, the prover algorithm P calculates $c_{1,1} \leftarrow H_1(F_i^B(z_i), z_i)$.

Process (7): The prover algorithm P generates a hash value $c_{2,i}$ of the number $w_i^A$. In other words, the prover algorithm P calculates $c_{2,1} \leftarrow H_2(w_i^A)$.

Process (8): The prover algorithm P generates a hash value $c_{3,1}$ of the polynomial set $F_i^B$. In other words, the prover algorithm P calculates $c_{3,1} \leftarrow H_3(F_i^B)$.

$H_1(\ldots)$, $H_2(\ldots)$, and $H_3(\ldots)$ are hash functions. Further, the hash values $(c_{1,i}, c_{2,i}, c_{3,i})$ are messages.

For i=1 to N, after processes (1) to (8) are performed, the message $(c_{1,i}, c_{2,i}, c_{3,i})$ (i=1 to N) generated in operation #1 is sent to the verifier algorithm V.

Operation #2:

Upon receiving the message $(c_1, i, c_2, i, c_3, i)$(i=1 to N), the verifier algorithm V selects which verification pattern to use from among three verification patterns, for each of i=1 to N. For example, the verifier algorithm V may, for each of i=1 to N, select a numerical value from among three numerical values $\{0, 1, 2\}$ representing verification patterns, and set the selected numerical value in a challenge $d_i$. The challenges $d_i$ is sent to the prover algorithm P.

Operation #3:

The prover algorithm P that has received the challenge $d_i$ (i=1 to N) generates a response $\sigma_i$ to be sent to the verifier algorithm V in response to the challenge $d_i$. At this time, the prover algorithm P performs the following processes (1) to (3) for i=1 to N.

Process (1): when $d_i$ is 0, the prover algorithm P generates a response $\sigma_i = w_i$.

Process (2): when $d_i$ is 1, the prover algorithm P generates a response $\sigma i = (w_i^A, z_i)$.

Process (3): when $d_i$ is 2, the prover algorithm P generates a response $\sigma_i = (F_i^B, z_i)$.

After processes (1) to (3) are performed, the response $\sigma_i$ (i=1 to N) is sent to the verifier algorithm V.

Operation #4:

The verifier algorithm V that has received the response $\sigma_i$ (i=1 to N) performs the following verification process using the received response $\sigma_i$ (i=1 to N). The following process is performed for i=1 to N.

In the case where $d_i=0$, the verifier algorithm V calculates $(r_i^A, w_i^B) \leftarrow G_1(\sigma_i)$. Also, the verifier algorithm V calculates $F_i^C \leftarrow G_2(w_i^B)$. Then, the verifier algorithm V verifies whether or not the equality of $c_{2,i} = H_2(w_i^B)$ holds. In addition, the verifier algorithm V verifies whether or not the equality of $c_{3,i} = H_3(F(x+ri^A) + F_i^C(x))$ holds. The verifier algorithm V outputs the value 1 to indicate authentication success in the case where these verifications all succeed, and outputs the value 0 to indicate authentication failure in the case where a verification fails.

In the case where $d_i=1$, the verifier algorithm V sets $(w_i^B, z_i^A) \leftarrow \sigma_i$. Also, the verifier algorithm V calculates $F_i^C \leftarrow G_2(w_i^B)$. Then, the verifier algorithm V verifies whether or not the equality of $c_{1,i} = H_1(F_i^C(z_i^A), z_i^A)$ holds. In addition, the verifier algorithm V verifies whether or not the equality of $c_2=H_2(w_i^B)$ holds. The verifier algorithm V outputs the value 1 to indicate authentication success in the case where these verifications all succeed, and outputs the value 0 to indicate authentication failure in the case where a verification fails.

In the case where $d_i=2$, the verifier algorithm V sets $(F_i^D, z_i^A)$<-$\sigma_i$. Then, the verifier algorithm V verifies whether or not the equality of $c_{1,i}=H_1(F_i^D(z_i^A)-y, z_i^A)$ holds. In addition, the verifier algorithm V verifies whether or not the equality of $c_{3,i}=H_3(F_i^D(x))$ holds. The verifier algorithm V outputs the value 1 to indicate authentication success in the case where these verifications all succeed, and outputs the value 0 to indicate authentication failure in the case where a verification fails.

The method of performing the interactive protocol of the present technique in parallel has been described above. As described above, as the interactive protocol of the present technique is repetitively performed, the probability of a successful forgery becomes negligibly small.

Further, a modification can be made such that the hash value $c=H(c_{1,1}, c_{1,2}, c_{1,3}, \ldots, c_{N,1}, c_{N,2}, c_{N,3})$ may be sent instead of sending $(c_{1,1}, c_{1,2}, c_{1,3}, \ldots, c_{N,1}, c_{N,2}, c_{N,3})$ to the verifier after operation #1. Here, in view of the presence of a message that is hardly restored from the response, the interactive protocol needs to be modified such that the message is sent from the prover to the verifier together with the response. When this modification is applied, a message sent at the first pass is a single hash value c, and thus communication traffic is significantly reduced. For example, in the case of the N-time parallel repetition structure, the number of pieces of information to be sent can be reduced by 2N-1.

(Suitable Parameter Setting Method)

The interactive protocol according to the present embodiment guarantees the security against a passive attack. However, when the above-described method of repetitively performing the interactive protocol in parallel is applied, a condition to be described below is necessary in order to prove that the security against an active attack is reliably guaranteed.

The foregoing interactive protocol is an algorithm for verifying to a verifier that "a prover knows s satisfying y=F(s) for y" by using a pair of keys (a public key y and a secret key s). For this reason, when interactivity accepted in verification is performed, a probability of information, which indicates that "the prover uses s at the time of interactivity," known to the verifier is undeniable. Additionally, collision resistance is not ensured for the multivariate polynomial F. For this reason, when the foregoing interactive protocol is performed repeatedly in parallel, it is difficult to prove that the security against an active attack is reliably ensured without any condition.

Accordingly, the inventors of the present technology have examined a method of causing information indicating that "a prover uses s at the time of interactivity" not to be known to a verifier even when interactivity accepted in verification is performed. Additionally, the inventors of the present technology have devised a method of enabling the security against an active attack to be ensured even when the foregoing interactive protocol is performed repeatedly in parallel. This method is a method of setting the number m of multivariate polynomials $f_1, \ldots, f_m$ used as public keys to a value sufficiently smaller than the number n of variables. For example, m and n are set such that $2^{m-n}\ll 1$ (for example, when n=160 and m=80, $2^{-80}\ll 1$).

In the schemes that base their safety on the difficulty of solving multi-order multivariate simultaneous equations, it is difficult to generate another secret key $s_2$ corresponding to a public key pk even when a secret key $s_1$ and the public key pk corresponding thereto are given. For this reason, when it is ensured that two or more secret keys s exist for the public key pk, the information indicating that "a prover uses s at the time of interactivity" can be caused not to be known to a verifier even when interactivity accepted in verification is performed. That is, when this ensuring is established, the security against an active attack can be ensured even when the interactive protocol is performed repeatedly in parallel.

When a function F: $K^n$->$K^m$ including the number m of multi-order polynomials with n variables (where n>m) is considered with reference to FIG. 40, the number of elements of the domain of definition having no second pre-image is $|K|^m-1$ at the most. For this reason, when $|K|^{m-n}$ is set to be sufficiently small, a selection probability of elements of the domain of definition having no second pre-image can be made negligibly small. That is, when the number m of multi-order polynomials $f_1, \ldots, f_m$ with n variables is set to a value sufficiently smaller than the number n of variables, it can be ensured that two or more secret keys s exist for the public key pk. Consequently, even when interactivity accepted in verification is performed, the information indicating that "a prover uses s at the time of interactivity" can be caused not to be known to a verifier. Thus, the security against an active attack is ensured even when the interactive protocol is performed repeatedly in parallel.

As described above, by imposing the setting condition in which the number m of multi-order polynomials $f_1, \ldots, f_m$ with n variables is set to a value sufficiently smaller than the number n of variables (where n>m and preferably $2^{m-n}\ll 1$), the security can be ensured when the interactive protocol is performed repeatedly in parallel.

[2-4: Specific Example (when Second-Order Polynomial is Used)]

Figure 7:
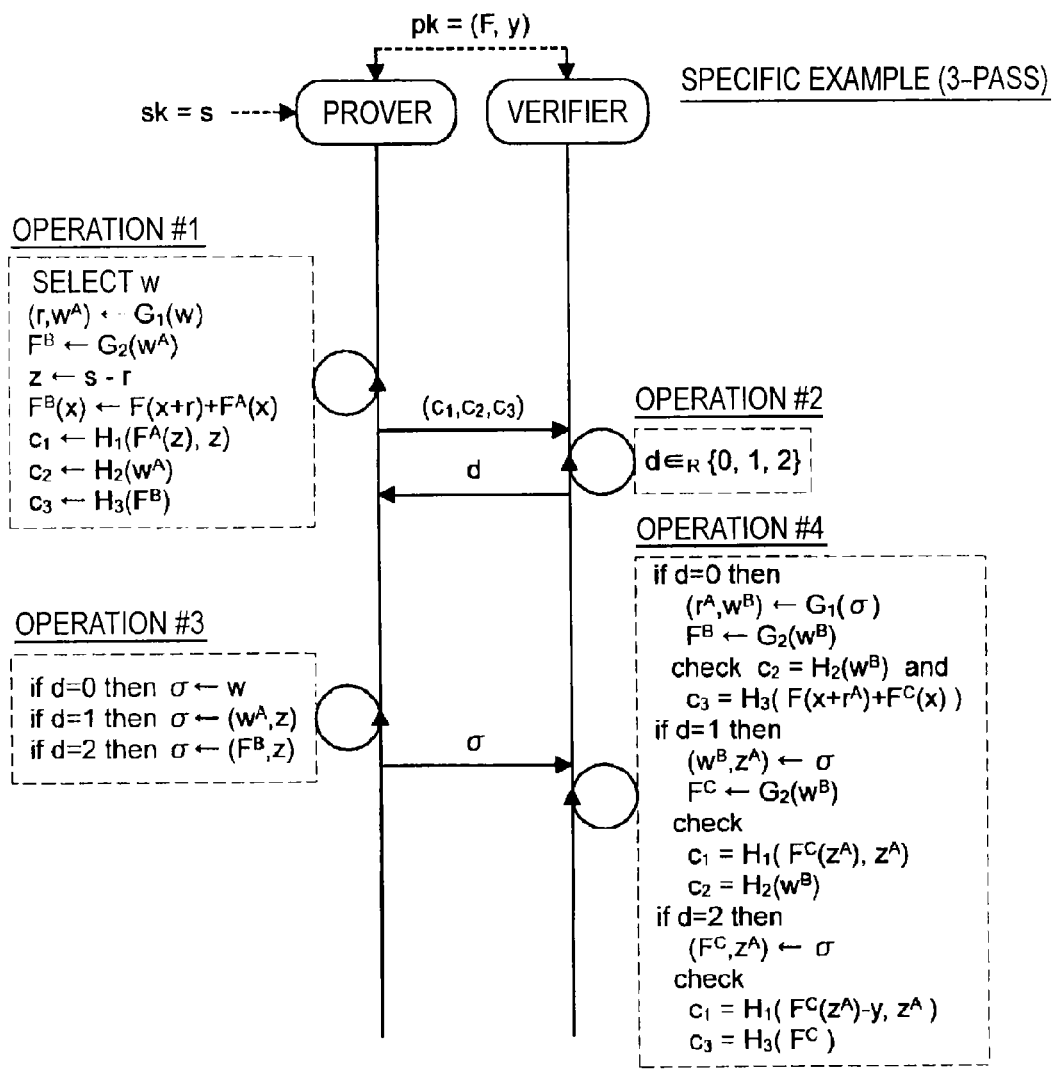
FIG. 7 is an explanatory diagram for describing a specific algorithm of the public-key authentication scheme according to the same embodiment.

Next, an example in which a second-order polynomial with n variables is used as the multivariate polynomial F will be described with reference to FIG. 7. FIG. 7 is an explanatory diagram for describing a specific example of the present technique.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of the set K. Next, the generation algorithm Gen calculates $y=(y_1, \ldots, y_m)$<-$(f_1(s), \ldots, f_m(s))$. Also, the generation algorithm Gen sets $(f_1, \ldots, f_m, y)$ as the public key pk and sets s as the secret key. Hereinafter, a vector $(x_1, \ldots, x_n)$ is represented by x and a multivariate polynomial set $(f_1(x), \ldots, f_m(x))$ is represented by F(x). Here, the second-order polynomial $f_i(x)$ is expressed as in the following Formula (8).

[Math 7]

$$f_i(x_1, \ldots, x_n) = \sum_{j,k} a_{i,j,k} x_j x_k + \sum_j b_{i,j} x_j \qquad (8)$$

(Prover Algorithm P, Verifier Algorithm V)

Next, processes performed by the prover algorithm P and the verifier algorithm V during the interactive protocol will be described with reference to FIG. 7.

Operation #1:

First of all, the prover algorithm P arbitrarily selects the number w. Next, the prover algorithm P applies the number w to the pseudo random number generator $G_1$ and generates the vector r that is an element of the set $K^n$ and the number $w^A$. In other words, the prover algorithm P calculates $(r,w^A) \leftarrow G_1(w)$. Next, the prover algorithm P applies the number $w^A$ to the pseudo random number generator $G_2$ and generates a linear polynomial set $f_1^A(x), \ldots, f_m^A(x)$. In other words, the prover algorithm P calculates $(f_1^A, \ldots, f_m^A) \leftarrow G_2(w^A)$. Here, the linear polynomial $f_i^A(x)$ is expressed as in the following Formula (9). Further, the linear polynomial set $(f_1^A(x), \ldots, f_m^A(x))$ is represented by $F^A(x)$.

[Math 8]

$$f_i^A(x_1, \ldots, x_n) = \sum_j b_{i,j}^A x_j \qquad (9)$$

Operation #1 (Continued):

Next, the prover algorithm P calculates $z \leftarrow s-r$. This calculation corresponds to an operation of masking the secret key s using the vector r. Further, the prover algorithm P calculates $F^B(x) \leftarrow F(x+r) + F^A(x)$. This calculation corresponds to an operation of making the second-order polynomial $F(x+r)$ for x using the linear polynomial $F^A(x)$. In $F(x+r)$, information related to r is represented by only a first-order term of x. Thus, all information related to r is masked by $F^A(x)$.

Operation #1 (Continued):

Next, the prover algorithm P calculates a hash value $c_1$ of $F^A(z)$ and z. In other words, the prover algorithm P calculates $c_1 \leftarrow H_1(F^A(z),z)$. Further, the prover algorithm P generates a hash value $c_2$ of the number $w^A$. In other words, the prover algorithm P calculates $c_2 \leftarrow H_2(w^A)$. Further, the prover algorithm P generates a hash value $c_3$ of the multivariate polynomial $F^B$. In other words, the prover algorithm P calculates $c_3 \leftarrow H_3(F^B)$. $H_1(\ldots)$, $H_2(\ldots)$, and $H_3(\ldots)$ are hash functions. The message $(c_1, c_2, c_3)$ generated in operation #1 is sent to the verifier algorithm V.

Operation #2:

Upon receiving the message $(c_1, c_2, c_3)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge d. This challenge d is sent to the prover algorithm P.

Operation #3:

Upon receiving the challenge d, the prover algorithm P generates a response a to send to the verifier algorithm V in response to the received challenge d. In the case where d=0, the prover algorithm P generates a response $\sigma=w$. In the case where e=1, the prover algorithm P generates a response $\sigma=(w^A, z)$. In the case where d=2, the prover algorithm P generates a response $\sigma=(F^B(z), z)$. The response $\sigma$ generated in operation #3 is sent to the verifier algorithm V.

Operation #6:

Upon receiving the response $\sigma$, the verifier algorithm V executes the following verification process using the received response $\sigma$.

In the case where d=0, the verifier algorithm V calculates $(r^A, w^B) \leftarrow G_1(\sigma)$. Also, the verifier algorithm V calculates $F^C \leftarrow G_2(w^B)$. Then, the verifier algorithm V verifies whether or not the equality of $c_2 = H_2(w^B)$ holds. In addition, the verifier algorithm V verifies whether or not the equality of $c_3 = H_3(F(x+r^A)+F^C(x))$ holds. The verifier algorithm V outputs the value 1 to indicate authentication success in the case where these verifications all succeed, and outputs the value 0 to indicate authentication failure in the case where a verification fails.

In the case where d=1, the verifier algorithm V sets $(w^B, z^A) \leftarrow \sigma$. Also, the verifier algorithm V calculates $F^c \leftarrow G_2(w^B)$. Then, the verifier algorithm V verifies whether or not the equality of $c_1 = H_1(F^c(z^A), z^A)$ holds. In addition, the verifier algorithm V verifies whether or not the equality of $c_2 = H_2(w^B)$ holds. The verifier algorithm V outputs the value 1 to indicate authentication success in the case where these verifications all succeed, and outputs the value 0 to indicate authentication failure in the case where a verification fails.

In the case where d=2, the verifier algorithm V sets $(F^D, z^A) \leftarrow \sigma$. Then, the verifier algorithm V verifies whether or not the equality of $c_1 = H_1(F^D(z^A)-y, z^A)$ holds. In addition, the verifier algorithm V verifies whether or not the equality of $c_3 = H_3(F^D)$ holds. The verifier algorithm V outputs the value 1 to indicate authentication success in the case where these verifications all succeed, and outputs the value 0 to indicate authentication failure in the case where a verification fails.

The specific example of the present technique has been described above.

[2-5: Efficient Algorithm]

Next, a method of streamlining the algorithm according to the present technique will be described. The second-order polynomial set $(f_1(x), \ldots, f_m(x))$ may be expressed in the following Formula (10). Here, x is $x_1, \ldots, x_n$. Further, $A_1, \ldots, A_m$ are an n×n matrix. Further, each of $b_1, \ldots, b_m$ is an n×1 vector.

[Math 9]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \qquad (10)$$

When this expression is used, a multivariate polynomial F can be expressed as in the following formula (11) and formula (12). From the following formula (13), it can easily be confirmed that this expression is satisfied.

[Math 10]

$$F(x+y) = F(x) + F(y) + F_b(x, y) \qquad (11)$$

$$F_b(x, y) = \begin{pmatrix} y^T(A_1^T + A_1)x \\ \vdots \\ y^T(A_m^T + A_m)x \end{pmatrix} \qquad (12)$$

$$\begin{aligned} f_l(x+y) &= (x+y)^T A_l(x+y) + b_l^T(x+y) \qquad (13)\\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l)x \end{aligned}$$

When dividing $F(x+y)$ into a first portion dependent on x, a second portion dependent on y, and a third portion dependent on both x and y in this way, the term $F_b(x, y)$ corresponding to the third portion becomes bilinear with respect to x and y. Using this property enables the construction of an efficient algorithm.

For example, use the vector $t_0$ that is an element of the set $K^n$ and the vector $e_0$ that is an element of the set $K^m$ to express the multivariate polynomial $F^A(x)$, which is used to mask the multivariate polynomial $F(x+r)$, as $F^A(x)=F_b(x, t)+e$. In this case, the sum of the multivariate polynomial $F(x+r)$ and $F^A(x)$ is expressed as in formula (14) below.

Here, when $t^A=r+t$, $e^A=F(r)+e$, the multivariate polynomial $F^B(x)=F(x+r)+F^A(x)$ can be expressed by the vector $t_1$ which is an element of the set $K^n$ and the vector $e_1$ that is an element of the set $K^m$. For this reason, when "$F^A(x)=F_b(x, t)+e$" is set, $F^A$ and $F^B$ can be expressed by using a vector in $K^n$ and a vector in $K^m$, and thus a data size necessary for communication can be considerably reduced. Specifically, communication efficiency can be improved to the degree of thousands to tens of thousands of times.

[Math 11]

$$F(x+r) + F^A(x) = F(x) + F(r) + F_b(x, r) + F_b(x, t) + e \qquad (14)$$
$$= F(x) + F_b(x, r+t) + F(r) + e$$

According to this modification, information related to r is not leaked from $F^B$ (or $F^A$) at all. For example, when $e^A$ and $t^A$ (or e and t) are given, it is difficult to know information of r unless e and t (or $e^A$ and $t^A$) are known. Accordingly, even when this modification is applied to the present technique, the zero knowledge is guaranteed. Next, an efficient algorithm related to the present technique will be described with reference to FIGS. 8 to 10. Since the structure of the key generation algorithm Gen does not change, a detailed description thereof will be omitted herein.

Figure 8:
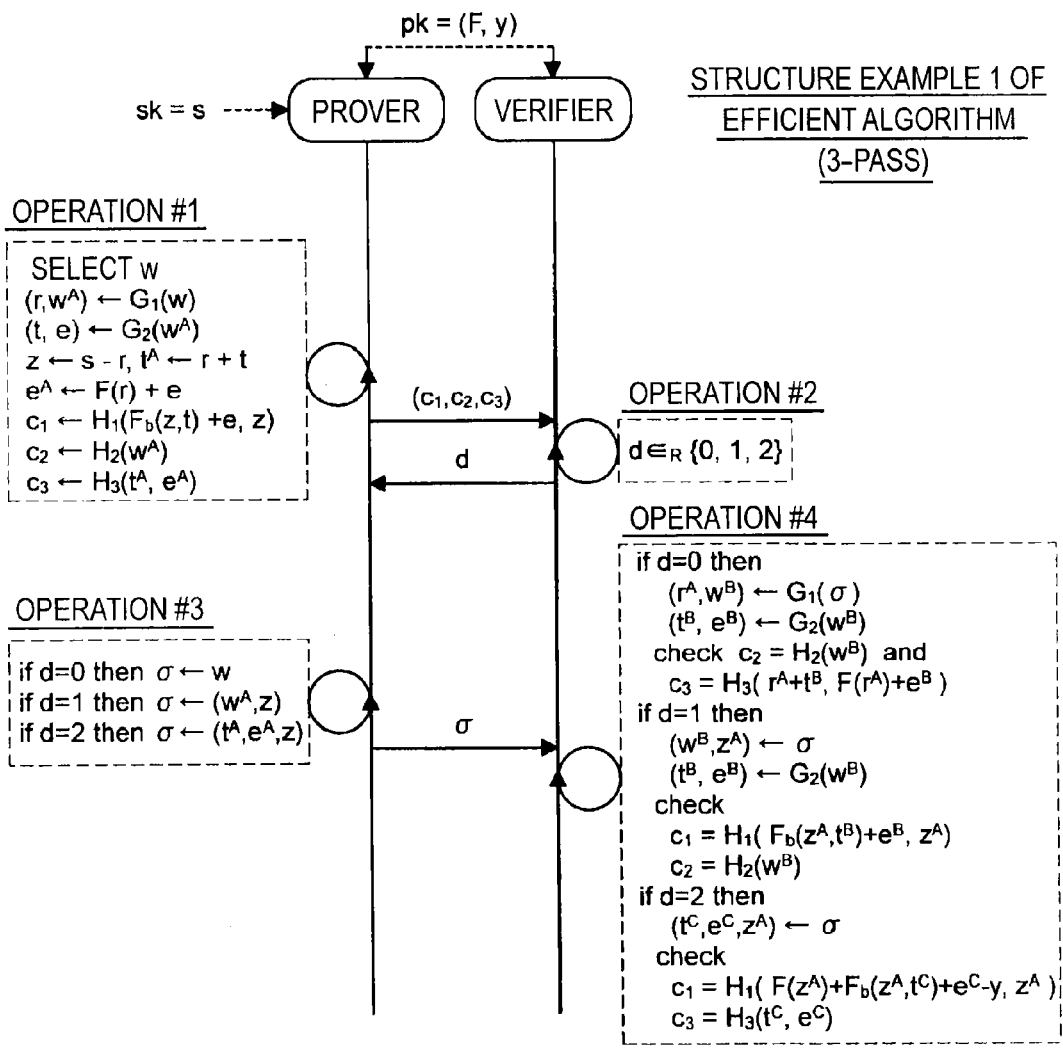
FIG. 8 is an explanatory diagram for describing an efficient algorithm of the public-key authentication scheme according to the same embodiment.

(Structure Example 1 of Efficient Algorithm: FIG. 8)

First of all, a structure of an efficient algorithm illustrated in FIG. 8 will be described.

Operation #1:

The prover algorithm P arbitrarily selects the number w. Next, the prover algorithm P applies the number w to the pseudo random number generator $G_1$ and generates the vector r that is an element of the set $K^n$ and the number $w^A$. In other words, the prover algorithm P calculates $(r, w^A) \leftarrow G_1(w)$. Next, the prover algorithm P applies the number $w^A$ to the pseudo random number generator $G_2$ and generates two vectors, the vector t that is an element of the set $K^n$ and the vector e that is an element of the set $K^m$. In other words, the prover algorithm P calculates $(t, e) \leftarrow G_2(w^A)$. Next, the prover algorithm P calculates $z \leftarrow s-r$. This calculation corresponds to an operation of masking the secret key s using the vector r. Further, the prover algorithm P calculates $t^A \leftarrow r+t$. Next, the prover algorithm P calculates $e^A \leftarrow F(r)+e$.

Operation #1 (Continued):

Next, the prover algorithm P calculates $F_b(z,t)$ based on Formula (14), and calculates a hash value $c_1$ of $F_b(z,t)+e$ and z. In other words, the prover algorithm P calculates $c_1 \leftarrow H_1(F_b(z,t)+e, z)$. Further, the prover algorithm P generates a hash value $c_2$ of the number $w^A$. In other words, the prover algorithm P calculates $c_2 \leftarrow H_2(w^A)$. Further, the prover algorithm P generates a hash value $c_3$ of the two vectors $t^A$ and $e^A$. In other words, the prover algorithm P calculates $c_3 \leftarrow H_3(t^A, e^A)$. $H_1(\ldots)$, $H_2(\ldots)$, and $H_3(\ldots)$ are hash functions. The message $(c_1, c_2, c_3)$ generated in operation #1 is sent to the verifier algorithm V.

Operation #2:

Upon receiving the message $(c_1, c_2, c_3)$, the verifier algorithm V selects which verification pattern to use from among three verification patterns. For example, the verifier algorithm V may select a numerical value from among three numerical values {0, 1, 2} representing verification patterns, and set the selected numerical value in a challenge d. This challenge d is sent to the prover algorithm P.

Operation #3:

Upon receiving the challenge d, the prover algorithm P generates a response $\sigma$ to send to the verifier algorithm V in response to the received challenge d. In the case where d=0, the prover algorithm P generates a response $\sigma=w$. In the case where d=1, the prover algorithm P generates a response $\sigma=(w^A, z)$. In the case where d=2, the prover algorithm P generates a response $\sigma=(t^A, t^A, z)$.) The response $\sigma$ generated in operation #3 is sent to the verifier algorithm V.

Operation #6:

Upon receiving the response $\sigma$, the verifier algorithm V executes the following verification process using the received response $\sigma$.

In the case where d=0, the verifier algorithm V calculates $(r^A, r^B) \leftarrow G_1(\sigma)$. Also, the verifier algorithm V calculates $(t^B, e^B) \leftarrow G_2(w^B)$. Then, the verifier algorithm V verifies whether or not the equality of $c_2 = H_2(w^B)$ holds. In addition, the verifier algorithm V verifies whether or not the equality of $c_3 = H_3(r^A + t^B, F(r^A) + e^B)$ holds. The verifier algorithm V outputs the value 1 to indicate authentication success in the case where these verifications all succeed, and outputs the value 0 to indicate authentication failure in the case where a verification fails.

In the case where d=1, the verifier algorithm V sets $(w^B, z^A) \leftarrow \sigma$. Also, the verifier algorithm V calculates $(t^B, e^B) \leftarrow G_2(w^B)$. Then, the verifier algorithm V verifies whether or not the equality of $c_1 = H_1(F_b(z^A, t^B) + e^B, z^A)$ holds. In addition, the verifier algorithm V verifies whether or not the equality of $c_2 = H_2(w^B)$ holds. The verifier algorithm V outputs the value 1 to indicate authentication success in the case where these verifications all succeed, and outputs the value 0 to indicate authentication failure in the case where a verification fails.

In the case where d=2, the verifier algorithm V sets $(t^C, e^C, z^A) \leftarrow \sigma$. Then, the verifier algorithm V verifies whether or not the equality of $c_1 = H_1(F(z^A) + F_b(z^A, t^C) + e^C - y, z^A)$ holds. In addition, the verifier algorithm V verifies whether or not the equality of $c_3 = H_3(t^C, e^C)$ holds. The verifier algorithm V outputs the value 1 to indicate authentication success in the case where these verifications all succeed, and outputs the value 0 to indicate authentication failure in the case where a verification fails.

The structure example 1 of the efficient algorithm has been described above. By using the efficient algorithm, the data size necessary for communication is significantly reduced. Further, since $F(x+r)$ need not be calculated, the calculation efficiency is improved as well.

Figure 9:
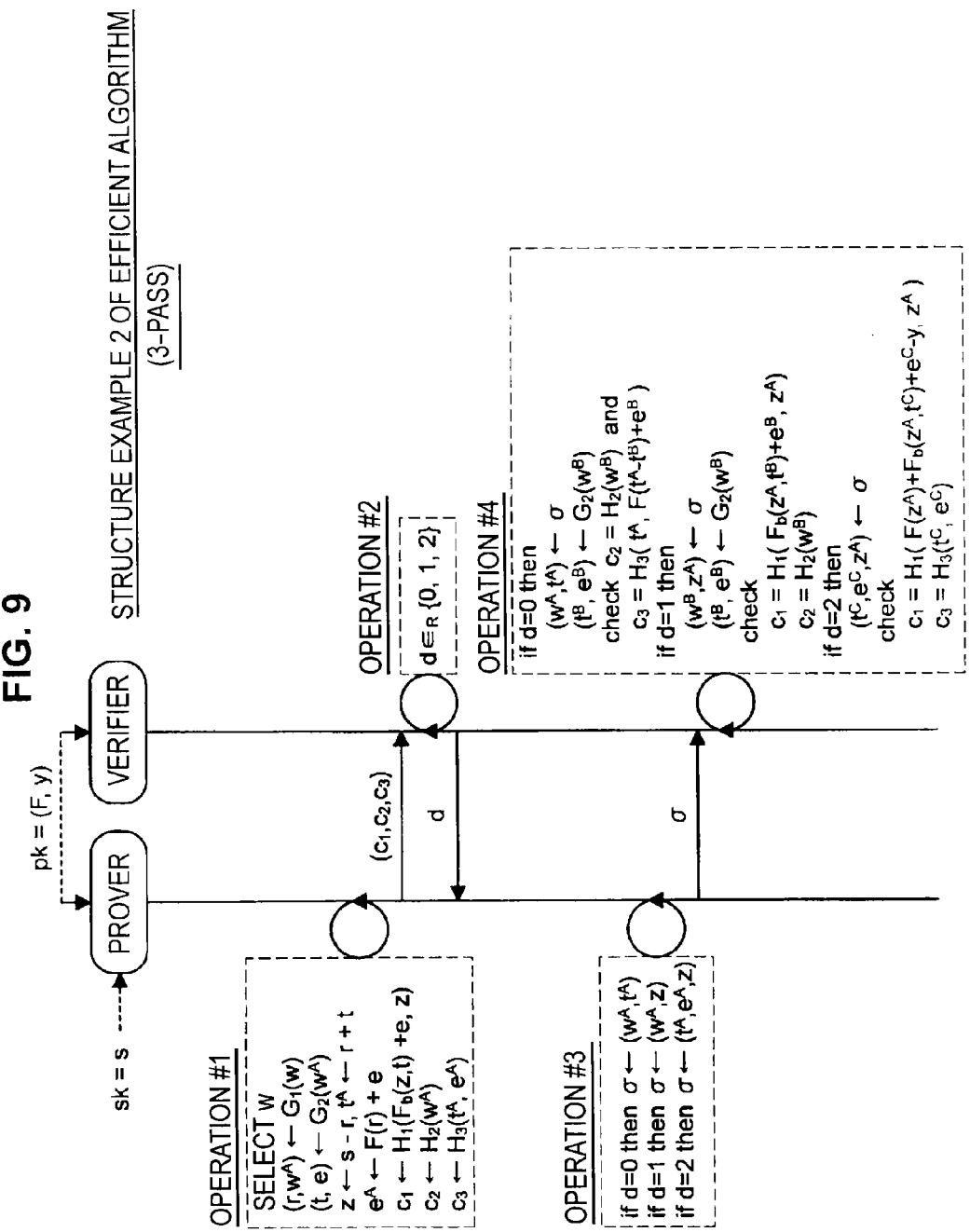
FIG. 9 is an explanatory diagram for describing an efficient algorithm of the public-key authentication scheme according to the same embodiment.

(Structure Example 2 of Efficient Algorithm: FIG. 9)

Next, a structure of an efficient algorithm illustrated in FIG. 9 will be described. Even when the structure illustrated in FIG. 9 is applied, similarly to when the structure illustrated in FIG. 8 is applied, the effect that the communication efficiency and the calculation efficiency are improved is obtained. Here, a difference with the structure illustrated in FIG. 8 will be described.

In operation #3 of the algorithm illustrated in FIG. 8, when d=0, $\sigma$ is set to w, but information that can be restored by (r,t,e) may be used as σ set when d=0. For example, as illustrated in FIG. 9, in operation #3, $(w^A, t^A)$ may be used as σ set when d=0. Here, when this modification is performed, it is necessary to modify a part of verification content performed by the verifier algorithm V in operation #4. Specifically, in operation #4, when d=0, in the verification content performed by the verifier algorithm V, verification of $c_3 = H_3(r^A + t^B, F(r^A) + e^B)$ is replaced with verification of $c_3 = H_3(t^A, F(t^A - t^B) + e^B)$.

The structure example 2 of the efficient algorithm has been described above.

Figure 10:
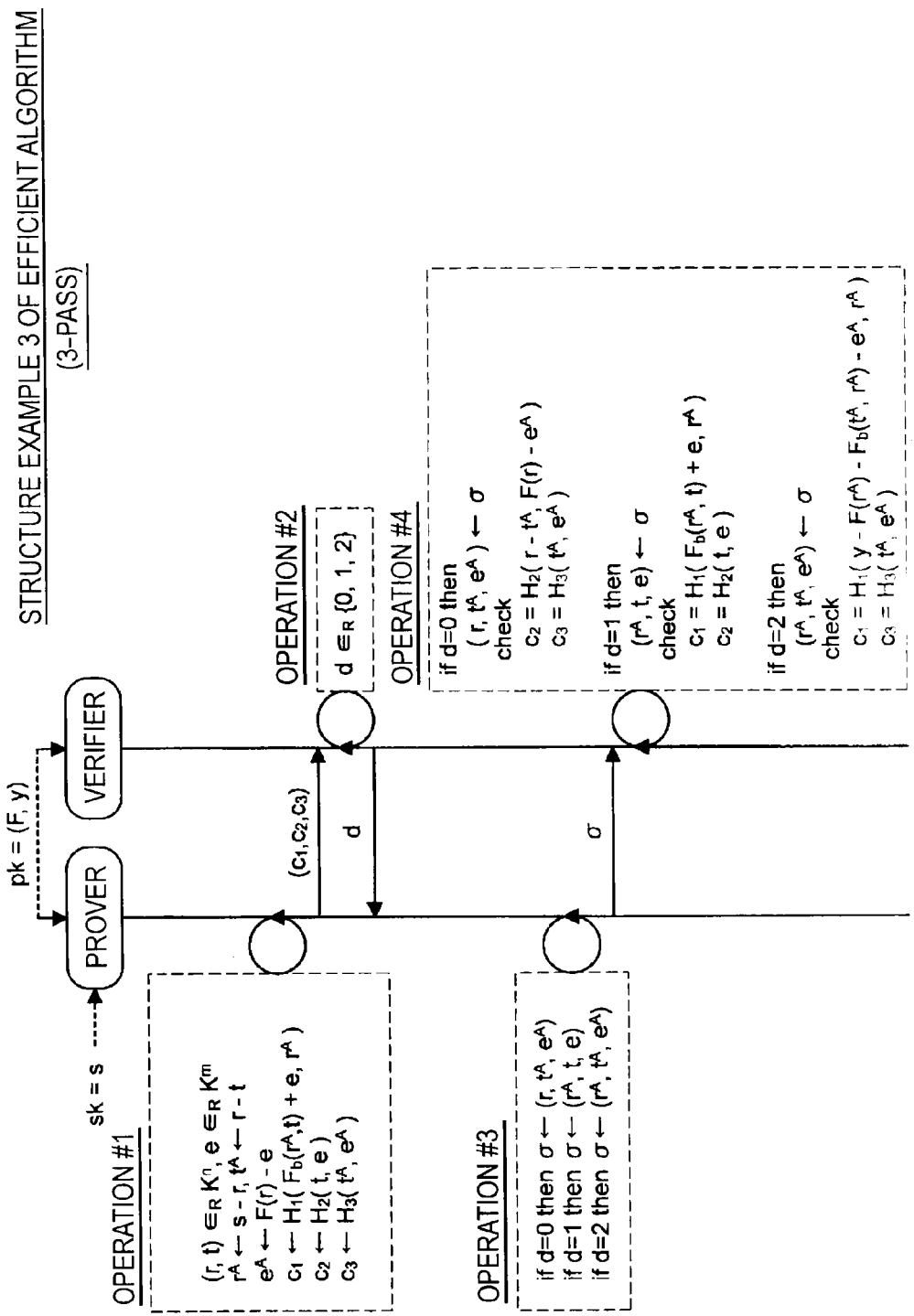
FIG. 10 is an explanatory diagram for describing an efficient algorithm of the public-key authentication scheme according to the same embodiment.

(Structure Example 3 of Efficient Algorithm: FIG. 10)

Next, a structure of an efficient algorithm illustrated in FIG. 10 will be described.

Operation #1:

The prover algorithm P arbitrarily generates the vector r, t that is an element of the set $K^n$, and the vector $e_0$ that is an element of the set $K^m$. Subsequently, the prover algorithm P calculates $r^A \leftarrow s - r$. This calculation is equivalent to masking the secret key s with the vector r. Additionally, the prover algorithm P calculates $t^A \leftarrow r - t$. Subsequently, the prover algorithm P calculates $e^A \leftarrow F(r) - e$.

Operation #1 (Continued):

Subsequently, the prover algorithm P calculates $c_1 \leftarrow H_1(F_b(r^A, t) + e, r^A)$. Subsequently, the prover algorithm P calculates $c_2 \leftarrow H_2(t, e)$. Subsequently, the prover algorithm P calculates $c_3 \leftarrow H_3(t^A, e^A)$. $H_1(\ldots)$, $H_2(\ldots)$, and $H_3(\ldots)$ are hash functions. The message $(c_1, c_2, c_3)$ generated in operation #1 is sent to the verifier algorithm V.

Operation #2:

Upon receiving the message $(c_1, c_2, c_3)$, the verifier algorithm V selects which verification pattern to use from among three verification patterns. For example, the verifier algorithm V may select a numerical value from among three numerical values {0, 1, 2} representing verification patterns, and set the selected numerical value in a challenge d. This challenge d is sent to the prover algorithm P.

Operation #3:

Upon receiving the challenge d, the prover algorithm P generates a response σ to send to the verifier algorithm V in response to the received challenge d. In the case where d=0, the prover algorithm P generates a response $\sigma = (r, t^A, e^A)$. In the case where d=1, the prover algorithm P generates a response $\sigma = (r^A, t, e)$. In the case where d=2, the prover algorithm P generates a response $\sigma = (r^A, t^A, e^A)$. The response σ generated in operation #3 is sent to the verifier algorithm V.

Operation #4:

Upon receiving the response σ, the verifier algorithm V executes the following verification process using the received response σ.

In the case where d=0, the verifier algorithm V verifies whether or not the equality of $c_2 = H_2(r - t^A, F(r) - e^A)$ holds. In addition, the verifier algorithm V verifies whether or not the equality of $c_3 = H_3(t^A, e^A)$ holds. The verifier algorithm V outputs the value 1 to indicate authentication success in the case where these verifications all succeed, and outputs the value 0 to indicate authentication failure in the case where a verification fails.

In the case where d=1, the verifier algorithm V verifies whether or not the equality of $c_1 = H_1(F_b, (r^A, t) + e, r^A)$ holds. In addition, the verifier algorithm V verifies whether or not the equality of $c_2 = H_2(t, e)$ holds. The verifier algorithm V outputs the value 1 to indicate authentication success in the case where these verifications all succeed, and outputs the value 0 to indicate authentication failure in the case where a verification fails.

In the case where d=2, the verifier algorithm V verifies whether or not the equality of $c_1 = H_1(y - F(r^A) - F_b(t^A, r^A) - e^A, r^A)$ holds. In addition, the verifier algorithm V verifies whether or not the equality of $c_3 = H_3(t^A, e^A)$ holds. The verifier algorithm V outputs the value 1 to indicate authentication success in the case where these verifications all succeed, and outputs the value 0 to indicate authentication failure in the case where a verification fails.

The structure example 3 of the efficient algorithm has been described above. By using the efficient algorithm, the data size necessary for communication is significantly reduced. Further, since $F(x+r)$ need not be calculated, the calculation efficiency is improved as well.

Figure 11:
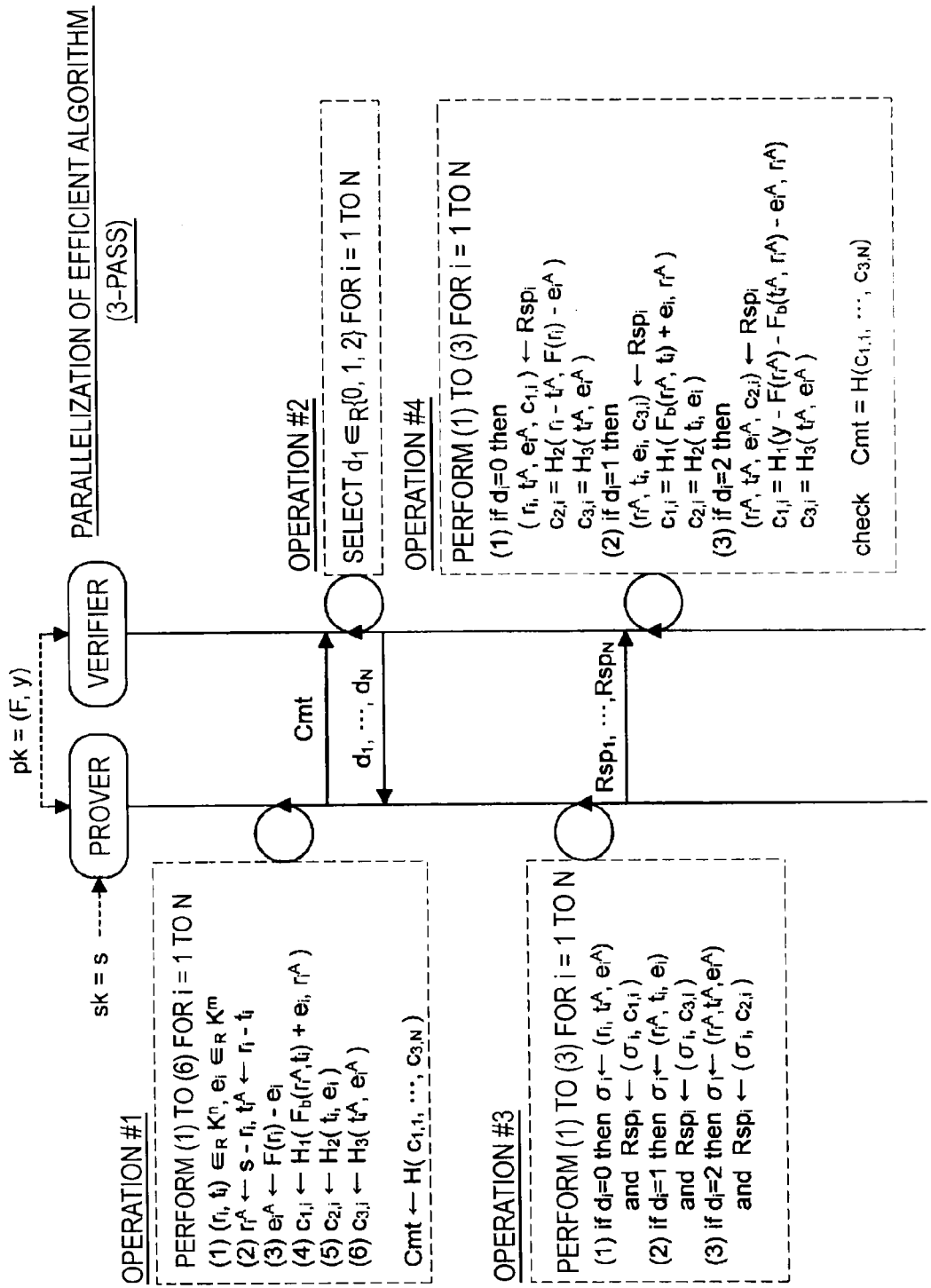
FIG. 11 is an explanatory diagram for describing parallelization of the public-key authentication scheme according to the same embodiment.

(Parallelization of the Efficient Algorithm: FIG. 11)

Next, a method of parallelizing the efficient algorithm will be described with reference to FIG. 11. The structure (hereinafter referred to as a "parallelized algorithm") illustrated in FIG. 11 is one in which the efficient algorithm related to the structure example 3 is parallelized.

Operation #1:

The prover algorithm P executes processes (1) to (6) for i=1 to N.

Process (1): The prover algorithm P arbitrarily generates the vectors $r_i$, $t_i$ that are elements of the set $K^n$, and the vector $e_i$ that is an element of the set $K^m$.

Process (2): The prover algorithm P calculates $r_i^A \leftarrow s - r_i$. This calculation is equivalent to masking the secret key s with the vector $r_1$. Additionally, the prover algorithm P calculates $t_i^A \leftarrow r_i + t_i$.

Process (3): The prover algorithm P calculates $e_i^A \leftarrow F(r_i) - e_i$.

Process (4): The prover algorithm P calculates $c_{1,i} \leftarrow H_1(F_b(r_i^A, t_i) + e_i, r_i^A)$.

Process (5): The prover algorithm P calculates $c_{2,i} \leftarrow H_2(t_i, e_i)$.

Process (6): The prover algorithm P calculates $c_{3,i} \leftarrow H_3(t_i^A, e_i^A)$.

Operation #1 (Continued):

After executing the above processes (1) to (6) for i=1 to N, the prover algorithm P calculates $Cmt \leftarrow H(c_{1,1}, c_{2,1}, c_{3,1}, \ldots, c_{1,N}, c_{2,N}, c_{3,N})$. $H(\ldots)$, $H_1(\ldots)$, $H_2(\ldots)$, and $H_3(\ldots)$ are hash functions. The hash value Cmt generated in operation #1 is sent to the verifier algorithm V. In this way, the message $(c_{1,1}, c_{2,1}, c_{3,1}, c_{1,N}, c_{2,N}, c_{3,N})$ is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $d_i$. The challenges $d_1, \ldots, d_N$ are sent to the prover algorithm P.

Operation #3:

Upon receiving the challenges $d_1, \ldots, d_N$, the prover algorithm P generates responses $Rsp_1, \ldots, Rsp_N$ to send to the verifier algorithm V in response to each of the received challenges $d_1, \ldots, d_N$. In the case where $d_i = 0$, the prover algorithm P generates $\sigma_i = (r_i, t_i^A, e_i^A)$. Further, the prover algorithm P generates $Rsp_i = (\sigma_i, c_{1,i})$ In the case where $d_i = 1$, the prover algorithm P generates $\sigma_i = (r_i^A, t_i, e_i)$. Further, the prover algorithm P generates $Rsp_i = (\sigma_i, c_{3,i})$. In the case where $Ch_i = 2$, the prover algorithm P generates $\sigma_i = (r_i^A, t_i^A, e_i^A)$. Further, the prover algorithm P generates $Rsp_i = (\sigma_i, c_{2,i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for $i=1$ to N, using the received responses $Rsp_1, \ldots, Rsp_N$. Herein, the verifier algorithm V executes the process (1) for the case where $d_i=0$, the process (2) in the case where $Ch_i=1$, and the process (3) in the case where $d_i=2$.

Process (1): In the case where $d_i=0$, the verifier algorithm V retrieves $(r_i, t_i^A, e_i^A, c_{1,i})$ from $Rsp_i$. Subsequently, the verifier algorithm V calculates $c_{2,i}=H_2(r_i-t_i^A, F(r_i)-e_i^A)$. In addition, the verifier algorithm V calculates $c_{3,i}=H_3(t_i^A, e_i^A)$. The verifier algorithm V then stores $(c_{1,i}, c_{2,i}, c_{3,i})$.

Process (2): In the case where $d_i=1$, the verifier algorithm V retrieves $(r_i^A, t_i, e_i, c_{3,i})$ from $Rsp_i$. Subsequently, the verifier algorithm V calculates $c_{1,i}=H_1(F_b(r_i^A, t_i)+e_i, r_i^A)$. In addition, the verifier algorithm V calculates $c_{2,i}=H_2(t_i, e_i)$. The verifier algorithm V then stores $(c_{1,i}, c_{2,i}, c_{3,i})$.

Process (3): In the case where $d_i=2$, the verifier algorithm V retrieves $(r_i^A, t_i^A, e_i^A, c_{2,i})$ from $Rsp_i$. Subsequently, the verifier algorithm V calculates $c_{1,i}=H_1(y-F(r_i^A)-F_b(t_i^A, r_i^A)-e_i^A, r_i^A)$. In addition, the verifier algorithm V calculates $c_{3,i}=H_3(t_i^A, e_i^A)$. The verifier algorithm V then stores $(c_{1,i}, c_{2,i}, c_{3,i})$.

After executing the above processes (1) to (3) for $i=1$ to N, the verifier algorithm V verifies whether or not the equality of $Cmt=H(c_{1,1}, c_{2,1}, c_{3,1}, \ldots, c_{1,N}, c_{2,N}, c_{3,N})$ holds. The verifier algorithm V outputs the value 1 to indicate authentication success in the case where the verification succeeds, and outputs the value 0 to indicate authentication failure in the case where the verification fails.

The parallelization of the efficient algorithm has been described above. The parallelized algorithm illustrated in FIG. 11 includes include a contrivance in which a message is converted into a hash value before being sent. This contrivance improves communication efficiency.

[2-6: Modification into Digital Signature Scheme]

Here, a method of modifying the public-key authentication scheme according to the present technique into a digital signature scheme will be introduced. When a prover in a model of a public-key authentication scheme matches a signer in a digital signature scheme, an approximation to the model of the digital signature scheme can easily be understood in that only a prover can convince a verifier. Based on this idea, a method of modifying the public-key authentication scheme according to the present technology into a digital signature scheme will be descried.

(2-6-1: Transforming Method)

Figure 12:
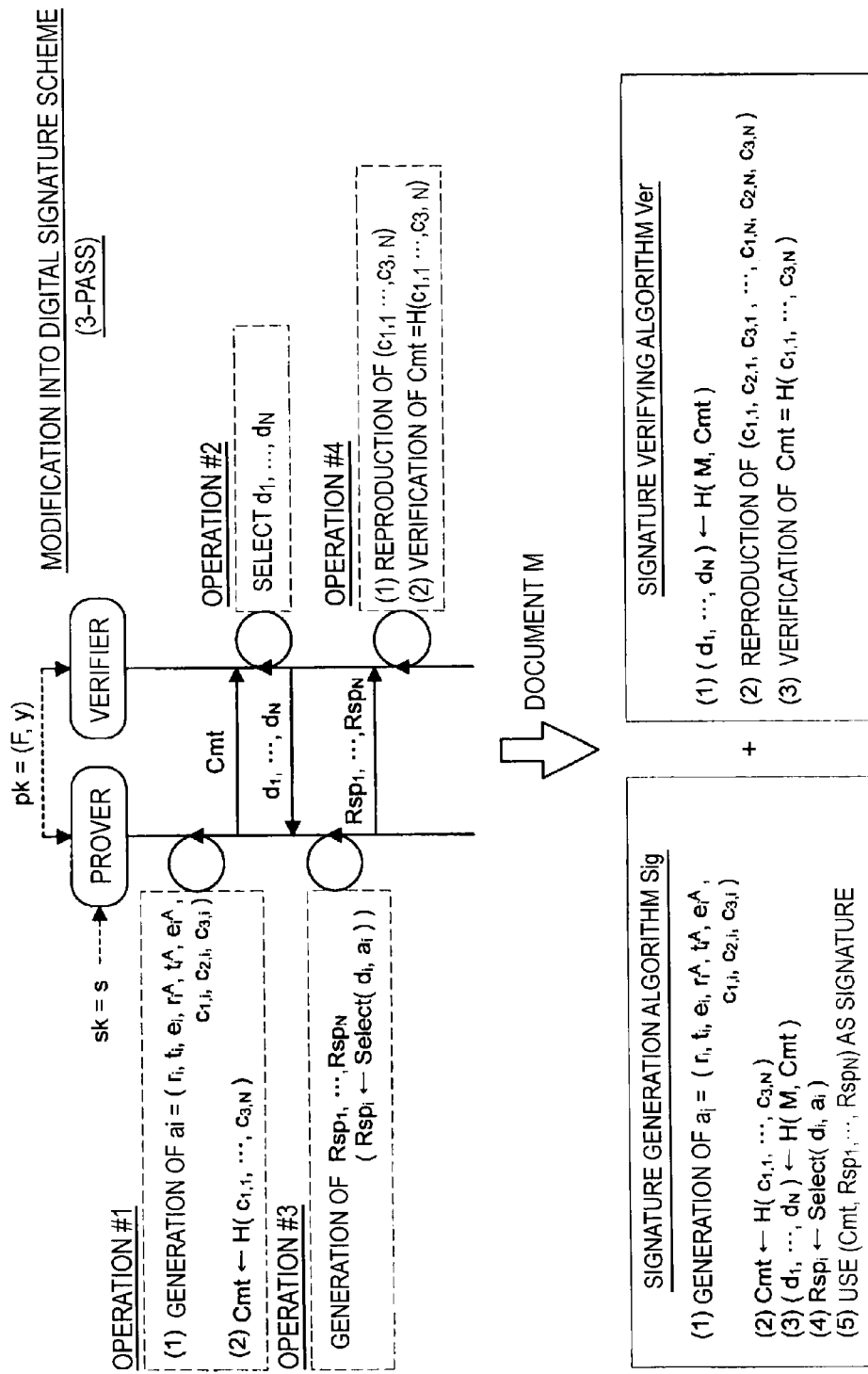
FIG. 12 is an explanatory diagram for describing a method of transforming the efficient algorithm of the public-key authentication scheme according to the same embodiment into an algorithm of a digital signature scheme.

Here, a method of transforming the structure example 3 of the efficient algorithm into the algorithm of the digital signature scheme will be described as an example. The algorithm of the structure example 3 is roughly expressed by the following four operations #1 to #4 as illustrated in FIG. 12.

Operation #1 includes a process (1) of generating $a_i=(r_i, t_i, e_i, r_i^A, t_i^A, e_i^A, c_{1,i}, c_{2,i}, c_{3,i})$ and a process (2) of calculating $Cmt \leftarrow H(c_{1,1}, c_{2,1}, c_{3,1}, \ldots, c_{1,N}, c_{2,N}, c_{3,N})$. Cmt generated in operation #1 by the prover algorithm P is sent to the verifier algorithm V.

Operation #2 includes a process of selecting $d_1, \ldots, d_N$. $d_1, \ldots, d_N$ selected in operation #2 by the verifier algorithm V are sent to the prover algorithm P.

Operation #3 includes a process of generating $Rsp_1, \ldots, Rsp_N$ using $d_1, \ldots, d_N$ and $a_1 \ldots, a_N$. This process is expressed as $Rsp_i \leftarrow Select(d_i, a_i)$. $Rsp_1, \ldots, Rsp_N$ generated in operation #3 by the prover algorithm P are sent to the verifier algorithm V.

Operation #4 includes a process (1) of reproducing $c_{1,1}, c_{2,1}, c_{3,1}, \ldots, c_{1,N}, c_{2,N}, c_{3,N}$ using $d_1, \ldots, d_N$ and $Rsp_1, \ldots, Rsp_N$ and a process (2) of verifying $Cmt=H(c_{1,1}, c_{2,2}, c_{3,3}, \ldots, c_{1,N}, c_{2,N}, c_{3,N})$ using the reproduced $c_{1,1}, c_{2,1}, c_{3,1}, \ldots, c_{1,N}, c_{2,N}, c_{3,N}$.

The algorithm of the public-key authentication scheme expressed with the foregoing operation #1 to operation #4 is modified into a signature generation algorithm Sig and a signature verifying algorithm Ver illustrated in FIG. 12.

(Signature Generation Algorithm Sig)

First, the structure of the signature generation algorithm Sig will be described. The signature generation algorithm Sig includes the following processes (1) to (5).

Process (1): The signature generation algorithm Sig generates $a_i=(r_i, t_i, e_i, r_i^A, t_i^A, e_i^A, c_{1,i}, c_{2,i}, c_{3,i})$.

Process (2): The signature generation algorithm Sig calculates $Cmt \leftarrow H(c_{1,1}, c_{2,1}, c_{3,1}, \ldots, c_{1,N}, c_{2,N}, c_{3,N})$. Here, M is a document to which a signature is attached.

Process (3): The signature generation algorithm Sig calculates $(d_1, \ldots, d_N) \leftarrow H(M, Cmt)$. Here, M is a document to which a signature is attached.

Process (4): The signature generation algorithm Sig calculates $Rsp_i \leftarrow Select(d_i, a_i)$.

Process (5): The signature generation algorithm Sig sets $(Cmt, Rsp_1, \ldots, Rsp_N)$ as a signature.

(Signature Verifying Algorithm Ver)

Next, the structure of the signature verifying algorithm Ver will be described. The signature verifying algorithm Ver includes the following processes (1) to (3).

Process (1): The signature verifying algorithm Ver calculates $(d_1, \ldots, d_N) \leftarrow H(M, Cmt)$.

Process (2): The signature verifying algorithm Ver generates $c_{1,1}, c_{2,1}, c_{3,1}, \ldots, c_{1,N}, c_{2,N}, c_{3,N}$ using $d_1, \ldots, d_N$ and $Rsp_1, \ldots, Rsp_N$.

Process (3): The signature verifying algorithm Ver verifies $Cmt=H(c_{1,1}, c_{2,1}, c_{3,1}, \ldots, c_{1,N}, c_{2,N}, c_{3,N})$ using the reproduced $c_{1,1}, c_{2,1}, c_{3,1}, \ldots, c_{1,N}, c_{2,N}, c_{3,N}$.

As described above, by matching the prover in the model of the public-key authentication scheme with the signer in the digital signature scheme, the algorithm of the public-key authentication scheme can be modified into the algorithm of the digital signature scheme.

(2-6-2: Streamlining of Digital Signature Algorithm)

Figure 13:
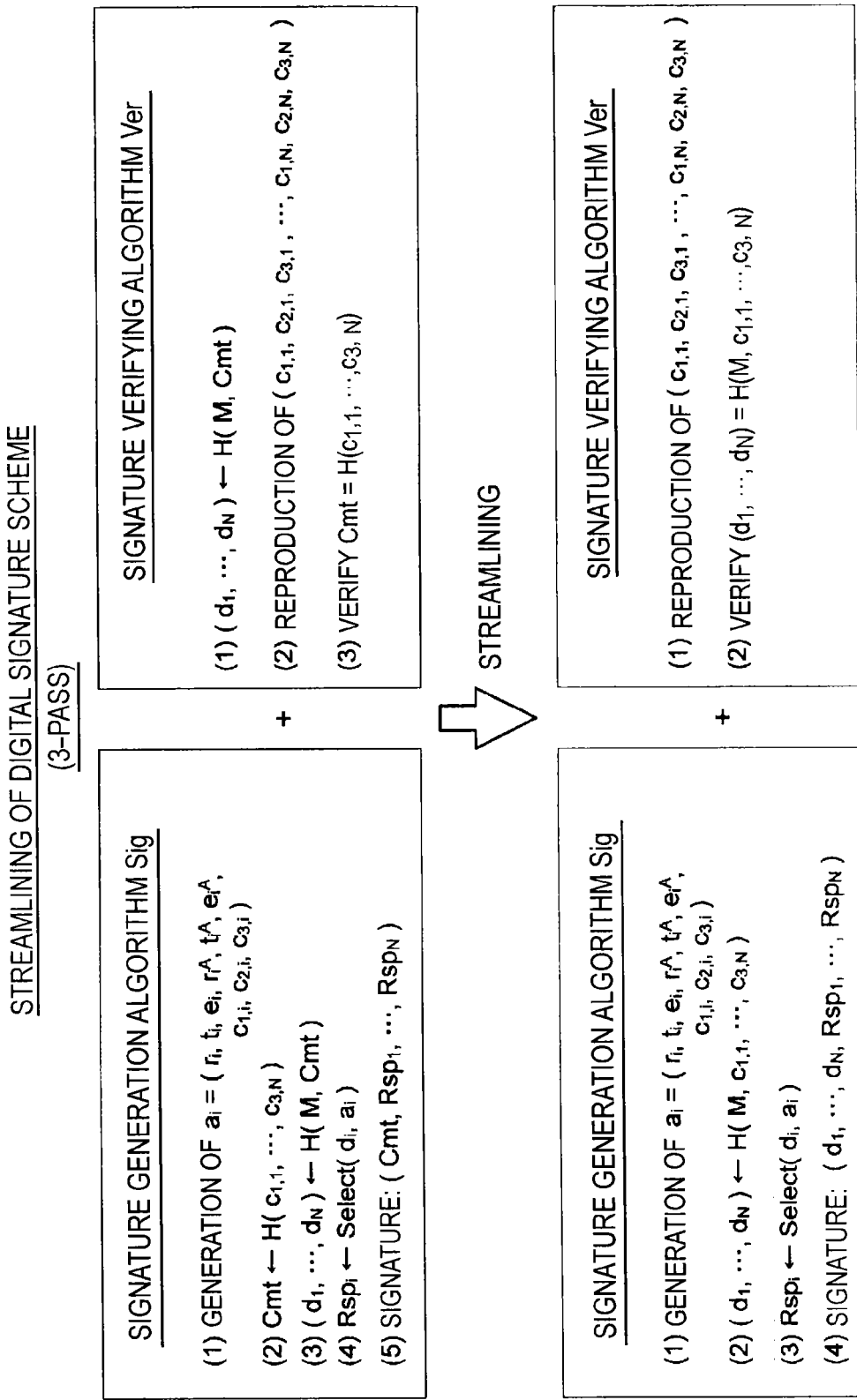
FIG. 13 is an explanatory diagram for describing a method of transforming the efficient algorithm of the public-key authentication scheme according to the same embodiment into an algorithm of an efficient digital signature scheme.

Here, when the structure of the signature generation algorithm Sig illustrated in FIG. 13 is focused on, it can be realized that calculation of a hash value has been performed in the processes (2) and (3). Further, when the structure of the signature verifying algorithm Ver is focused on, it can be realized that the same calculation of a hash value as the process (3) of the signature generation algorithm Sig has been performed in the process (1). When the configurations of the signature generation algorithm Sig and the signature verifying algorithm Ver are improved focusing on these processes, as illustrated in FIG. 13, calculation efficiency can be further improved.

(Signature Generation Algorithm Sig)

First, the improved structure of the signature generation algorithm Sig will be described. The signature generation algorithm Sig includes the following processes (1) to (4).

Process (1): The signature generation algorithm Sig generates $a_i=(r_i, t_i, e_i, r_i^A, t_i^A, e_i^A, c_{1,i}, c_{2,i}, c_{3,i})$.

Process (2): The signature generation algorithm Sig calculates $(d_1, \ldots, d_N) \leftarrow H(M, c_{1,1}, c_{2,2}, c_{3,3}, \ldots, c_{1,N}, c_{2,N}, c_{3,N})$. Here, M is a document to which a signature is attached.

Process (3): The signature generation algorithm Sig calculates $Rsp_i \leftarrow Select(d_i, a_i)$.

Process (4): The signature generation algorithm Sig sets $(d_1, \ldots, d_N, Rsp_1, \ldots, Rsp_N)$ as a signature.

(Signature Verifying Algorithm Ver)

Next, the structure of the improved signature verifying algorithm Ver will be described. The signature verifying algorithm Ver includes the following processes (1) and (2).

Process (1): The signature verifying algorithm Ver generates $c_{1,1}, c_{2,2}, c_{3,3}, \ldots, c_{1,N}, c_{2,N}, c_{3,N}$ using $d_1, \ldots, d_N$ and $Rsp_1, \ldots, Rsp_N$.

Process (2): The signature verifying algorithm Ver verifies $(d_1, \ldots, d_N) = H(M, c_{1,1}, c_{2,1}, c_{3,1}, \ldots, c_{1,N}, c_{2,N}, c_{3,N})$ using the reproduced $c_{1,1}, c_{2,1}, c_{3,1}, \ldots, c_{1,N}, c_{2,N}, c_{3,N}$.

By improving the structures of the signature generation algorithm Sig and the signature verifying algorithm Ve, as described above, the calculation of a hash value in each algorithm is reduced by one time. As a result, calculation efficiency can be further improved.

[2-7: Form of Multi-Order Multivariate Simultaneous Equation]

As described above, the present technique is a scheme in which the security is based on the difficulty in solving the multi-order multivariate simultaneous equation. Further, the feature of the present technique lies in that a complicated multi-order multivariate simultaneous equation can be used. In the above description, there is no special limitation to the form of the multi-order multivariate simultaneous equation, but it is desirable to use a multi-order multivariate simultaneous equation including an encryption element technique in which the difficulty is sufficiently compensated in an expression. Next, a specific example of a multi-order multivariate simultaneous equation to which the present technique can be applied will be introduced.

(2-7-1: Form Related to Common Key Block Cipher)

A common key block cipher technique such as ES, DES, or KATAN is an element technique which is frequently analyzed and high in security and reliability. The common key block cipher can be expressed by a multi-order multivariate simultaneous equation having a key, a plain text, and a cipher text of a common key block cipher as variables. In the multi-order multivariate simultaneous equation, when values are given to the variables representing the plain text and the cipher text, the multi-order multivariate simultaneous equation becomes an equation having only a variable representing a key as a variable.

Solving the multi-order multivariate simultaneous equation expressing the common key block cipher corresponds to restoring the key of the common key block cipher from the plain text and the cipher text. In other words, as long as the security of the common key block cipher is maintained, the difficulty in finding a solution of the multi-order multivariate simultaneous equation expressing the common key block cipher is secured. For this reason, when a multi-order multivariate simultaneous equation expressing a certain common key block cipher scheme is applied to the present technique, a public-key authentication scheme having the security equivalent to the security of the common key block cipher scheme is implemented.

Here, when the common key block cipher is expressed by a multi-order multivariate simultaneous equation having variables such as a key, a plain text, and a cipher text, since an order of a polynomial increases, the size of data for expressing a simultaneous equation increases. In this regard, a variable representing an internal state in each round is introduced in addition to a key, a plain text, and a cipher text. By introducing this variable, it is possible to reduce the order of the multi-order multivariate simultaneous equation expressing the common key block cipher. For example, appropriate values are substituted for the variables representing the plain text and the cipher text, and a simultaneous equation related to the key and the variable representing the internal state is introduced. When this method is employed, the number of variables increases, but the order decreases, and thus an expression of the simultaneous equation becomes compact.

(2-7-2: Form Related to Hash Function)

Similarly, a multi-order multivariate simultaneous equation related to a hash function such as SHA-1 or SHA-256 can be applied to the present technique. The hash function can be expressed by a multi-order multivariate simultaneous equation having a message which is an input of the hash function and a hash value which is an output thereof as variables. In the multi-order multivariate simultaneous equation, when an appropriate value is given to the variable representing the hash value, a multi-order multivariate simultaneous equation related to a variable representing a corresponding input is obtained.

Solving the multi-order multivariate simultaneous equation corresponds to restoring a value of a message serving as the basis from the hash value. In other words, as long as the security (unidirectional characteristic) of the hash function is maintained, the difficulty in solving the multi-order multivariate simultaneous equation expressing the hash function is guaranteed. For this reason, when a multi-order multivariate simultaneous equation expressing a certain hash function is applied to the present technique, a public-key authentication scheme based on the security of the hash function is implemented.

Here, when a hash function is expressed by a multi-order multivariate simultaneous equation having an input message and a hash value as variables, since an order of a polynomial increases, the size of data expressing a simultaneous equation increases. In this regard, a variable representing an internal state is introduced in addition to an input message and a hash value. By introducing this variable, it is possible to reduce an order of a multi-order multivariate simultaneous equation expressing a hash function. For example, an appropriate value is substituted for the variable representing the hash value, and a simultaneous equation related to the input message and the variable representing the internal state is introduced. When this method is employed, the number of variables increases, but the order decreases, and thus an expression of the simultaneous equation becomes compact (2-7-3: Form Related to Stream Cipher)

Similarly, a multi-order multivariate simultaneous equation related to a stream cipher such as Trivium can be applied to the present technique. The stream cipher can be expressed by a multi-order multivariate simultaneous equation related to a variable representing an initial internal state of the stream cipher and a variable representing a stream to be output. In this case, when an appropriate value is given to the variable representing the output stream, a multi-order multivariate simultaneous equation related to a variable representing a corresponding initial internal state is obtained.

Solving the multi-order multivariate simultaneous equation corresponds to restoring a variable representing an initial internal state serving as a basis from a value of an output stream. In other words, as long as the security of the stream cipher is guaranteed, the difficulty in solving the multi-order multivariate simultaneous equation expressing the stream cipher is secured. For this reason, when a multi-order multivariate simultaneous equation expressing a certain stream cipher is applied to the present technique, a public-key authentication scheme based on the security of the stream cipher is implemented.

Here, when a stream cipher is expressed by a multi-order multivariate simultaneous equation having an initial internal state and an output stream as variables, an order of a polynomial increases, and thus the size for expressing a simultaneous equation increases. In this regard, a variable representing an internal state in each round is introduced in addition to an initial internal state and an output stream. By introducing this variable, it is possible to reduce an order of a multi-order multivariate simultaneous equation expressing a stream cipher. For example, when an appropriate value is substituted for the variable representing the output stream, a simultaneous equation related to the initial internal state and the variable representing the internal state in a round is introduced. When this method is employed, the number of variables increases, but the order decreases, and thus an expression of the simultaneous equation becomes compact.

The specific examples of the multi-order multivariate simultaneous equations applicable to the present technique have been described above.

[2-8: Serial Parallel Hybrid Algorithm]

In order to make a probability of a successful forgery negligibly small, the interactive protocol needs to be performed multiple times as described above.

Further, as the method of performing the interactive protocol multiple times, the serial method and the parallel method have been introduced. Particularly, the parallel method has been described in connection with the specific parallelized algorithm. Here, a hybrid type algorithm in which the serial method is combined with the parallel method will be introduced.

(Hybrid Structure 1)

Figure 14:
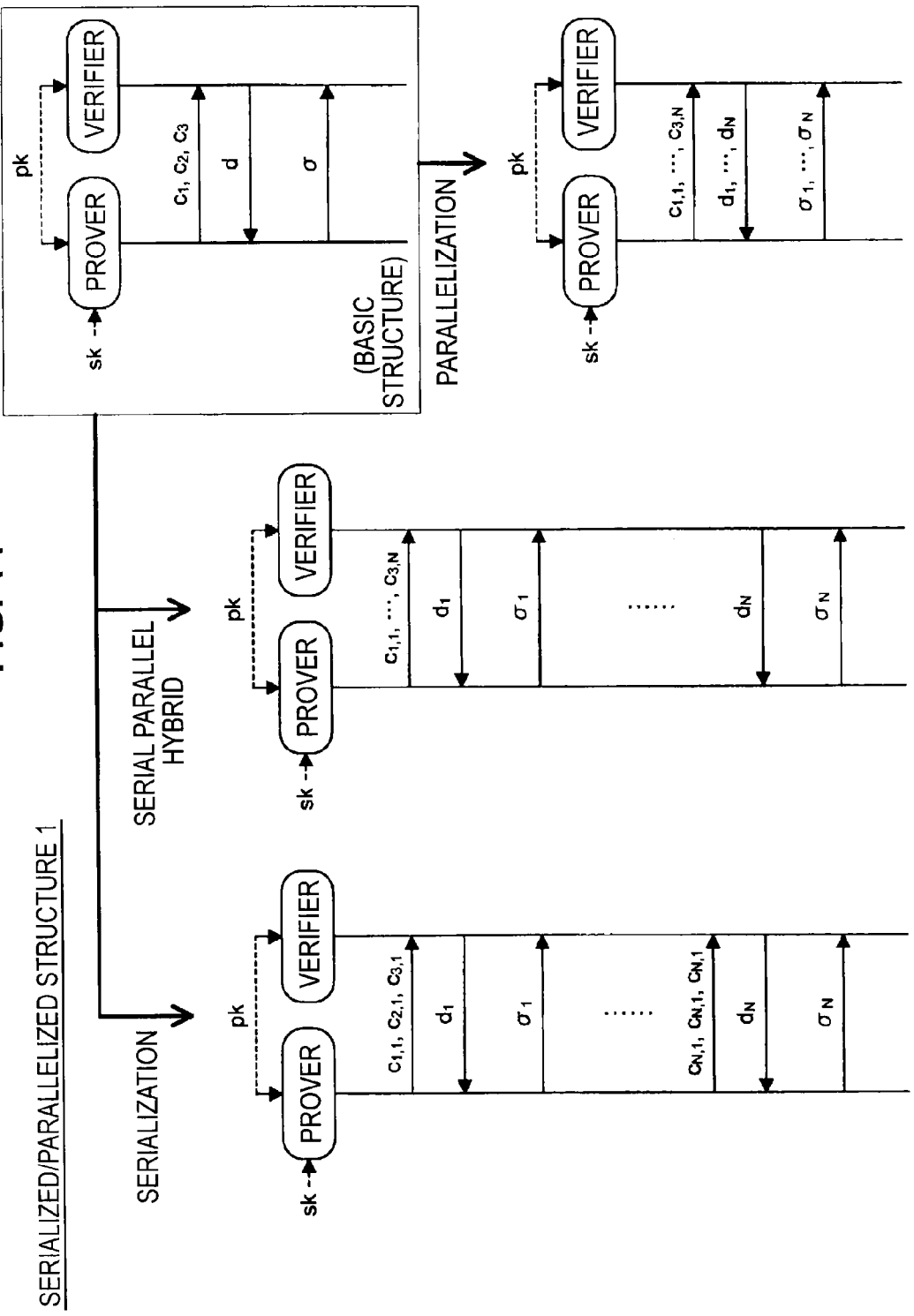
FIG. 14 is an explanatory diagram for describing a parallel serial structure of the efficient algorithm of the public-key authentication scheme according to the same embodiment.

A hybrid type algorithm (hereinafter referred to as a "parallel serial algorithm") will be described with reference to FIG. 14. FIG. 14 illustrates a basic structure of the present technique, a serialized algorithm in which the basic structure is serialized, a parallelized algorithm in which the basic structure is parallelized, and a parallel serial algorithm.

In the basic structure, at the first pass, a message $(c_1, c_2, c_3)$ is sent from the prover to the verifier. At the second pass, the challenge d is sent from the verifier to the prover. At the third pass, the response $\sigma$ is sent from the prover to the verifier.

When the basic structure is parallelized, at the first pass, messages $(c_{1,1}, c_{2,1}, c_{3,1}, \ldots, c_{1,N}, c_{2,N}, c_{3,N})$ of N times are sent from the prover to the verifier. At the second pass, challenges $(d_1, \ldots, d_N)$ of N times are sent from the verifier to the prover. At the third pass, responses $(\sigma_1, \ldots, \sigma_N)$ of N times are sent from the prover to the verifier. The parallelized algorithm related to the present technique guarantees the security against the passive attack. Further, the number of interactivities is merely three times. Further, since messages of N times sent at the first pass are collected with one hash value, the communication efficiency can be improved.

Meanwhile, when the basic structure is serialized, at the first pass, the message $(c_{1,1},c_{2,1},c_{3,1})$ of one time is sent from the prover to the verifier. At the second pass, the challenge $d_1$ of one time is sent from the verifier to the prover. At the third pass, the response $\sigma_1$ of one time is sent from the prover to the verifier. At the fourth pass, the message $(c_{1,2},c_{2,2},c_{3,2})$ of one time is sent from the prover to the verifier. At the fifth pass, the challenge $d_2$ of one time is sent from the verifier to the prover. At the sixth pass, the response $\sigma_2$ of one time is sent from the prover to the verifier. Similarly, the interactivity is repetitively performed until the response $\sigma_N$ is sent from the prover to the verifier. The serialized algorithm guarantees the security against the active attack. Further, it is possible to prove that the forgery possibility is reliably reduced.

Further, the parallel serial algorithm is an algorithm having characteristics of the parallelized algorithm and characteristics of the serialized algorithm. In the parallel serial algorithm illustrated in FIG. 14, at the first pass, messages $(c_{1,1}, c_{2,1}, c_{3,1}, \ldots, c_{1,N}, c_{2,N}, c_{3,N})$ of N times are sent from the prover to the verifier. At the second pass, the challenge $d_1$ of one time is sent from the verifier to the prover. At the third pass, the response $\sigma_1$ of one time is sent from the prover to the verifier. Accordingly, the challenge $d_2, \ldots, d_N$ and the response $\sigma_2, \ldots, \sigma_N$ are exchanged between the prover and the verifier.

The parallel serial algorithm based on the present technique guarantees the security against the passive attack. Further, the number of interactivities is merely 2N+1. Further, as messages of N times to be sent at the first pass are converted into one hash value, the communication efficiency can be improved.

(Hybrid Structure 2)

Figure 15:
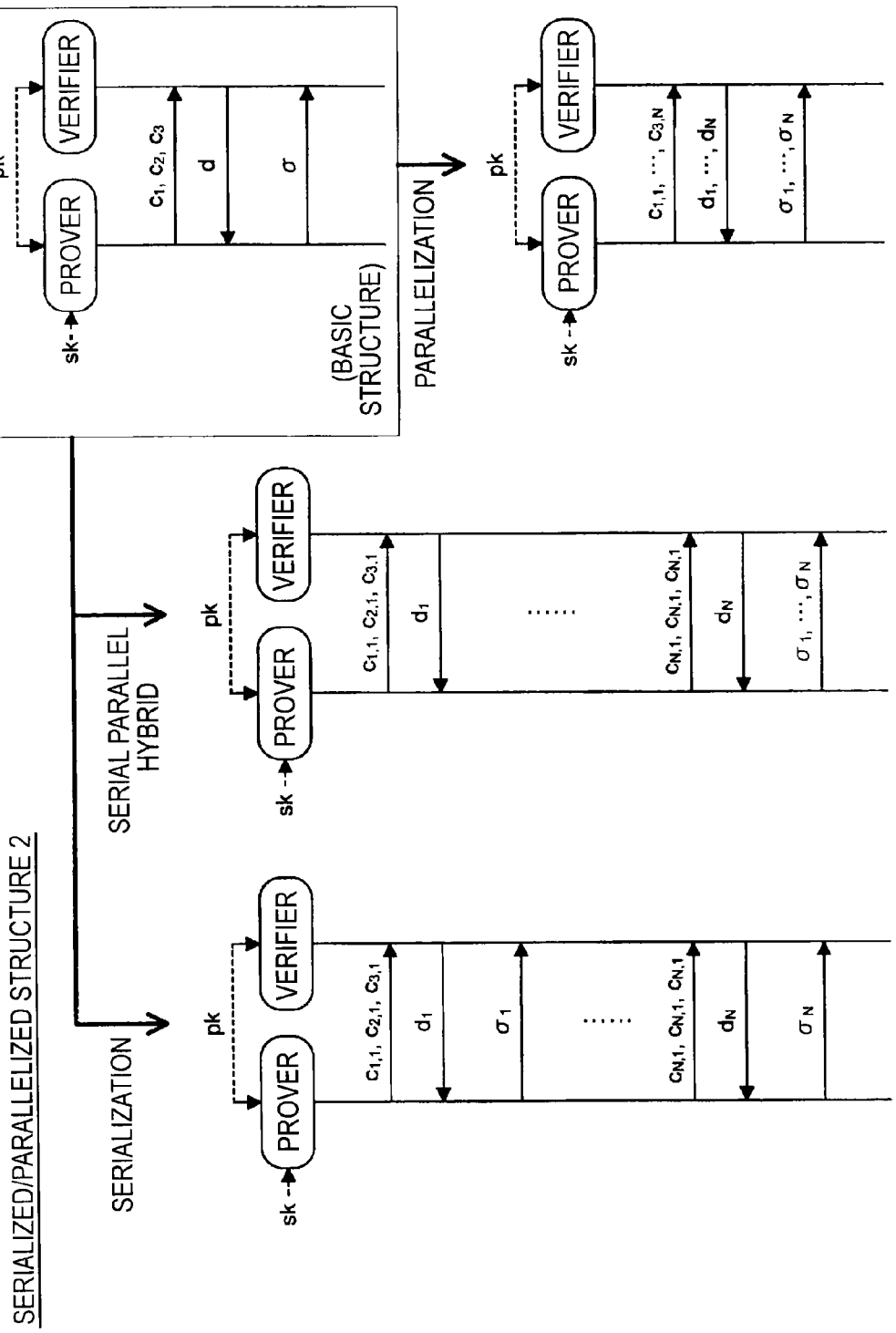
FIG. 15 is an explanatory diagram for describing a serial parallel structure of the efficient algorithm of the public-key authentication scheme according to the same embodiment.

Another hybrid type algorithm (hereinafter referred to as a "serial parallel algorithm") will be described with reference to FIG. 15. FIG. 15 illustrates a basic structure related to the present technique, a serialized algorithm in which the basic structure is serialized, a parallelized algorithm in which the basic structure is parallelized, and a serial parallel algorithm. The structures and characteristics of the basic structure, the serialized algorithm, and the parallelized algorithm are the same as described above.

The serial parallel algorithm illustrated in FIG. 15 is an algorithm having both the characteristics of the parallelized algorithm and the characteristics of the serialized algorithm. In the serial parallel algorithm illustrated in FIG. 15, at the first pass, a message $(c_{1,1},c_{2,1},c_{3,1})$ of one time is sent from the prover to the verifier. At the second pass, a challenge $d_1$ of one time is sent from the verifier to the prover. Thereafter, messages $(c_{1,2}, c_{2,2}, c_{3,2}), \ldots, (c_{1,N}, c_{2,N}, c_{3,N})$ and challenges $d_2, \ldots, d_N$ are exchanged between the prover and the verifier. After the challenge $d_N$ is sent from the verifier to the prover, the responses $\sigma_1, \ldots, \sigma_N$ of N times are sent from the prover to the verifier.

The serial parallel algorithm based on the present technique guarantees the security against the active attack. Further, the number of interactivities is merely 2N+1.

The hybrid type algorithm based on the present technique has been described above.

The first embodiment of the present technology has been described above.

<3: Second Embodiment>

Next, a second embodiment of the present technology will be described. The 3-pass public-key authentication scheme has been described until now. In the present embodiment, a 5-pass public-key authentication scheme (hereinafter referred to as a "present technique") will be described. The present technique is a scheme of securing soundness of the public-key authentication scheme by setting 2q verification patterns of the verifier.

In the 3-pass public-key authentication scheme according to the first embodiment, the probability of the false verification per one interactive protocol is ⅔, but in the present technique, the probability of the false verification per one interactive protocol is $\frac{1}{2}+1/q$ as will be described later. Here, q is an order of a ring to be used. Thus, when the order of the ring is sufficiently large, as illustrated in FIG. 39, according to the present technique, the probability of the false verification each time can be reduced, and the probability of the false verification can be sufficiently reduced by executing the interactive protocol a small number of times.

The interactive protocol related to the 5-pass public-key authentication scheme may be considered to be lower in efficiency than the interactive protocol related to the 3-pass public-key authentication scheme. However, in the 5-pass public-key authentication scheme, when the order of the ring is sufficiently large, the probability of the false verification per one interactive protocol is close to $\frac{1}{2}$, and thus a small number of executions of the interactive protocol is necessary for achieving the same security level.

For example, when the probability of the false verification is desired to be equal to or less than $\frac{1}{2}^n$, the interactive protocol has to be executed $n/(\log 3-1)=1.701n$ times or more in the 3-pass public-key authentication scheme. On the other hand, the interactive protocol has to be executed $n/(1-\log(1+1/q))$ times or more in the 5-pass public-key authentication scheme. Accordingly, as illustrated in FIG. 39, when q=24, communication traffic necessary to realize the same security level is less in the 5-pass public-key authentication scheme than in the 3-pass public-key authentication scheme.

[3-1: Algorithm of Public-Key Authentication Scheme]

Next, an algorithm structure related to the 5-pass public-key authentication scheme (the present technique) will be described with reference to FIG. 16. FIG. 16 is an explanatory diagram for describing a structure of the algorithm according to the present technique.

(Key Generation Algorithm Gen)

The key generation algorithm Gen generates m of multivariate polynomials $f_1(x_1, \ldots, x_n), \ldots, f_m(x_1, \ldots, x_n)$ defined in a ring k and a vector $s=(s_1, \ldots, s_n)$ that is an element of the set $K^n$. Next, the key generation algorithm Gen calculates $y=(y_1, \ldots, y_m)\leftarrow(f_1(s), \ldots, f_m(s))$. Also, the key generation algorithm Gen sets $(f_1, \ldots, f_m, y)$ as the public key pk and sets s as the secret key. Hereinafter, a vector $(x_1, \ldots, x_n)$ is represented by x and a set of multivariate polynomials $(f_1(x), \ldots, f_m(x))$ is represented by $F(x)$.

(Prover Algorithm P, Verifier Algorithm V)

Next, processes performed by the prover algorithm P and the verifier algorithm V during the interactive protocol will be described with reference to FIG. 16. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 16.

Operation #1:

First of all, the prover algorithm P arbitrarily selects a number w. Next, the prover algorithm P generates a vector r which is an element of the set $K^n$ and a pair of n-variant polynomials $F^A(x)=(f_1^A(x), \ldots, f_m^A(x))$ by applying the number w to a pseudo-random number generator G. That is, the prover algorithm P calculates $(r, F^A)\leftarrow G(w)$. Subsequently, the prover algorithm P calculates $z\leftarrow s-r$. This calculation is equivalent to masking the secret key s with the vector r.

Operation #1 (Continued):

Next, the prover algorithm P generates a hash value $c_1$ of $F^A(z)$ and z. In other words, the prover algorithm P calculates $c_1\leftarrow H_1(F^A(z),z)$. Further, the prover algorithm P generates a hash value $c_2$ of the number w. In other words, the prover algorithm P calculates $c_2\leftarrow H_2(w)$. $H_1(\ldots)$ and $H_2(\ldots)$ are hash functions. The message $(c_1,c_2)$ generated in operation #1 is sent to the verifier. At this time, it should be noted that information related to s, information related to r, and information related to z are not leaked to the verifier at all.

Operation #2:

The verifier algorithm V randomly selects one number $\alpha$ from the origins of q rings K and sends the selected number $\alpha$ to the prover algorithm P.

Operation #3:

Upon receiving the number $\alpha$, the prover algorithm P calculates $F^B(x)\leftarrow \alpha F(x+r)+F^A(x)$. This calculation is equivalent to masking the multivariate polynomial $F(x+r_0)$ for x with the multivariate polynomial $F^A(x)$. The multivariate polynomial $F^B$ generated in operation #3 is sent to the verifier algorithm V. At this time, it should be noted that the information on z is not at all leaked to the verifier in the case where d=0, and the information on r is not at all leaked to the verifier in the case where d=1.

Operation #4:

Upon receiving the multivariate polynomial $F^B$, the verifier algorithm V selects which verification pattern to use from between two verification patterns. For example, the verifier algorithm V may select a numerical value from between two numerical values {0, 1} representing verification patterns, and set the selected numerical value in a challenge d. This challenge d is sent to the prover algorithm P.

Operation #5:

Upon receiving the challenge d, the prover algorithm P generates a response $\sigma$ to send to the verifier algorithm V in response to the received challenge d. In the case where d=0, the prover algorithm P generates a response $\sigma=w$. In the case where d=1, the prover algorithm P generates a response $\sigma=z$. The response $\sigma$ generated in operation #5 is sent to the verifier algorithm V.

Operation #6:

Upon receiving the response $\sigma$, the verifier algorithm V executes the following verification process using the received response $\sigma$.

In the case where d=0, the verifier algorithm V calculates $(r^A, F^C)\leftarrow G(\sigma)$. Then, the verifier algorithm V verifies whether or not the equality of $c_2=H_2(\sigma)$ holds. In addition, the verifier algorithm V verifies whether or not the equality of $F^B(x)=\alpha F(x+r^A)+F^C(x)$ holds. The verifier algorithm V outputs the value 1 to indicate authentication success in the case where these verifications all succeed, and outputs the value 0 to indicate authentication failure in the case where a verification fails.

In the case where d=1, the verifier algorithm V sets $z^A\leftarrow \sigma$. Also, the verifier algorithm V verifies whether or not the equality of $c_1=H_1(F^C(z^A)-\alpha y, z^A)$ holds. The verifier algorithm V outputs the value 1 to indicate authentication success in the case where these verifications all succeed, and outputs the value 0 to indicate authentication failure in the case where a verification fails.

The example of the each algorithm structure related to the present technique has been described above.

(Soundness According to the Present Technique)

The soundness of the present technique is ensured from the fact that $F_1^D, F_2^D, F^C, r^A$ and $z^A$ satisfying the following formula (15) to formula (17) can be calculated from the content of a response when the prover algorithm P appropriately makes the response to the challenge d=0 and 1 with respect to $(c_1, c_2)$ and two $(\alpha 1, \alpha 2)$ selected by the verifier algorithm V

[Math 12]

$$F_1^D(x) = \alpha_1 F(x+r^A) + F^C(x) \tag{15}$$

$$F_2^D(x) = \alpha_2 F(x+r^A) + F^C(x) \tag{16}$$

$$F_1^D(z^A) - \alpha_1 y = F_2^D(z^A) - \alpha_2 y \tag{17}$$

By ensuring the foregoing soundness of the present technique, the fact that forgery with a probability higher than $\frac{1}{2}+1/q$ is not possible is ensured as long as the problem of solving the multi-order multivariate simultaneous equations is not solved. That is, to appropriately make the response to all of the challenges d=0 and 1 of the verifier, the falsifier has to calculate $F_1^D$, $F_2^D$, $F^C$, $r^A$ and $z^A$ satisfying the foregoing formula (15) and formula (17). In other words, the falsifier has to calculate s satisfying F(s)=y. Accordingly, the falsifier may not succeed the forgery with a probability higher than $\frac{1}{2}+1/q$ as long as the problem of solving the multi-order multivariate simultaneous equations is not solved. Further, by repeatedly executing the foregoing interactive protocol a sufficiently large number of times, the probability of a successful forgery becomes negligibly small.

(Modified Example)

The key generation algorithm Gen calculates y<-F(s), and sets (F,y) as the public key. However, the key generation algorithm Gen may be configured to set $(y_1, \ldots, y_m)$<-F(s), calculate $(f_1^*(x), \ldots, f_m^*(x))$<-$(f_1(x)-y_1, \ldots, f_m(x)-y_m)$, and set $(f_1^*, \ldots, f_m^*)$ as the public key. In the case of this modification, the interactive protocol can be performed at y=0 between the prover algorithm P and the verifier algorithm V.

Further, the prover algorithm P may separately calculate a hash value of $F^B(z)$ and a hash value of z and send each hash value to the verifier as a message.

Further, the prover algorithm P applies the number w to the pseudo random number generator $G_1$ and generates the vector r and the number $w^A$. Further, the prover algorithm P applies the number $w^A$ to the pseudo random number generator $G_2$ and generates the multivariate polynomial $F^A(x)$. However, the prover algorithm P may be configured to perform identity mapping on $G_1$ and calculate $w=(r,F^A)$ from the beginning. In this case, the number w need not be applied to $G_1$. This is similarly applied to $G_2$.

The modified example of the present technique has been described above.

[3-2: Extended Algorithm]

Figure 17:
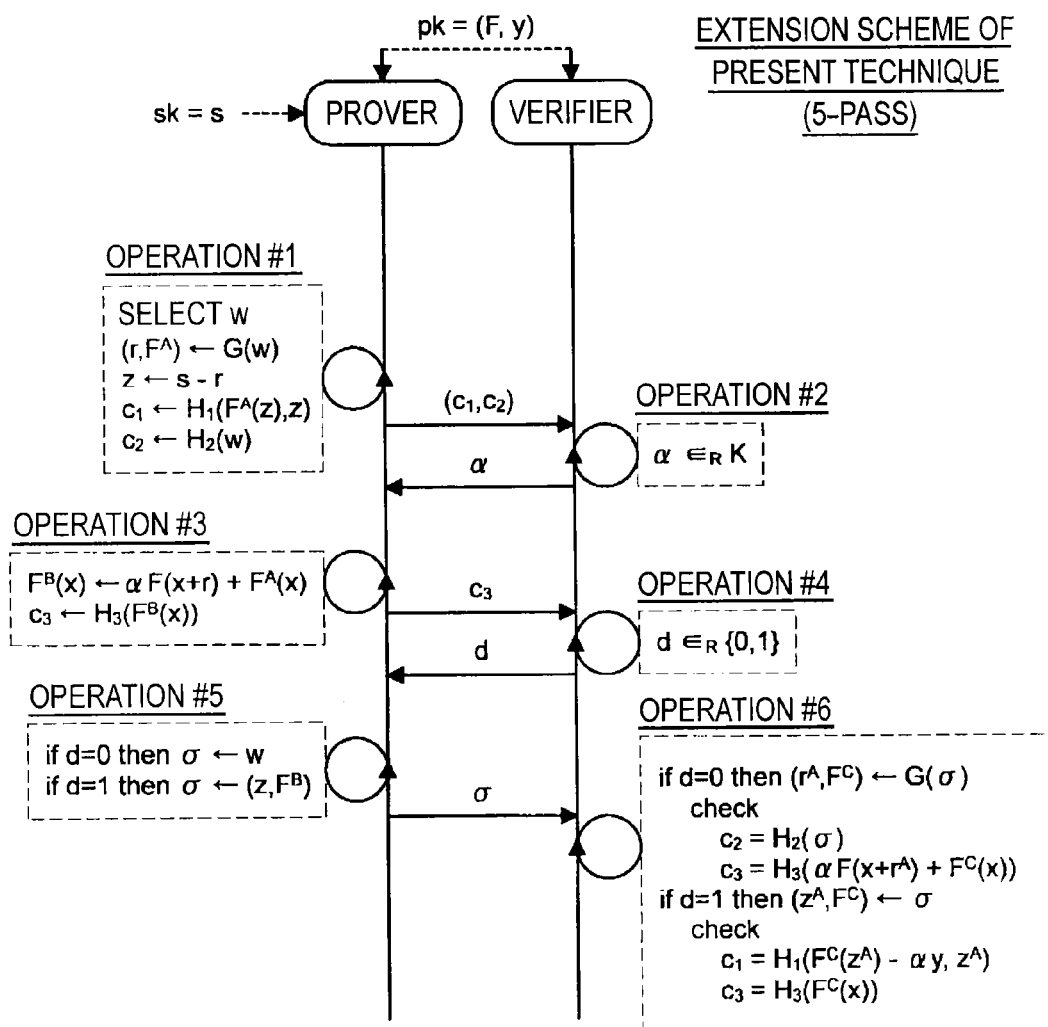
FIG. 17 is an explanatory diagram for describing an extended algorithm of the public-key authentication scheme according to the same embodiment.

Next, an algorithm of a public-key authentication scheme (hereinafter referred to as an "extended technique") extended from the present technique will be described with reference to FIG. 17. FIG. 17 is an explanatory diagram for describing the flow of the interactive protocol based on the extended technique.

The extended technique described herein is a scheme of converting the multivariate polynomial $F^B$ to be sent at the third pass into a single hash value $c_3$ and sending the hash value $c_3$ to the verifier. Through this extension, it is possible to halve communication traffic when the multivariate polynomial $F^B$ having a large expression size is sent to the verifier algorithm V during the interactive protocol, and it is possible to reduce an average size of data to be exchanged. Next, a structure of each algorithm in the extension scheme will be described in detail.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector $s=(s_1, \ldots, s_n)$ that is an element of the set $K^n$. Next, the key generation algorithm Gen calculates $y=(y_1, \ldots, y_m)$<-$f_1(s), \ldots, f_m(s)$. Also, the key generation algorithm Gen sets $(f_1 \ldots, f_m, y)$ as the public key pk and sets s as the secret key. Hereinafter, a vector $(x_1, \ldots, x_n)$ is represented by x and a set of multivariate polynomials $(f_1(x), \ldots, f_m(x))$ is represented by F(x).

(Prover Algorithm P, Verifier Algorithm V)

Next, processes performed by the prover algorithm P and the verifier algorithm V during the interactive protocol will be described with reference to FIG. 17. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

At first, the prover algorithm P arbitrarily selects a number w. Subsequently, the prover algorithm P generates a vector r which is an element of the set $K^n$ and a multivariate polynomial $F^A(x)$ by applying the number w to a pseudo-random number generator G. That is, the prover algorithm P calculates $(r, F^A)$<-G(w). Subsequently, the prover algorithm P calculates z<-s-r. This calculation is equivalent to masking the secret key s with the vector r.

Operation #1 (Continued):

Subsequently, the prover algorithm P generates $F^A$ (z) and a hash value $c_1$ of z. That is, the prover algorithm P calculates $c_1$<-$H_1(F^A$ (z), z). Also, the prover algorithm P generates a hash value $c_2$ of the number w. That is, the prover algorithm P calculates $c_2$<-$H_2$ (w). $H_1(\ldots)$ and $H_2(\ldots)$ described above are hash functions. The messages $(c_1, c_2)$ generated in operation #1 are sent to the verifier algorithm V.

Operation #2:

Upon receiving the messages $(c_1, c_2)$, the verifier algorithm V randomly selects one number $\alpha$ from the origins of q rings K and sends the selected number $\alpha$ to the prover algorithm P.

Operation #3:

The prover algorithm P that has received the number $\alpha$ calculates $F^B(x)$<-$\alpha F(x+r)+F^A(x)$. This calculation corresponds to an operation of masking the multivariate polynomial F(x+r) for x using the multivariate polynomial $F^A(x)$. Further, the prover algorithm P generates a hash value $c_3$ of the multivariate polynomial set $F^B$. In other words, the prover algorithm P calculates $c_3$<-$H_3(F^B(x))$. $H_3(\ldots)$ is a hash function. The message $c_3$ generated in operation #3 is sent to the verifier.

Operation #4:

Upon receiving the multivariate polynomial $F_2$, the verifier algorithm V selects which verification pattern to use from between two verification patterns. For example, the verifier algorithm V may select a numerical value from between two numerical values {0, 1} representing verification patterns, and set the selected numerical value in a challenge d. This challenge d is sent to the prover algorithm P.

Operation #5:

Upon receiving the challenge d, the prover algorithm P generates a response a to send to the verifier algorithm V in response to the received challenge d. In the case where d=0, the prover algorithm P generates a response σ=w. In the case where d=1, the prover algorithm P generates a response σ=(z, $F^B$). The response σ generated in operation #5 is sent to the verifier algorithm V.

Operation #6:

Upon receiving the response σ, the verifier algorithm V executes the following verification process using the received response σ.

In the case where d=0, the verifier algorithm V calculates ($r^A$, $F^C$)<-G(σ). Then, the verifier algorithm V verifies whether or not the equality of $c_2$=$H_2$ (σ) holds. In addition, the verifier algorithm V verifies whether or not the equality of $c_3$=$H_3$ (αF (x+$r^A$)+$F_C$ (x)) holds. The verifier algorithm V outputs the value 1 to indicate authentication success in the case where these verifications all succeed, and outputs the value 0 to indicate authentication failure in the case where a verification fails.

In the case where d=1, the verifier algorithm V calculates ($z^A$, $F^C$)<-σ. Then, the verifier algorithm V verifies whether or not the equality of $c_1$=$H_1$ ($F^C$ ($z^A$)-αy, $z^A$) holds. In addition, the verifier algorithm V verifies whether or not the equality of $c_2$=$H_2$ ($F^C$ (x)) holds. The verifier algorithm V outputs the value 1 to indicate authentication success in the case where these verifications all succeed, and outputs the value 0 to indicate authentication failure in the case where a verification fails.

The process performed by each algorithm during the interactive protocol of the extension scheme has been described above. Through this extension, it is possible to halve communication traffic when the multivariate polynomial $F^B$ having a large expression size is sent to the verifier algorithm V during the interactive protocol, and it is possible to reduce an average size of data to be exchanged.

[3-3: Parallelized Algorithm]

As described above, applying the interactive protocol related to the present technology and the extended technique makes it possible to keep the probability of a successful forgery to (½+1/q) or less. Consequently, executing the interactive protocol twice makes it possible to keep the probability of a successful forgery to $(½+1/c)^2$ or less. Furthermore, if the interactive protocol is executed N times, the probability of a successful forgery becomes $(½+1/q)^N$, and if N is set to a sufficiently large number (N=80, for example), the probability of a successful forgery becomes negligibly small.

Figure 18:
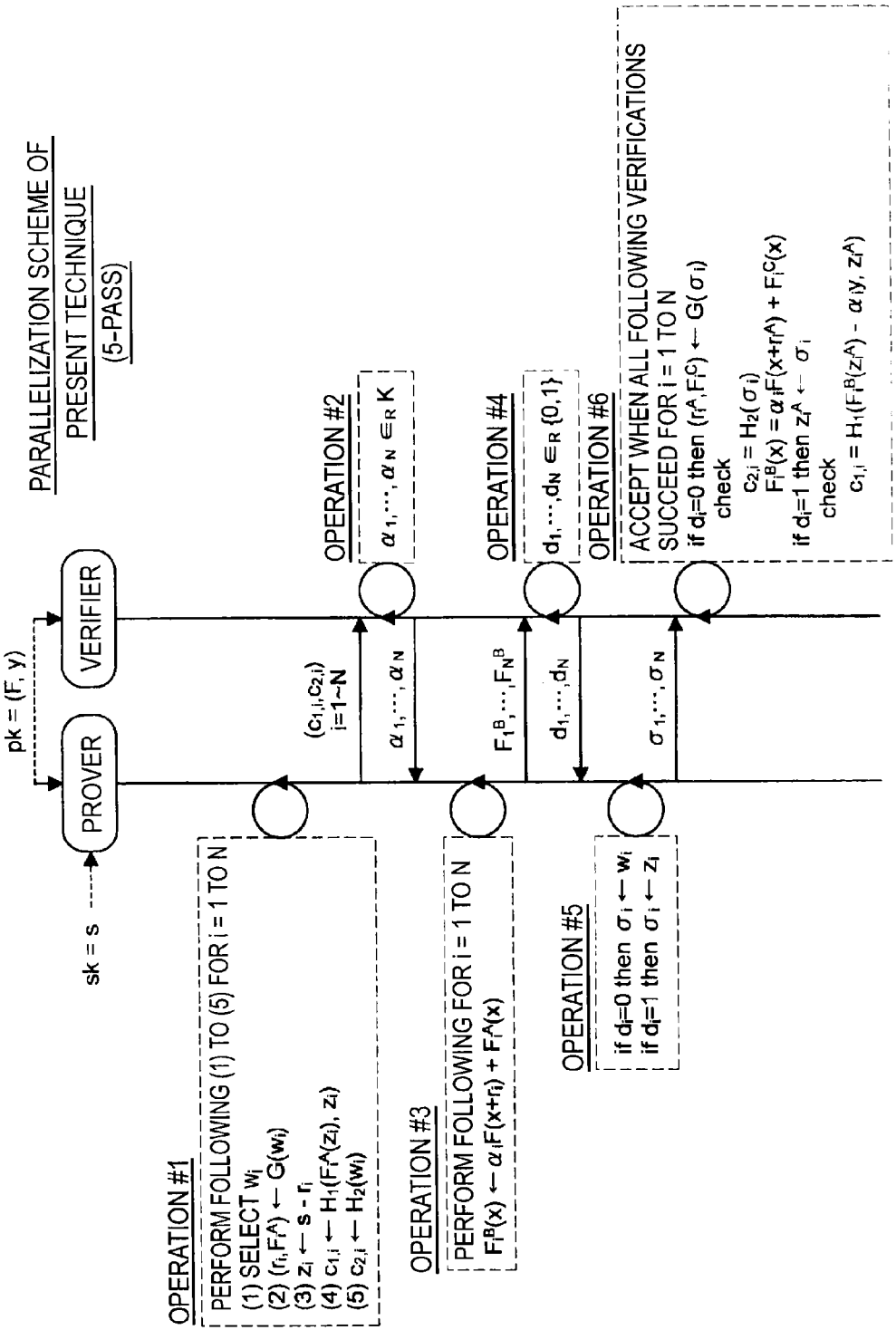
FIG. 18 is an explanatory diagram for describing a parallelized algorithm of the public-key authentication scheme according to the same embodiment.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Here, a method of extending the interactive protocol according to the present technique to an interactive protocol (hereinafter referred to as a "parallelized algorithm") related to the parallel method will be described. For example, the parallelized algorithm is illustrated in FIG. 18. Next, the details of the parallelized algorithm will be described with reference to FIG. 18.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector s=($s_1, \ldots, s_n$) that is an element of the set $K^n$. Next, the key generation algorithm Gen calculates y=($y_1, \ldots, y_m$)<-($f_1(s), \ldots, f_m(s)$). Also, the key generation algorithm Gen sets ($f_1, \ldots, f_m$, y) as the public key pk and sets s as the secret key. Hereinafter, a vector ($x_1, \ldots, x_n$) is represented by x and a set of multivariate polynomials ($f_1(x), \ldots, f_m(x)$) is represented by F(x).

(Prover Algorithm P, Verifier Algorithm V)

Next, a process performed by the prover algorithm P and a process performed by the verifier algorithm V during the interactive protocol will be described with reference to FIG. 18.

During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 18.

Operation #1:

First of all, the prover algorithm P performs the following processes (1) to (5) for i=1 to N.

Process (1): The prover algorithm P arbitrarily selects a number $w_i$.

Process (2): The prover algorithm P applies the number $w_i$, to the pseudo random number generator G and generates a vector $r_i$, that is an element of the set $K^n$ and a polynomial set $F_i^A(x)$. In other words, the prover algorithm P calculates ($r_i, F_i^A$)<-G($w_i$).

Process (3): The prover algorithm P calculates $z_i$<-s-$r_i$. This calculation corresponds to an operation of masking the secret key s using the vector $r_i$.

Process (4): The prover algorithm P calculates a hash value $c_{1,i}$ of $F_i^A(z_i)$ and $z_i$. In other words, the prover algorithm P calculates $c_{1,i}$<-$H_1$($F_i^A(z_i),z_i$).

Process (5): The prover algorithm P generates a hash value $c_{2,i}$ of a number $w_i^A$. In other words, the prover algorithm P calculates $c_{2,i}$<-$H_2$($w_i^A$).

After processes (1) to (5) are performed for i=1 to N, the message ($c_{1,i},c_{2,i}$) (i=1 to N) generated in operation #1 is sent to the verifier algorithm V.

Operation #2:

The verifier algorithm V that has received the message ($c_{1,i},c_{2,i}$) (i=1 to N) randomly selects N numbers $α_1, \ldots, α_N$ from the origins of q rings K. Then, the verifier algorithm V sends the selected numbers $α_1, \ldots, α_N$ to the prover algorithm P.

Operation #3:

The prover algorithm P that has received the numbers $α_1, \ldots, α_N$ calculates $F_i^B(x)$<-$α_i$F(x+$r_i$)+$F_i^A$(x) for i=1 to N. This calculation corresponds to an operation of masking the multivariate polynomial F(x+$r_i$) for x using the multivariate polynomial $F_i^A(x)$. Then, the prover algorithm P sends the multivariate polynomial $F_1^B, \ldots, F_N^B$ to the verifier algorithm V.

Operation #4:

Upon receiving the multivariate polynomial $F_1^B, \ldots, F_N^B$, the verifier algorithm V selects which verification pattern to use from between two verification patterns for i=1 to N. For example, the verifier algorithm V may select a numerical value from between two numerical values {0, 1} representing verification patterns for i=1 to N, and set the selected numerical value in a challenge $d_i$. The challenges $d_i$ is sent to the prover algorithm P.

Operation #5:

The prover algorithm P that has received the challenge $d_i$ (i=1 to N) generates a response $σ_i$ to be sent to the verifier algorithm V in response to the challenge $d_i$. Here, the prover algorithm P performs the following processes (1) and (2) for i=1 to N.

Process (1): When $d_i$=0, the prover algorithm P generates the response $\sigma_i = w_i$.

Process (2): When $d_i$=1, the prover algorithm P generates the response $\sigma_i = z_i$.

After processes (1) and (2) are performed, the response $\sigma_i$ (i=1 to N) is sent to the verifier algorithm V.

Operation #6:

Upon receiving the response $\sigma_i$ (i=1 to N), the verifier algorithm V executes the verification process using the received response $\sigma_i$. Note that the following processes are executed for i=1 to N In the case where $d_i$=0, the verifier algorithm V calculates $(r_i^A, F_i^C) \leftarrow G(\sigma_i)$. Then, the verifier algorithm V verifies whether or not the equality of $c_{2,i} = H_2(\sigma_i)$ holds. In addition, the verifier algorithm V verifies whether or not the equality of $F_i^B(x) = \alpha_i F(x+r_i^A) + F_i^C(x)$ holds. The verifier algorithm V outputs the value 1 to indicate authentication success in the case where these verifications all succeed, and outputs the value 0 to indicate authentication failure in the case where a verification fails.

In the case where $d_i$=1, the verifier algorithm V calculates $z_i^A \leftarrow \sigma_i$. Also, the verifier algorithm V verifies whether or not the equality of $c_{1,i} = H_1(F_i^C(z_i^A) - \alpha_i y, z_i)$ holds. The verifier algorithm V outputs the value 1 to indicate authentication success in the case where these verifications all succeed, and outputs the value 0 to indicate authentication failure in the case where a verification fails.

The method of performing the interactive protocol of the present technique in parallel has been described above. As described above, as the interactive protocol of the present technique is repetitively performed, the probability of a successful forgery becomes negligibly small. Further, it is possible to similarly parallelize the extension scheme.

(Modified Example)

Further, the structure of the interactive protocol may be modified such that the hash value $H(c_{1,1}, c_{1,2}, \ldots, c_{N,1}, c_{N,2})$ may be sent instead of sending $(c_{1,1}, c_{1,2}, \ldots, c_{N,1}, c_{N,2})$ to the verifier algorithm V after operation #1. In the case of this modification, a single hash value is sent at the first pass as a message, and thus it is possible to significantly reduce communication traffic. However, since there is a message that is hardly restored by the verifier algorithm V even using information sent from the prover algorithm P, it is necessary to send the corresponding message together when the response is sent. Through this structure, in the case of the n-time parallel repetition structure, it is possible to reduce the number of pieces of information to be sent by N−1.

(Parallelized Algorithm Related to Extension Scheme)

Figure 19:
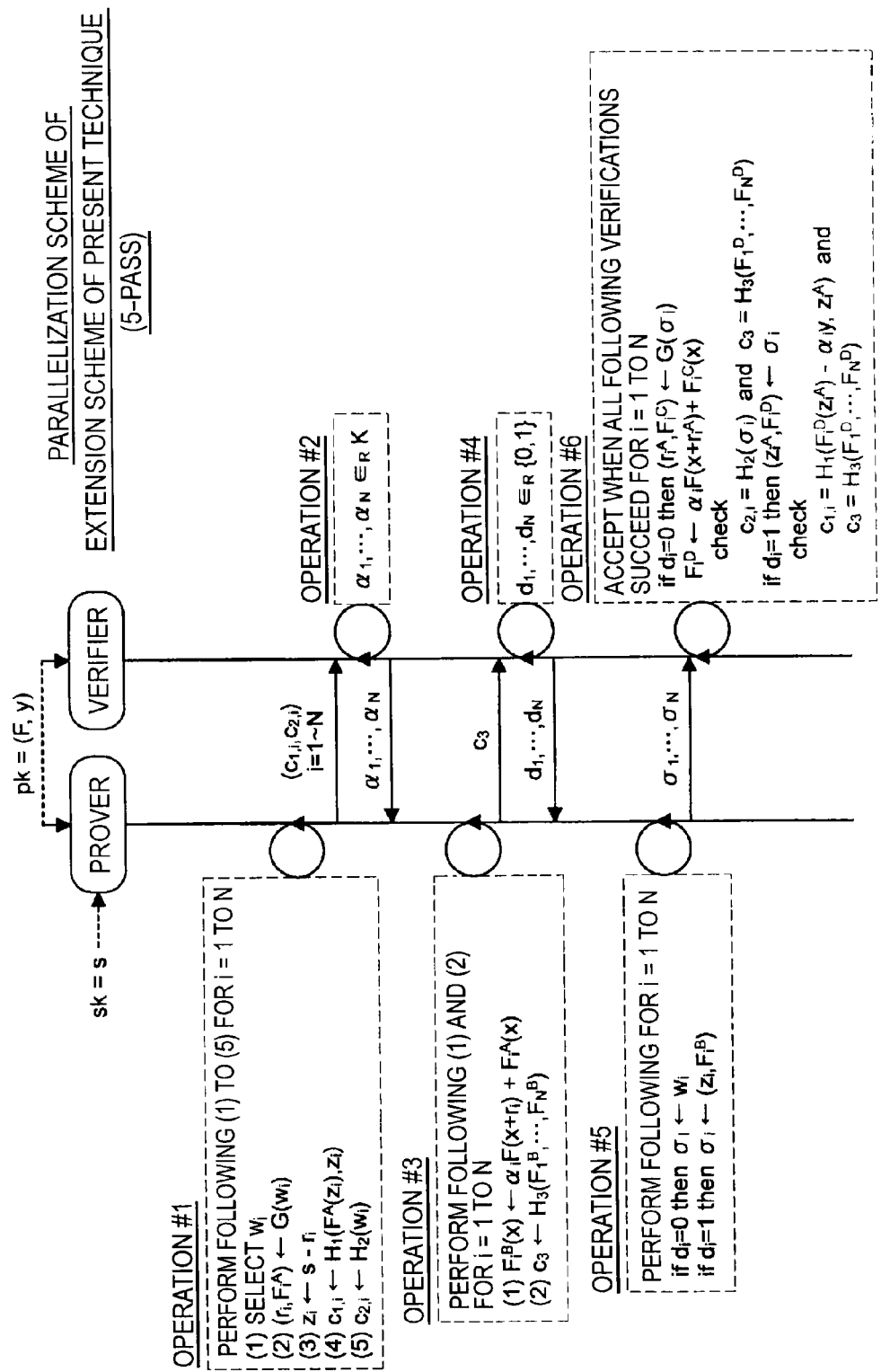
FIG. 19 is an explanatory diagram for describing parallelization of the extended algorithm of the public-key authentication scheme according to the same embodiment.

Here, a structure of the parallelized algorithm related to the extension scheme will be described with reference to FIG. 19. The structure of the key generation algorithm Gen is the same as in the parallelized algorithm related to the present technique, and thus a detailed description thereof will be omitted.

Operation #1:

First of all, the prover algorithm P performs the following processes (1) to (5) for i=1 to N.

Process (1): The prover algorithm P arbitrarily selects a number $w_i$.

Process (2): The prover algorithm P applies the number $w_i$ to the pseudo random number generator G and generates a vector $r_i$ that is an element of the set $K^n$ and a multivariate polynomial set $F_i^A(x)$. In other words, the prover algorithm P calculates $(r_i, F_i^A) \leftarrow G(w_i)$.

Process (3): The prover algorithm P calculates $z_i \leftarrow s - r_i$. This calculation corresponds to an operation of masking the secret key s using the vector $r_i$.

Process (4): The prover algorithm P generates a hash value $c_{1,i}$ of $F_i^A(z_i)$ and $z_i$. In other words, the prover algorithm P calculates $c_{1,1} \leftarrow H_1(F_i^A(z_i), z_i)$.

Process (5): The prover algorithm P generates a hash value $c_{2,i}$ of the number $w_i$. In other words, the prover algorithm P calculates $c_{2,1} \leftarrow H_2(w_i)$.

After processes (1) to (5) are performed for i=1 to N, the message $(c_{1,i}, c_{2,i})$ (i=1 to N) generated in operation #1 is sent to the verifier algorithm V.

Operation #2:

The verifier algorithm V that has received the message $(c_{1,i}, c_{2,i})$ (i=1 to N) randomly selects n numbers $\alpha_1, \ldots, \alpha_N$ from the origins of q rings K. Then, the verifier algorithm V sends the selected numbers $\alpha_1, \ldots, \alpha_N$ to the prover.

Operation #3:

The prover algorithm P that has received the numbers $\alpha_1, \ldots, \alpha_N$ calculates $F_i^B(x) \leftarrow \alpha_i F(x+r_i) + F_i^A(x)$ for i=1 to N. This calculation corresponds to an operation of masking the multivariate polynomial $F(x+r_i)$ for x using the multivariate polynomial $F_i^A(x)$. Next, the prover algorithm P generates a hash value $c_3$ of the multivariate polynomials $F_1^B, \ldots, F_N^B$. In other words, the prover algorithm P calculates $c_3 \leftarrow H_3(F_1^B, \ldots, F_N^B)$. $H_3(\ldots)$ is a hash function. The message $c_3$ generated in operation #3 is sent to the verifier algorithm V.

Operation #4:

Upon receiving the message $c_3$, the verifier algorithm V selects which verification pattern to use from among two verification patterns, for each of i=1 to N. For example, the verifier algorithm V may, for each of i=1 to N, select a numerical value from among two numerical values {0, 1} representing verification patterns, and set the selected numerical value in a challenge $d_i$. The challenges $d_i$ are sent to the prover algorithm P.

Operation #5:

The prover algorithm P that has received the challenge $d_i$ (i=1 to N) generates a response $\sigma_i$ to be sent to the verifier algorithm V in response to the challenge $d_i$. Here, the prover algorithm P performs the following processes (1) and (2) for i=1 to N.

Process 1: When $d_i$=0, the prover algorithm P generates the response $\sigma_i = w_i$.

Process 2: When $d_i$=1, the prover algorithm P generates the response $\sigma_i = (z_i, F_i^B)$.

After processes (1) and (2) are performed, the response $\sigma_i$ (i=1 to N) is sent to the verifier algorithm V.

Operation #6:

Upon receiving the response $\sigma_i$ (i=1 to N), the verifier algorithm V executes the verification process using the received response $\sigma$. Note that the following processes are executed for i=1 to N In the case where $d_i$=0, the verifier algorithm V calculates $(r_i^A, F_i^C) \leftarrow G(\sigma_i)$. Also, the verifier algorithm V calculates $F_i^D \leftarrow \alpha_i F(x+r_i^A) + F_i^C(x)$. Then, the verifier algorithm V verifies whether or not the equality of $c_{2,i} = H_2(\sigma_i)$ holds. In addition, the verifier algorithm V verifies whether or not the equality of $c_3 = H_3(F_1^D, \ldots, F_N^D)$ holds. The verifier algorithm V outputs the value 1 to indicate authentication success in the case where these verifications all succeed, and outputs the value 0 to indicate authentication failure in the case where a verification fails.

In the case where $d_i$=1, the verifier algorithm V sets $(z_i^A, F_i^D) \leftarrow \sigma_i$. Then, the verifier algorithm V verifies whether or not the equality of $c_{1,i} = H_1(F_i^D(z_i^A) - \alpha_i y, z_i^A)$ holds. In addition, the verifier algorithm V verifies whether or not the equality of $c_3=H_3(F_1^D, \ldots, F_N^D)$ holds. The verifier algorithm V outputs the value 1 to indicate authentication success in the case where these verifications all succeed, and outputs the value 0 to indicate authentication failure in the case where a verification fails.

The structure of the parallelized algorithm related to the extension scheme has been described above.

(Suitable Parameter Setting Method)

Similarly to the interactive protocol according to the first embodiment, the interactive protocol according to the present embodiment guarantees the security level against the passive attack. However, when the method of repetitively performing the interactive protocol in parallel is applied, a condition which will be described below is necessary to prove that the security level against the active attack is guaranteed.

The interactive protocol is one in which the prover proves that "the prover is aware of s causing y=F(s)" to the verifier through an interactivity using a set of a key pair (a public key y and a secret key s) without leaking information of the secret key s to the verifier at all. For this reason, when interactivity accepted by verification is performed, it is difficult to deny a probability that information representing that "the prover has used s at the time of interactivity" is known by the verifier. In addition, collision resistance is not guaranteed in the multivariate polynomial F. For this reason, when the above-described interactive protocol is repetitively performed in parallel, it is difficult to unconditionally prove that the security against an active attack is reliably guaranteed.

In this regard, the inventors of the present technology have reviewed a method of preventing information representing that "the prover has used s at the time of interactivity" from being known by the verifier even when interactivity accepted by verification is performed. Further, the inventors of the present technology have devised a method of proving that the security against an active attack is guaranteed even when the above-described interactive protocol is repetitively performed in parallel. This method is a setting condition providing method of setting the number m of multivariate polynomials $f_1, \ldots, f_m$ used as the public key to a value sufficiently smaller than the number n of variables. For example, m and n are set such that $2^{m-n} \ll 1$ (for example, when n=160 and m=80, $2^{-80} \ll 1$).

In the above-described scheme in which difficulty in solving multi-order multivariate simultaneous equations is a basis of security, it is difficult to generate another secret key $s_2$ corresponding to a public key pk even when a secret key $s_1$ and the corresponding public key pk are given. For this reason, when it is guaranteed that there are two or more secret keys s for the public key pk, it is possible to prevent information representing that "the prover has used s at the time of interactivity" from being known by the verifier even when interactivity accepted by verification is performed. In other words, when such guarantee can be given, the security against the active attack can be guaranteed even when the interactive protocol is repetitively performed in parallel.

When a function $F: K^n \to K^m$ configured with m multi-order polynomials with n variables (where n>m) is considered with reference to FIG. 40, the number of elements in a domain of definition having no second pre-image is $|K|^m-1$ at the most. For this reason, when $|K|^{m-n}$ is set to be sufficiently small, a probability that an element in a domain of definition having no second pre-image is selected can be made negligibly small. In other words, when the number m of multi-order polynomials $f_1, \ldots, f_m$ with n variables is set to a value sufficiently smaller than the number n of variables, it can be guaranteed that there are two or more secret keys s for the public key pk. Consequently, even when interactivity accepted by verification is performed, it is possible to prevent the information representing that "the prover has used s at the time of interactivity" from being known by a verifier, and the security against the active attack is guaranteed even when the interactive protocol is repetitively performed in parallel.

As described above, as the setting condition for setting the number m of multi-order polynomials $f_1, \ldots, f_m$ with n variables to a value sufficiently smaller than the number n of variables (where n>m and preferably $2^{m-n} \ll 1$), the security can be guaranteed when the interactive protocol is repetitively performed in parallel.

[3-4: Specific Example (when Second-Order Polynomial is Used)]

Next, an example in which a second-order polynomial with n variables is used as the multivariate polynomial F will be described with reference to FIG. 20.

Figure 20:
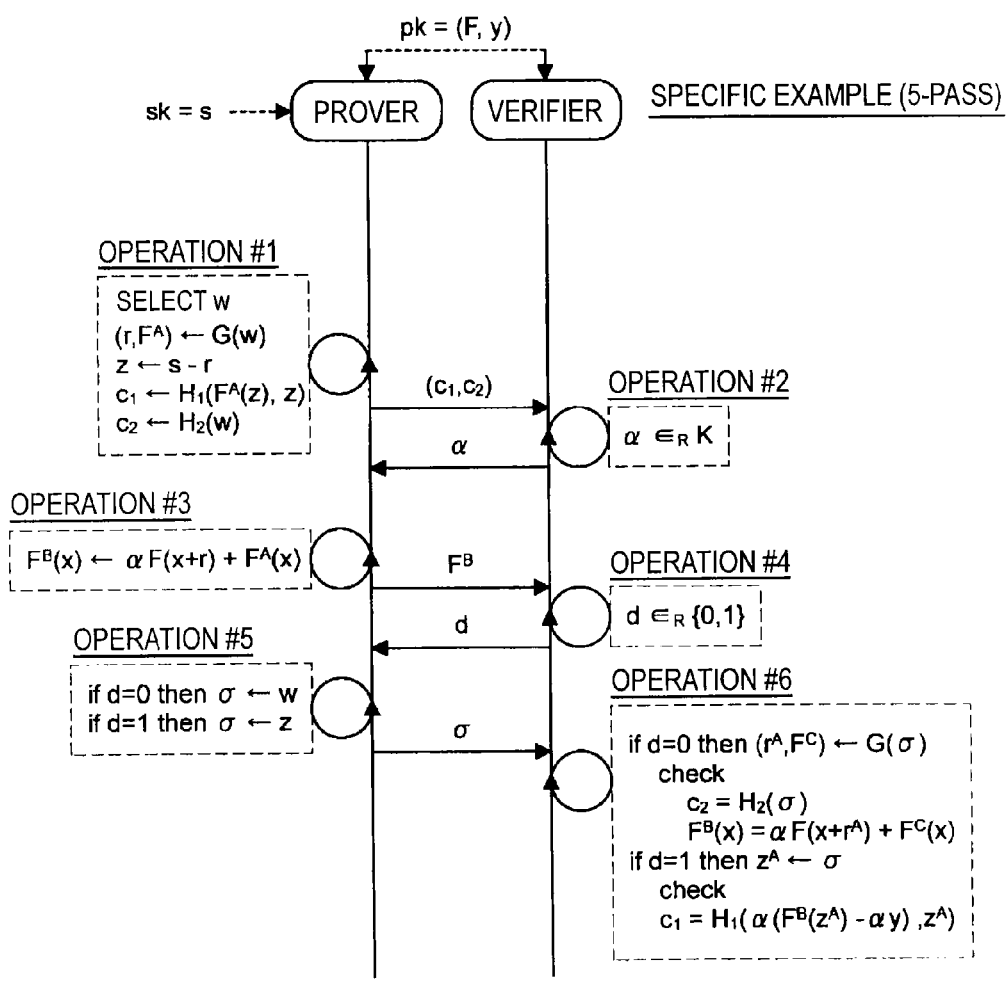
FIG. 20 is an explanatory diagram for describing a specific algorithm of the public-key authentication scheme according to the same embodiment.

FIG. 20 is an explanatory diagram for describing a specific example of the present technique.

(Key Generation Algorithm Gen)

The key generation algorithm Gen generates m of second-order polynomials $f_1(x_1, \ldots, x_n), \ldots, f_m(x_1, \ldots, x_n)$ defined in a ring k and a vector $s=(s_1, \ldots, s_n)$ that is an element of the set $K^n$. Next, the key generation algorithm Gen calculates $y=(y_1, \ldots, y_m) \leftarrow (f_1(s), \ldots, f_m(s))$. Also, the key generation algorithm Gen sets $(f_1, \ldots, f_m, y)$ as the public key pk and sets s as the secret key. Hereinafter, a vector $(x_1, \ldots, x_n)$ is represented by x and a set of second-order polynomials $(f_1(x), \ldots, f_m(x))$ is represented by F(x).

(Prover Algorithm P, Verifier Algorithm V)

Next, a process performed by the prover algorithm P and a process performed by the verifier algorithm V during the interactive protocol will be described with reference to FIG. 20.

Operation #1:

First of all, the prover algorithm P arbitrarily selects a number w. Next, the prover algorithm P applies the number w to the pseudo random number generator G, and generates a vector r that is an element of the set $K^n$ and a multivariate polynomial set $F^A(x)=(f_1^A(x), \ldots, f_m^A(x))$. In other words, the prover algorithm P calculates $(r, F^A) \leftarrow G(w)$. Next, the prover algorithm P calculates $z \leftarrow s-r$. This calculation corresponds to an operation of masking the secret key s using the vector r. Here, the second-order polynomial $f_i^A(x)$ is expressed as in the following Formula (18).

[Math 13]

$$f_i^A(x) = \sum_j b_{i,j}^A x_j \qquad (18)$$

Operation #1 (Continued):

Next, the prover algorithm P generates a hash value $c_1$ of $F^A(z)$ and z. In other words, the prover algorithm P calculates $c_1 \leftarrow H_1(F^A(z), z)$. Further, the prover algorithm P generates a hash value $c_2$ of the number w. In other words, the prover algorithm P calculates $c_2 \leftarrow H_2(w)$. $H_1(\ldots)$ and $H_2(\ldots)$ are hash functions. The message $(c_1, c_2)$ generated in operation #1 is sent to the verifier algorithm V.

Operation #2:

The verifier algorithm V that has received the message $(c_1,c_2)$ randomly selects a number $\alpha$ from q rings K, and sends the selected number $\alpha$ to the prover algorithm P.

Operation #3:

The prover algorithm P that has received the number $\alpha$ calculates $F^B(x) \leftarrow -\alpha F(x+r) + F^A(x)$. This calculation corresponds to an operation of masking the multivariate polynomial $F(x+r)$ for x using the multivariate polynomial $F^A(x)$. The multivariate polynomial $F^B$ generated in operation #3 is sent to the verifier algorithm V.

Operation #4:

The verifier algorithm V that has received the multivariate polynomial $F^B$ selects a verification pattern to be used from two verification patterns. For example, the verifier algorithm V selects a numerical value from two numerical values $\{0,1\}$ representing the types of the verification patterns, and selects the selected numerical value to the challenge d. The challenge d is sent to the prover algorithm P.

Operation #5:

The prover algorithm P that has received the challenge d generates a response $\sigma$ to be sent to the verifier algorithm V in response to the received challenge d. When d=0, the prover algorithm P generates the response $\sigma$=w. When d=1, the prover algorithm P generates the response $\sigma$=z. The response $\sigma$ generated in operation #5 is sent to the verifier algorithm V.

Operation #6:

The verifier algorithm V that has received the response $\sigma$ performs the following verification process using the received response $\sigma$.

When d=0, the verifier algorithm V calculates $(r^A, F^C) \leftarrow G(\sigma)$. Then, the verifier algorithm V verifies whether or not the equality of $c_2 = H_2(\sigma)$ holds. Further, the verifier algorithm V verifies whether or not the equality of $F^B(x) = \alpha F(x+r^A) + F^C(x)$ holds. The verifier algorithm V outputs a value 1 representing authentication success when the verifications succeed, and outputs a value 0 representing an authentication failure when the verifications fail.

When d=1, the verifier algorithm V performs $z^A \leftarrow \sigma$. Then, the verifier algorithm V verifies whether or not the equality of $c_1 = H_1(F^B(z^A) - \alpha y, z^A)$ holds. The verifier algorithm V outputs a value 1 representing authentication success when the verification succeeds, and outputs a value 0 representing an authentication failure when the verification fails.

The specific example of the present technique has been described above.

[3-5: Efficient Algorithm]

Next, a method of streamlining the algorithm according to the present technique will be described. Similarly to the streamlining method described in the first embodiment, the multivariate polynomial $F^A(x)$ used to mask the multivariate polynomial $F(x+r)$ is expressed by $F^A(x)=F_b(x, t)+e$ using the two vectors, the vector t that is an element of the set $K^n$ and the vector e that is an element of the set $K^m$. Using this expression, a relation expressed by the following Formula (19) is obtained on the multivariate polynomial $F(x+r)$.

[Math 14]

$$\alpha F(x+r) + F^A(x) = \alpha F(x) + \alpha F(r) + \alpha F_b(x, r) + F_b(x, t) + e \quad (19)$$
$$= \alpha F(x) + F_b(x, \alpha r + t) + \alpha F(r) + e$$

Thus, when $t^A = \alpha r + t$ and $e^A = \alpha F(r) + e$, the masked multivariate polynomial $F^B(x) = \alpha F(x+r) + F^A(x)$ can be expressed by two vectors, the vector $t^A$ that is an element of the set $K^n$ and the vector $e^A$ that is an element of the set $K^m$. For this reason, when $F^A(x) = F_b(x,t) + e$ is set, $F^A$ and $F^B$ can be expressed using a vector of $K^n$ and a vector of $K^m$, and thus the size of data necessary for communication can be significantly reduced. Specifically, communication cost can be reduced by about several thousands to tens of thousands of times.

Through this modification, information related to $r_0$ is not at all leaked from $F_2$ (or $F_1$). For example, even when $e^A$ and $t^A$ (or e and t) are given, the information of r is not known at all unless e and t (or $e^A$ and $t^A$) are known. Thus, the zero knowledge is guaranteed even when this modification is performed. Next, the efficient algorithm related to the present technique will be described with reference to FIGS. 21 to 27. Since the structure of the key generation algorithm Gen does not change, a detailed description thereof will be omitted.

Figure 21:
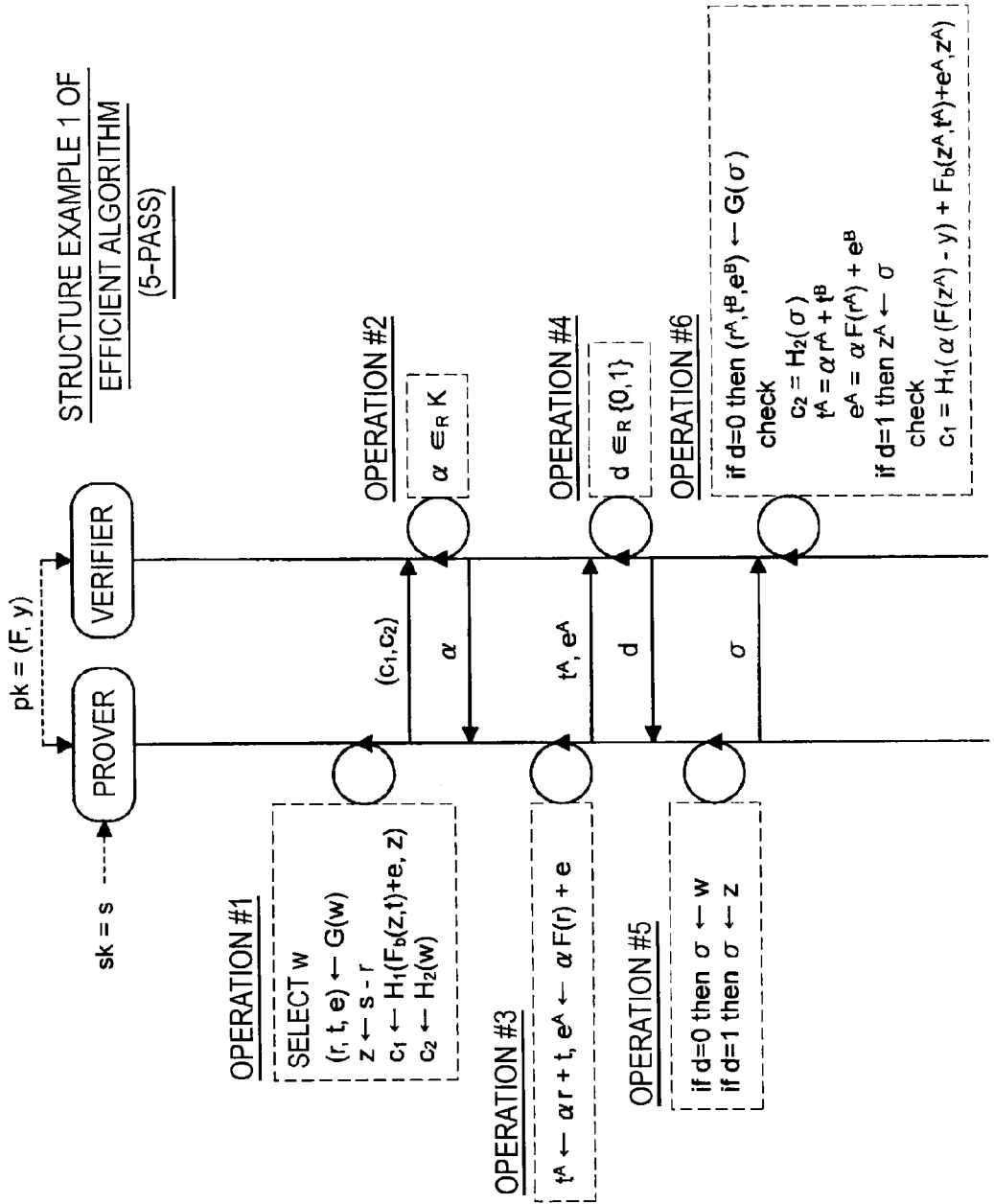
FIG. 21 is an explanatory diagram for describing an efficient algorithm of the public-key authentication scheme according to the same embodiment.

(Structure Example 1 of Efficient Algorithm: FIG. 21)

First of all, a structure of an efficient algorithm illustrated in FIG. 21 will be described.

Operation #1:

First of all, the prover algorithm P arbitrarily selects a number w. Next, the prover algorithm P applies the number w to the pseudo random number generator G and generates the vectors r and t that are elements of the set of $K^n$, and the vector e that is an element of the set of $K^m$. In other words, the prover algorithm P calculates $(r,t,e) \leftarrow G(w)$. Next, the prover algorithm P calculates $z \leftarrow s-r$. This calculation corresponds to an operation of masking the secret key s using the vector r.

Operation #1 (Continued):

Next, the prover algorithm P generates a hash value $c_1$ of $F_b(z,t)+e$ and z. In other words, the prover algorithm P calculates $c_1 \leftarrow H_1(F_b(z,t)+e,z)$. Further, the prover algorithm P generates a hash value $c_2$ of the number w. In other words, the prover algorithm P calculates $c_2 \leftarrow H_2(w)$. $H_1(\ldots)$ and $H_2(\ldots)$ are hash functions. The message $(c_1,c_2)$ generated in operation #1 is sent to the verifier algorithm V.

Operation #2:

The verifier algorithm V that has received the message $(c_1,c_2)$ randomly selects a number $\alpha$ from q rings K, and sends the selected number $\alpha$ to the prover algorithm P.

Operation #3:

The prover algorithm P that has received the number $\alpha$ calculates $t^A \leftarrow \alpha r+t$. Further, the prover algorithm P calculates $e^A \leftarrow \alpha F(r)+e$. Then, the prover algorithm P sends $t^A$ and $e^A$ to the verifier algorithm V.

Operation #4:

The verifier algorithm V that has received $t^A$ and $e^A$ selects a verification pattern to be used from two verification patterns. For example, the verifier algorithm V selects a numerical value from two numerical values $\{0,1\}$ representing the types of the verification patterns, and selects the selected numerical value to the challenge d. The challenge d is sent to the prover algorithm P.

Operation #5:

The prover algorithm P that has received the challenge d generates a response $\sigma$ to be sent to the verifier algorithm V in response to the received challenge d. When d=0, the prover algorithm P generates the response $\sigma$=w. When d=1, the prover algorithm P generates the response $\sigma$=z. The response $\sigma$ generated in operation #5 is sent to the verifier algorithm V.

Operation #6:

The verifier algorithm V that has received the response $\sigma$ performs the following verification process using the received response $\sigma$.

When d=0, the verifier algorithm V calculates $(r^A, t^B, e^B) \leftarrow G(\sigma)$. Then, the verifier algorithm V verifies whether or not the equality of $c_2 = H_2(\sigma)$ holds. Further, the verifier algorithm V verifies whether or not the equality of $t^A = \alpha r^A + t^B$ holds. Further, the verifier algorithm V verifies whether or not the equality of $e^A = \alpha F(r^A) + e^B$ holds. The verifier algorithm V outputs a value 1 representing authentication success when the verifications succeed, and outputs a value 0 representing an authentication failure when the verifications fail.

When d=1, the verifier algorithm V performs $z^A \leftarrow \sigma$. Then, the verifier algorithm V verifies whether or not the equality of $c_1 = H_1(\alpha(F(z^A) - y) + F_b(z^A, t^A) + e^A, z^A)$ holds. The verifier algorithm V outputs a value 1 representing authentication success when the verification succeeds, and outputs a value 0 representing an authentication failure when the verification fails.

The structure example 1 of the efficient algorithm has been described above. Using this efficient algorithm, the data size necessary for communication is significantly reduced. Further, since it is unnecessary to calculate $F(x+r)$, calculation efficiency is improved as well.

Figure 22:
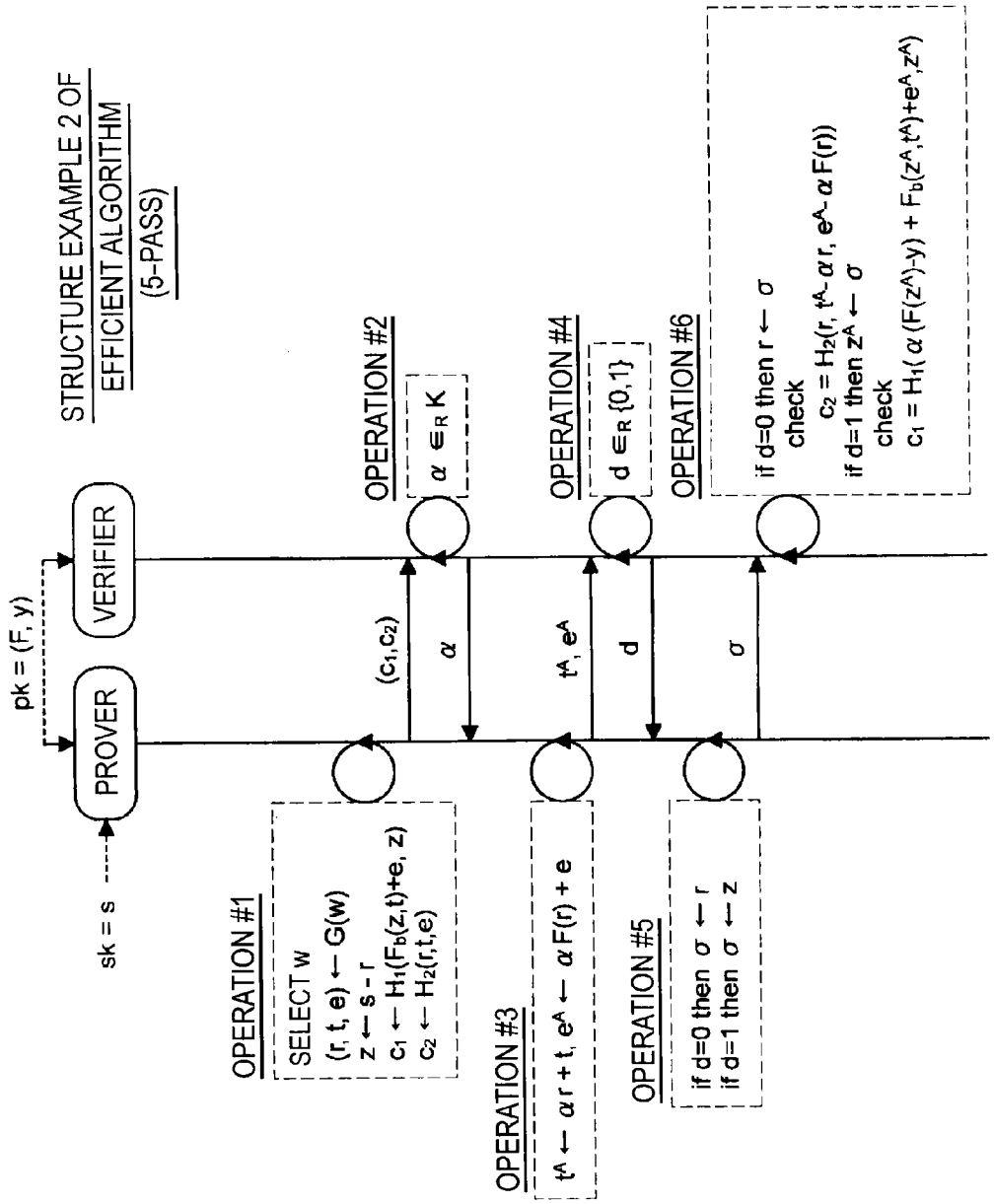
FIG. 22 is an explanatory diagram for describing an efficient algorithm of the public-key authentication scheme according to the same embodiment.

(Structure Example 2 of Efficient Algorithm: FIG. 22)

Next, a structure of an efficient algorithm illustrated in FIG. 22 will be described. When the structure illustrated in FIG. 22 is applied, similarly to when the structure illustrated in FIG. 20 is applied, the effect that the communication efficiency and the calculation efficiency are improved is obtained. Here, a difference with the structure illustrated in FIG. 20 will be described.

In operation #5 of the algorithm illustrated in FIG. 20, when d=0, $\sigma$ is set to w, but information that can be restored by (r,t,e) may be used as $\sigma$ set when d=0. For example, as illustrated in FIG. 22, in operation #5, r may be used as $\sigma$ set when d=0. Here, when this modification is performed, it is necessary to modify the calculation $c_2 \leftarrow H_2(w)$ in operation #1 to $c_2 \leftarrow H_2(r,t,e)$. Specifically, in operation #6, when d=0, the verification content performed by the verifier algorithm V is replaced with verification of $c_2 = H_2(r, t^A - \alpha r, e^A - \alpha F(r))$.

The structure example 2 of the efficient algorithm has been described above.

Figure 23:
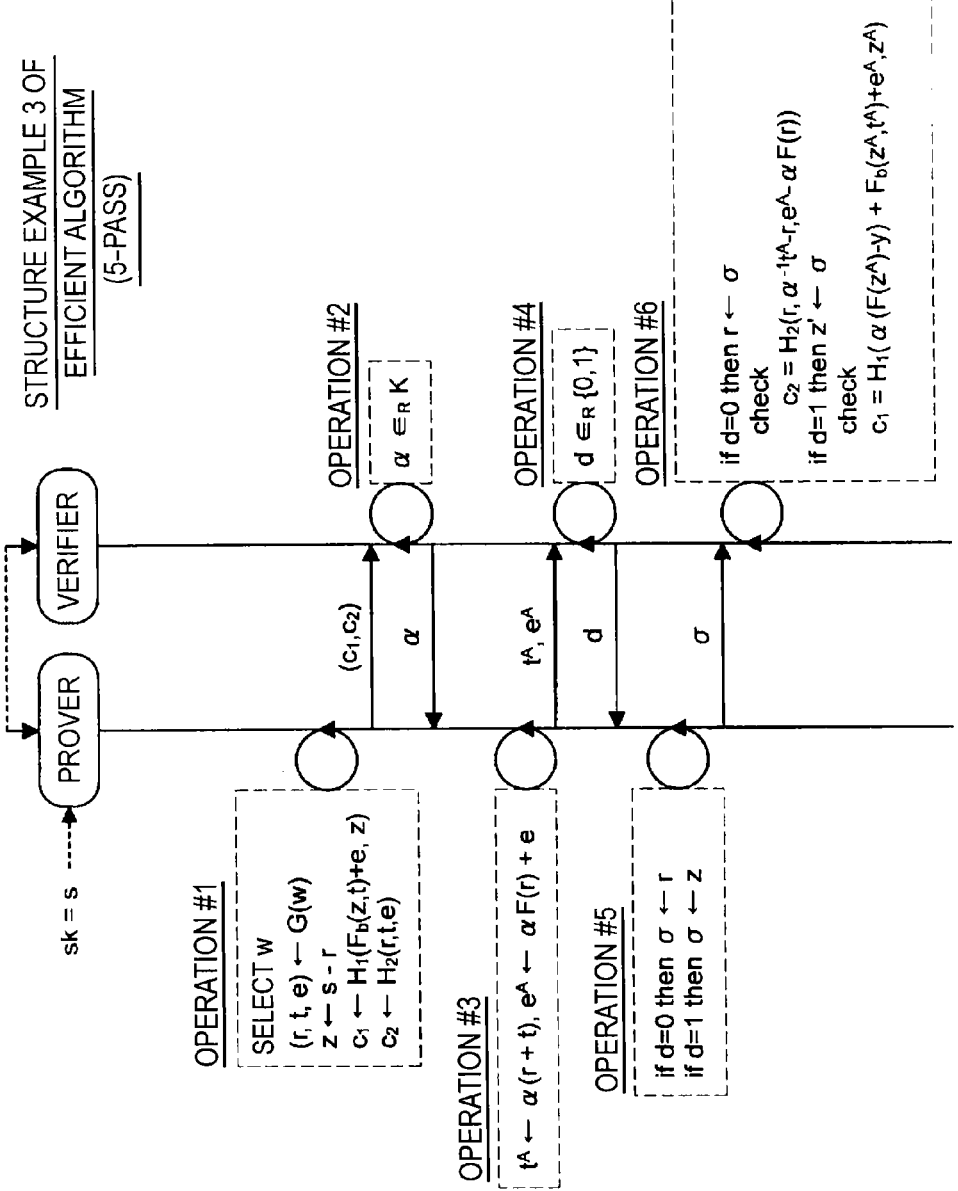
FIG. 23 is an explanatory diagram for describing an efficient algorithm of the public-key authentication scheme according to the same embodiment.

(Structure Example 3 of Efficient Algorithm: FIG. 23)

Next, a structure of an efficient algorithm illustrated in FIG. 23 will be described. When the structure illustrated in FIG. 23 is applied, similarly to when the structure illustrated in FIG. 20 is applied, the effect that the communication efficiency and the calculation efficiency are improved is obtained. Here, a difference with the structure illustrated in FIG. 22 will be described.

In operation #3 of the algorithm illustrated in FIG. 22, the calculation of $t^A \leftarrow \alpha r + t$ is performed, but this calculation may be modified into a calculation of $t^A \leftarrow \alpha(r+t)$ as illustrated in FIG. 23. For example, as illustrated in FIG. 22, in operation #5, r may be used as a set when d=0. When this modification is performed, in operation #6, when d=0, the verification content performed by the verifier algorithm V is replaced with verification of $c_2 = H_2(r, \alpha^{-1} t^A - r, e^A - \alpha F(r))$.

The structure example 3 of the efficient algorithm has been described above.

Figure 24:
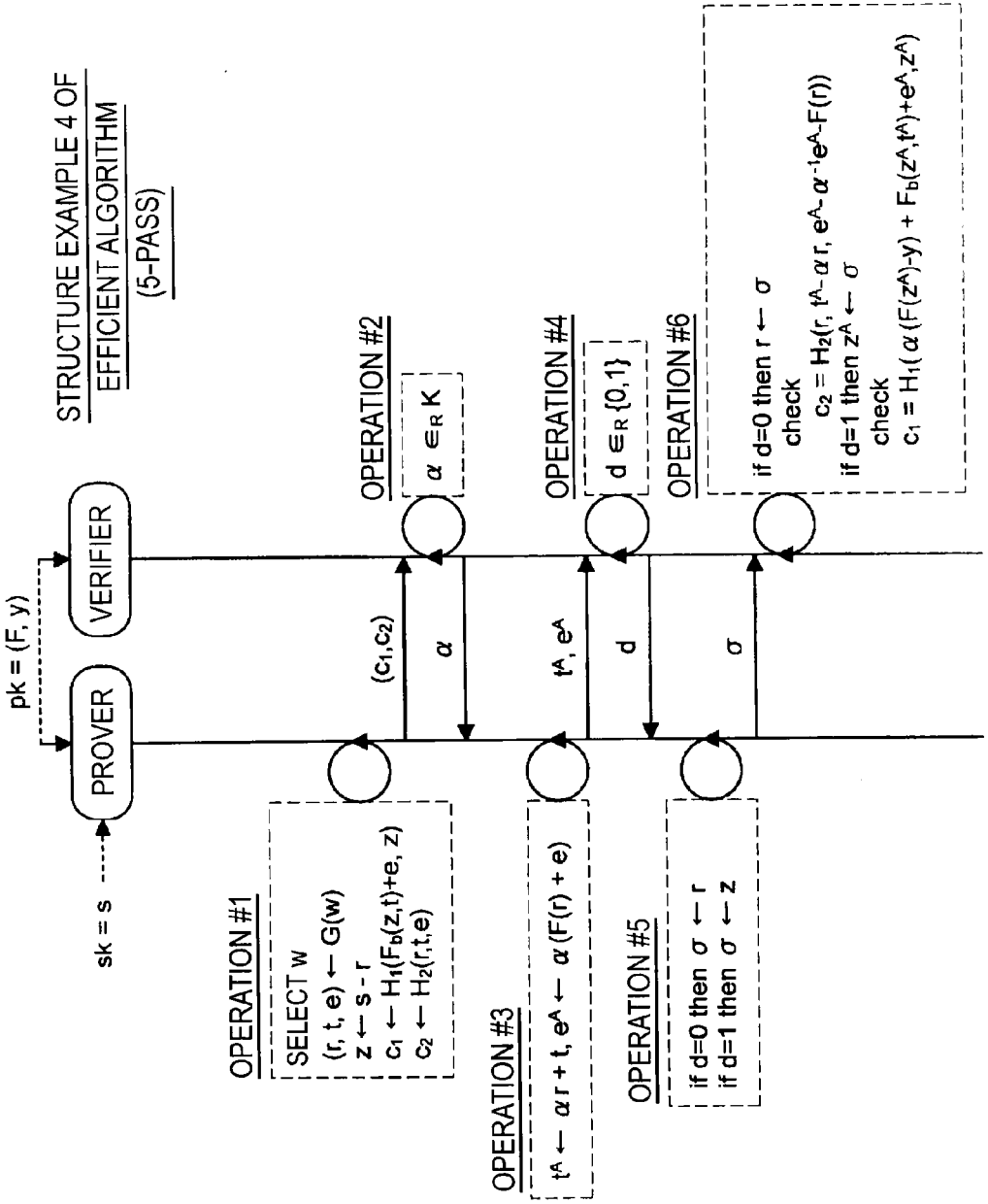
FIG. 24 is an explanatory diagram for describing an efficient algorithm of the public-key authentication scheme according to the same embodiment.

(Structure Example 4 of Efficient Algorithm: FIG. 24)

Next, a structure of an efficient algorithm illustrated in FIG. 24 will be described. When the structure illustrated in FIG. 24 is applied, similarly to when the structure illustrated in FIG. 20 is applied, the effect that the communication efficiency and the calculation efficiency are improved is obtained. Here, a difference with the structure illustrated in FIG. 22 will be described.

In operation #3 of the algorithm illustrated in FIG. 22, the calculation of $e^A \leftarrow \alpha F(r) + e$ is performed, but this calculation may be modified into a calculation of $e^A \leftarrow \alpha(F(r) + e)$ as illustrated in FIG. 24. When this modification is performed, in operation #6, when d=0, the verification content performed by the verifier algorithm V is replaced with verification of $c_2 = H_2(r, t^A - \alpha r, e^A - \alpha^{-1} e^A - F(r))$.

The structure example 4 of the efficient algorithm has been described above.

Figure 25:
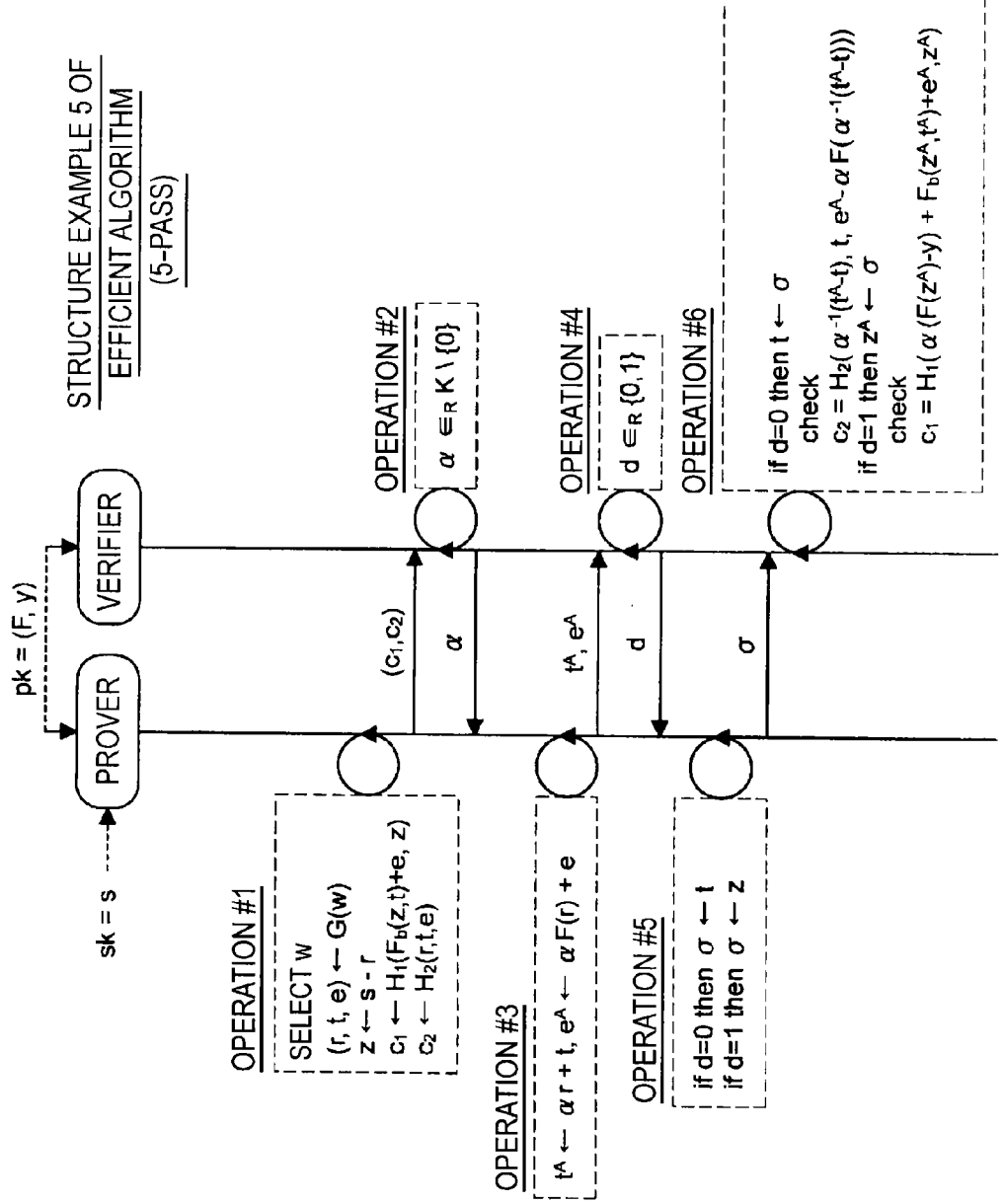
FIG. 25 is an explanatory diagram for describing an efficient algorithm of the public-key authentication scheme according to the same embodiment.

(Structure Example 5 of Efficient Algorithm: FIG. 25)

Next, a structure of an efficient algorithm illustrated in FIG. 25 will be described. When the structure illustrated in FIG. 25 is applied, similarly to when the structure illustrated in FIG. 20 is applied, the effect that the communication efficiency and the calculation efficient are improved is obtained. Here, a difference with the structure illustrated in FIG. 22 will be described.

In operation #5 of the algorithm illustrated in FIG. 22, when d=0, $\sigma$ is set to r, but information that can be restored by (r,t,e) using $(t^A, e^B)$ may be used as $\sigma$ set when d=0. For example, as illustrated in FIG. 25, in operation #5, t may be used as $\sigma$ set when d=0. Here, when this modification is performed, $\alpha$ is selected from $\alpha$ that is an element of the set $_R K \setminus \{0\}$ in operation #2 Specifically, in operation #6, when d=0, the verification content performed by the verifier algorithm V is replaced with verification of $c_2 = H_2(\alpha^{-1}(t^A - t), t, e^A - \alpha F(\alpha^{-1}(t^A - t)))$.

The structure example 5 of the efficient algorithm has been described above.

Figure 26:
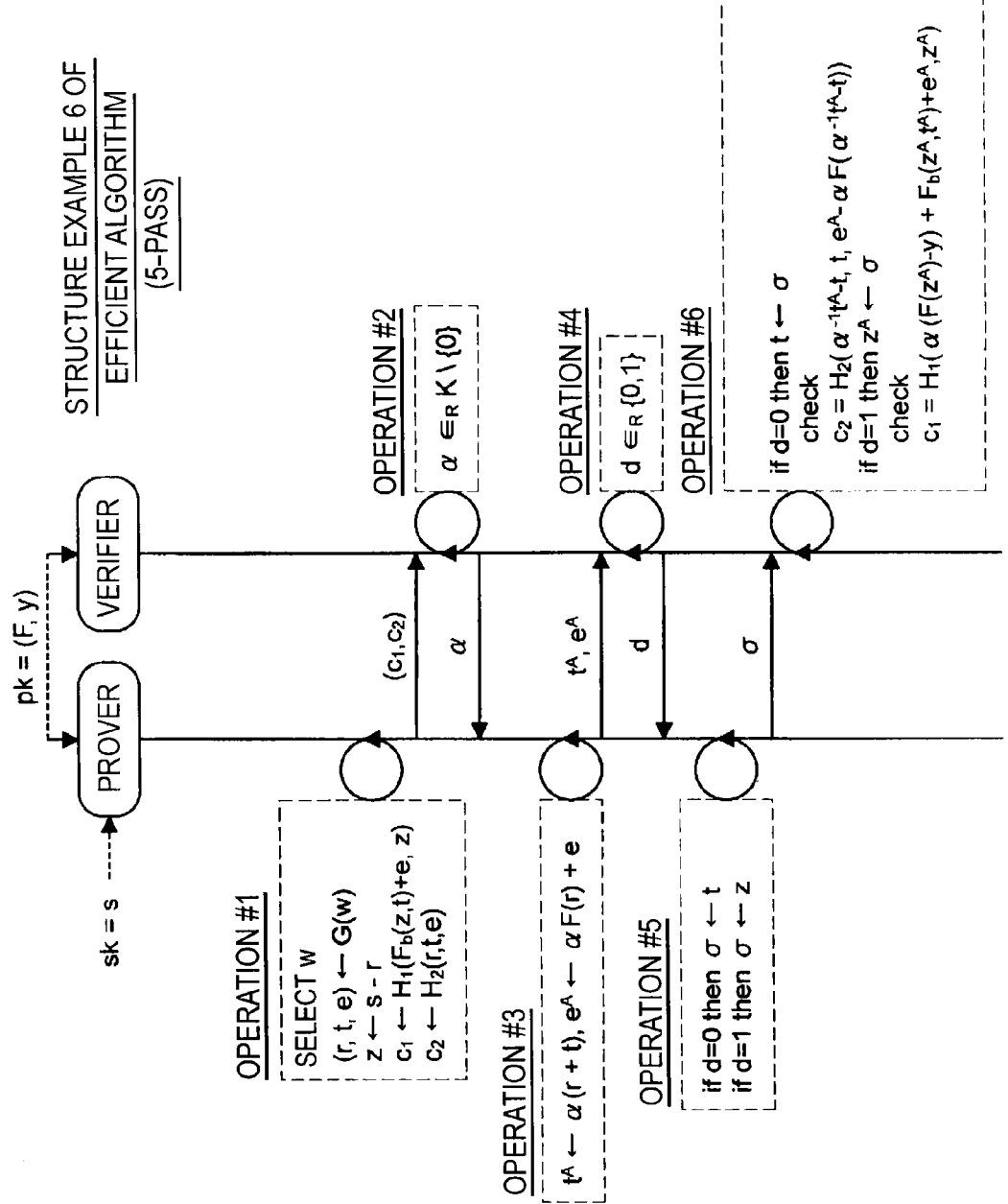
FIG. 26 is an explanatory diagram for describing an efficient algorithm of the public-key authentication scheme according to the same embodiment.

(Structure Example 6 of Efficient Algorithm: FIG. 26)

Next, a structure of an efficient algorithm illustrated in FIG. 26 will be described. When the structure illustrated in FIG. 26 is applied, similarly to when the structure illustrated in FIG. 20 is applied, the effects that the communication efficiency and the calculation efficient are improved are obtained. Here, a difference with the structure illustrated in FIG. 25 will be described.

In operation #3 of the algorithm illustrated in FIG. 25, the calculation of $t^A \leftarrow \alpha r + t$ is performed, but this calculation may be modified into a calculation of $t^A \leftarrow \alpha(r+t)$ as illustrated in FIG. 26. When this modification is performed, in operation #6, when d=0, the verification content performed by the verifier algorithm V is replaced with verification of $c_2 = H_2(\alpha^{-1} t^A - t, t, e^A - \alpha F(\alpha^{-1} t^A - t))$.

The structure example 6 of the efficient algorithm has been described above.

Figure 27:
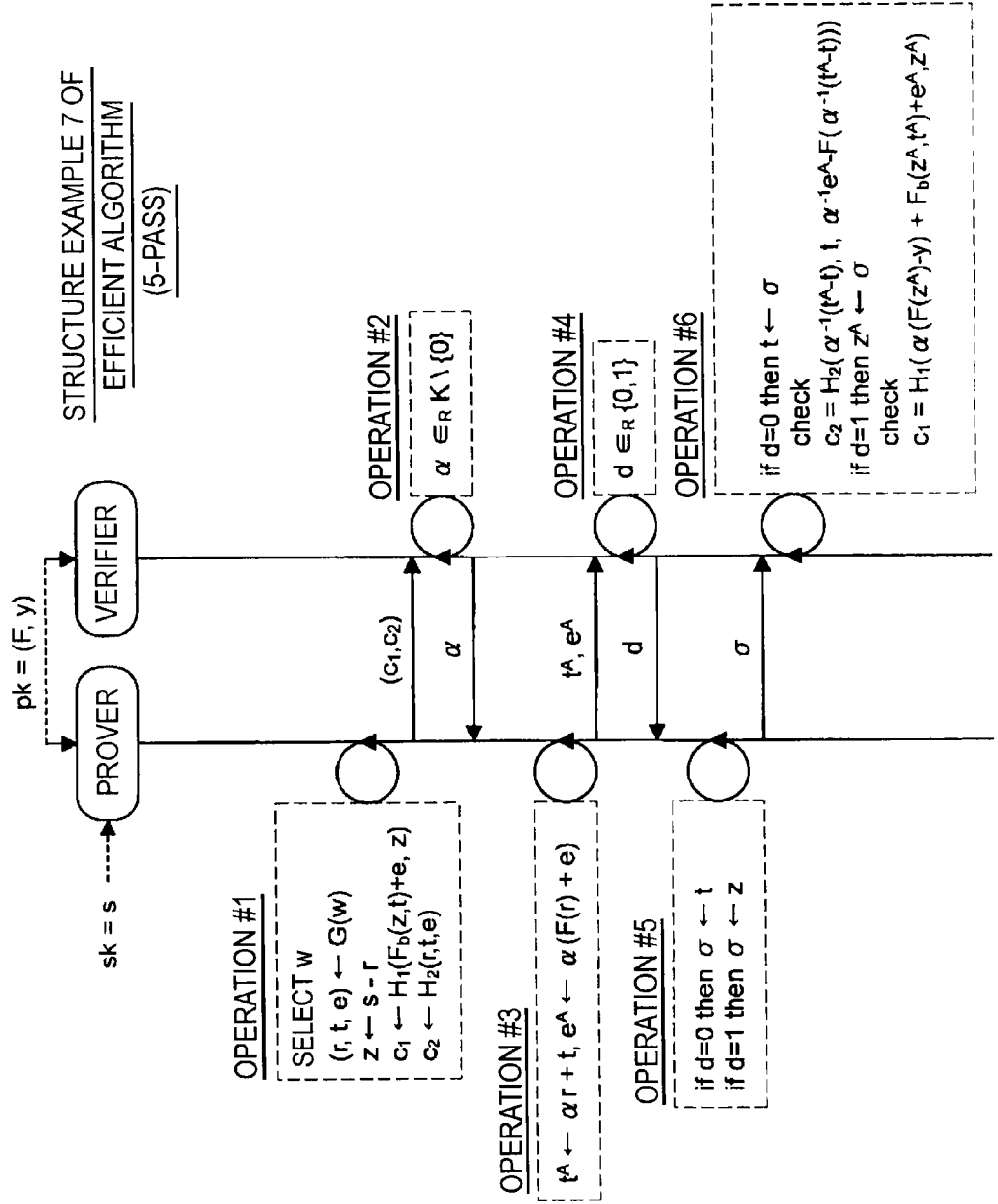
FIG. 27 is an explanatory diagram for describing an efficient algorithm of the public-key authentication scheme according to the same embodiment.

(Structure Example 7 of the Efficient Algorithm: FIG. 27)

Next, a structure of an efficient algorithm illustrated in FIG. 27 will be described. When the structure illustrated in FIG. 27 is applied, similarly to when the structure illustrated in FIG. 20 is applied, the effect that the communication efficiency and the calculation efficient are improved is obtained. Here, a difference with the structure illustrated in FIG. 25 will be described.

In operation #3 of the algorithm illustrated in FIG. 25, the calculation of $e^A \leftarrow \alpha F(r) + e$ is performed, but this calculation may be modified into a calculation of $e^A \leftarrow \alpha(F(r) + e)$ as illustrated in FIG. 27. When this modification is performed, in operation #6, when d=0, the verification content performed by the verifier algorithm V is replaced with verification of $c_2 = H_2(\alpha^{-1}(t^A - t), t, \alpha^{-1} e^A - \alpha F(\alpha^{-1}(t^A - t)))$.

The structure example 7 of the efficient algorithm has been described above.

Figure 29:
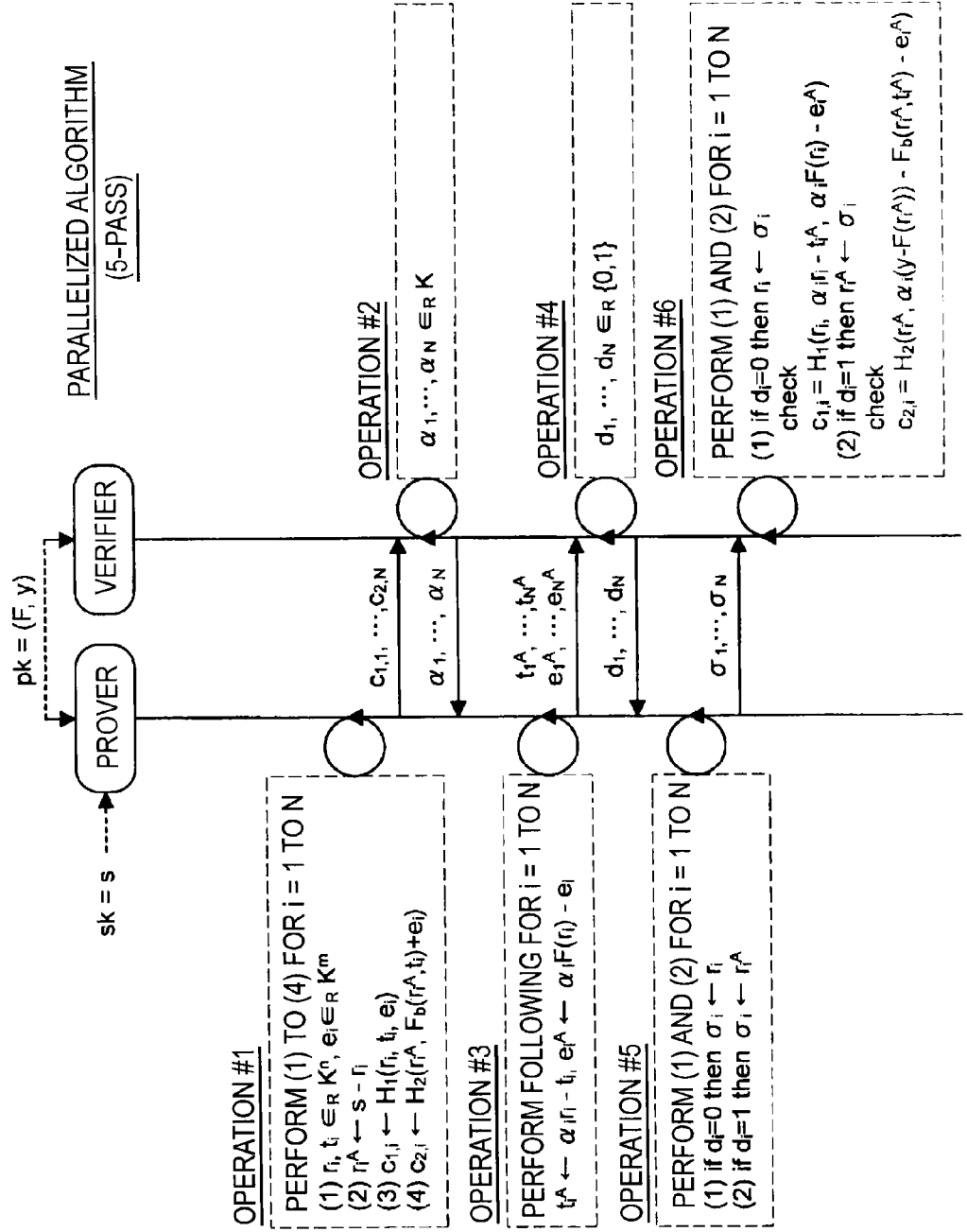
FIG. 29 is an explanatory diagram for describing parallelization of the efficient algorithm of the public-key authentication scheme according to the same embodiment.

(Parallelization of Efficient Algorithm: FIG. 29)

Figure 28:
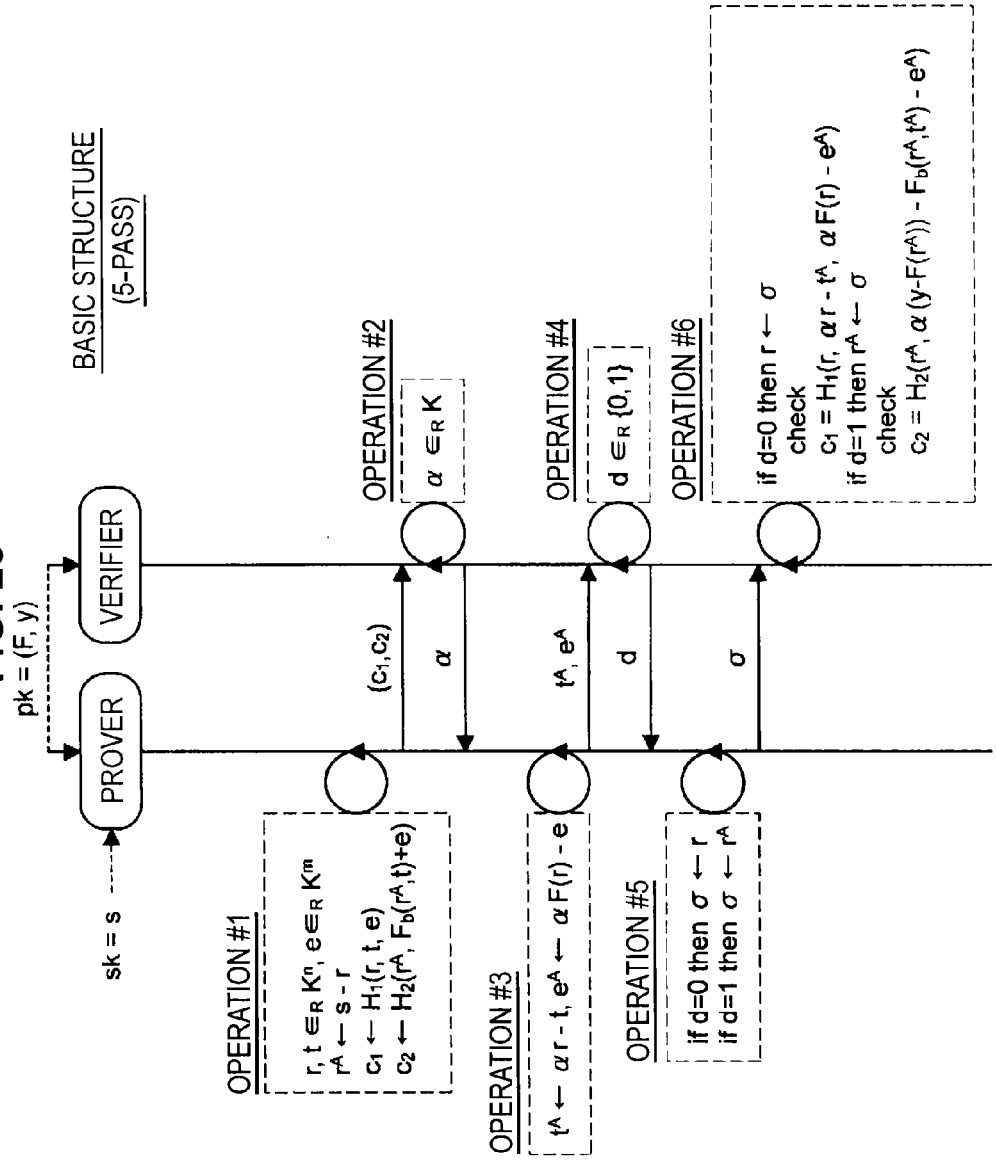
FIG. 28 is an explanatory diagram for describing parallelization of the efficient algorithm of the public-key authentication scheme according to the same embodiment.

Next, a method of parallelizing the efficient algorithm will be described with reference to FIG. 29. A structure (hereinafter referred to as a "parallelized algorithm") illustrated in FIG. 29 is one in which the efficient algorithm illustrated in FIG. 28 is parallelized. The efficient algorithm illustrated in FIG. 28 has substantially the same structure as the efficient algorithm illustrated in FIG. 22. The description will proceed with a flowchart illustrated in FIG. 29.

Operation #1:

The prover algorithm P performs the following processes (1) to (4) for i=1 to N.

Process (1): The prover algorithm P arbitrarily selects the vectors $r_i$ and $t_i$ that are elements of the set $K^n$, and $e_i$ that is an element of the set $K^m$.

Process (2): The prover algorithm P calculates $r_i^A \leftarrow s-r_i$. This calculation corresponds to an operation of masking the secret key s using the vector $r_i$.

Process (3): The prover algorithm P calculates $c_{1,i} \leftarrow H_i(r_i, t_i, e_i)$.

Process (4): The prover algorithm P calculates $c_{2,i} \leftarrow H_2(r_i^A, F_b(r_i^A, t_i) + e_i)$.

The message $(c_{1,1}, c_{2,1}, \ldots, c_{1,N}, c_{2,N})$ generated in operation #1 is sent to the verifier algorithm V.

Operation #2:

Upon receiving the messages $(c_{1,1}, c2_{,1}, \ldots, c_{1,N}, c2_{,N})$, the verifier algorithm V randomly selects one number $\alpha_i$ from the origins of q rings K, for each of i=1 to N, and sends the selected number $\alpha_i$ to the prover algorithm P.

Operation #3:

Upon receiving the number $\alpha_i$ (i=1 to N), the prover algorithm P calculates $t_i^A \leftarrow \alpha_i r_i - t_i$ for i=1 to N. Additionally, the prover algorithm P calculates $e_i^A \leftarrow \alpha_i F(r_i) - e_i$ for i=1 to N. Then, the prover algorithm P sends $t_1^A, \ldots, t_N^A$ and $e_1^A, \ldots, e_N^A$ to the verifier algorithm V.

Operation #4:

Upon receiving $t_1^A, \ldots, t_N^A$ and $e_1^A, \ldots, e_N^A$, the verifier algorithm V selects which verification pattern to use from between two verification patterns for i=1 to N. For example, the verifier algorithm V may select a numerical value from between two numerical values $\{0, 1\}$ representing verification patterns, and set the selected numerical value in a challenge $d_i$. This challenge $d_i$ (i=1 to N) is sent to the prover algorithm P.

Operation #5:

Upon receiving the challenge $d_i$ (where i=1 to N), the prover algorithm P generates a response $d_i$ to send to the verifier algorithm V in response to the received challenge $d_i$ for i=1 to N. In the case where $d_i=0$, the prover algorithm P generates a response $\sigma_i = r_i$. In the case where $d_i=1$, the prover algorithm P generates a response $\sigma_i = r_i^A$. The response $\sigma_i$ generated in operation #5 is sent to the verifier algorithm V.

Operation #4:

The verifier algorithm V that has received the response $\sigma_i$ (i=1 to N) performs the following verification process using the received response $\sigma_i$ (i=1 to N). The following process is performed for i=1 to N.

In the case where di=0, the verifier algorithm V executes $r_i \leftarrow \sigma_i$. Then, the verifier algorithm V verifies whether or not the equality of $c_{1,i} = H_1(r_i, \alpha_i r_i - t_i^A, \alpha_i F(r_1) - e_i^A)$ holds. The verifier algorithm V outputs the value 1 to indicate authentication success in the case where these verifications all succeed, and outputs the value 0 to indicate authentication failure in the case where a verification fails.

In the case where di=1, the verifier algorithm V executes $r_i^A \leftarrow \sigma_i$. Then, the verifier algorithm V verifies whether or not the equality of $c_{2,i} = H_2(r_i^A, \alpha_i(y - F(r_i^A)) - F_b(ti^A, r_i^A)$ holds. The verifier algorithm V outputs the value 1 to indicate authentication success in the case where these verifications all succeed, and outputs the value 0 to indicate authentication failure in the case where a verification fails.

The parallelization of the efficient algorithm has been described above.

Figure 30:
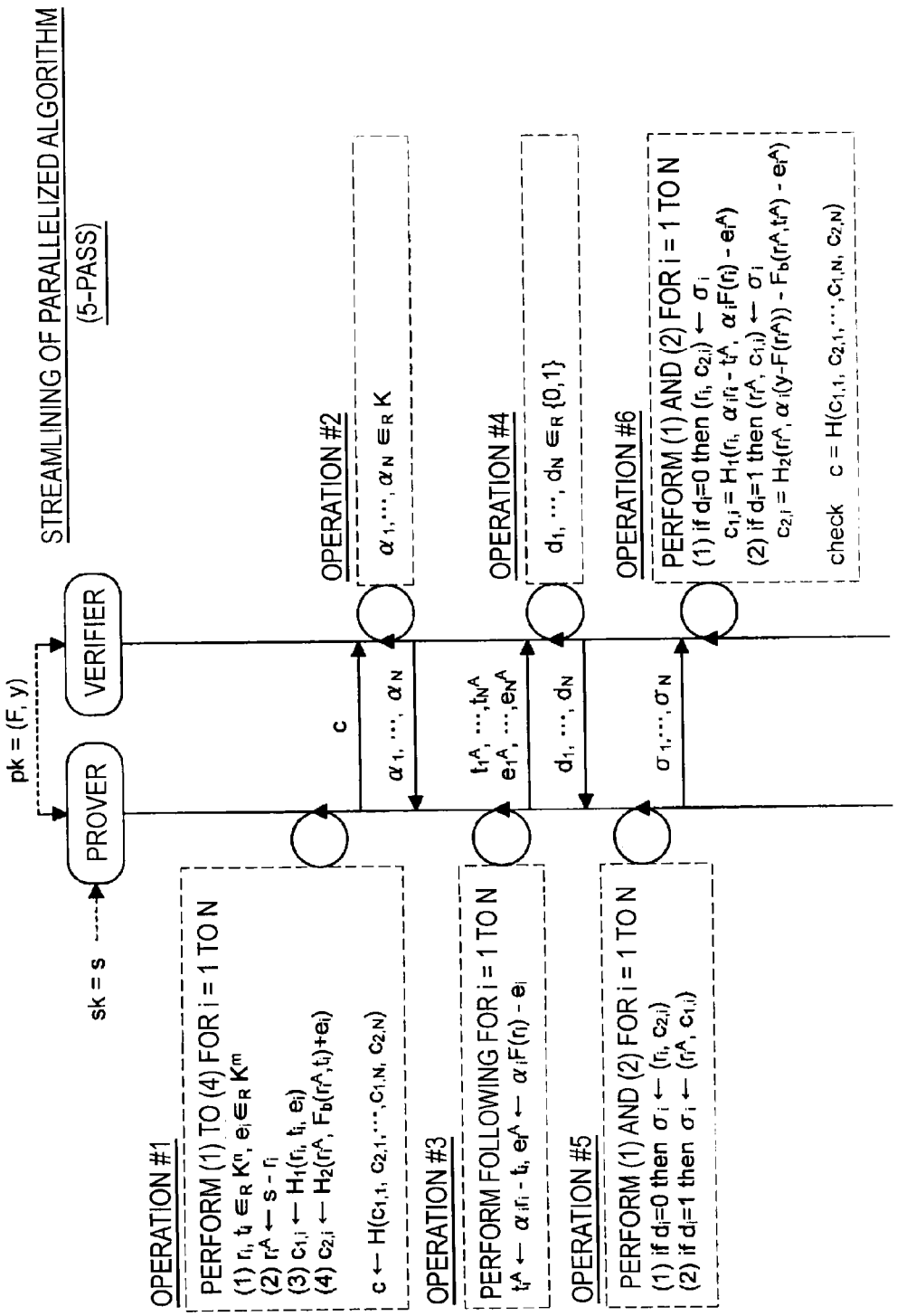
FIG. 30 is an explanatory diagram for describing further streamlining of the efficient algorithm of the public-key authentication scheme according to the same embodiment.

(Streamlining Of Parallelized Algorithm: FIG. 30)

The parallelized algorithm illustrated in FIG. 29 can be streamlined as illustrated in FIG. 30. As illustrated in FIG. 30, the parallelized algorithm is configured to convert a message $(c_{1,1}, c_{2,1}, \ldots, c_{1,N}, c_{2,N})$ into a hash value c and send the hash value c from the prover algorithm P to the verifier algorithm V at the first pass in operation #1. Further, the parallelized algorithm is configured to generate a response $\sigma_i = (r_i, c_{2,i})$ when $d_i=0$ and generate a response $\sigma_i = (r_i^A, c_{1,i})$ when $d_i=1$ in operation #5. Further, the parallelized algorithm is configured to perform the following process in operation #6.

Operation #6:

First of all, the verifier algorithm V performs processes (1) and (2) for i=1 to N. Practically, when $d_i=0$, process (1) is performed, and when $d_i=1$, process (2) is performed.

Process (1): When $d_i=0$, the verifier algorithm V performs $(r_i, c_{2,i}) \leftarrow \sigma_i$. Further, the verifier algorithm V calculates $c_{1,i} = H_1(r_i, \alpha_i r_i - t_i^A, \alpha_i F(r_i) - e_i^A)$. Then, the verifier algorithm V holds $(c_{1,i}, c_{2,i})$.

Process (2): When $d_i=1$, the verifier algorithm V performs $(r_i^A, c_{1,i}) \leftarrow \sigma_i$. Further, the verifier algorithm V calculates $c_{2,i} = H_2(r_i^A, \alpha_i(y - F(r_i^A)) - F_b(t_i^A, r_i^A) - e_i^A)$. Then, the verifier algorithm V holds $(c_{1,i}, c_{2,i})$.

After processes (1) and (2) are performed for i=1 to N, the verifier algorithm V verifies whether or not the equality of $c = H(c_{1,1}, c_{2,1}, \ldots, c_{1,N}, c_{2,N})$ holds. The verifier algorithm V outputs a value 1 representing authentication success when the verification succeeds, and outputs a value 0 representing an authentication failure when the verification fails.

The streamlining of the parallelized algorithm has been described above.

Figure 31:
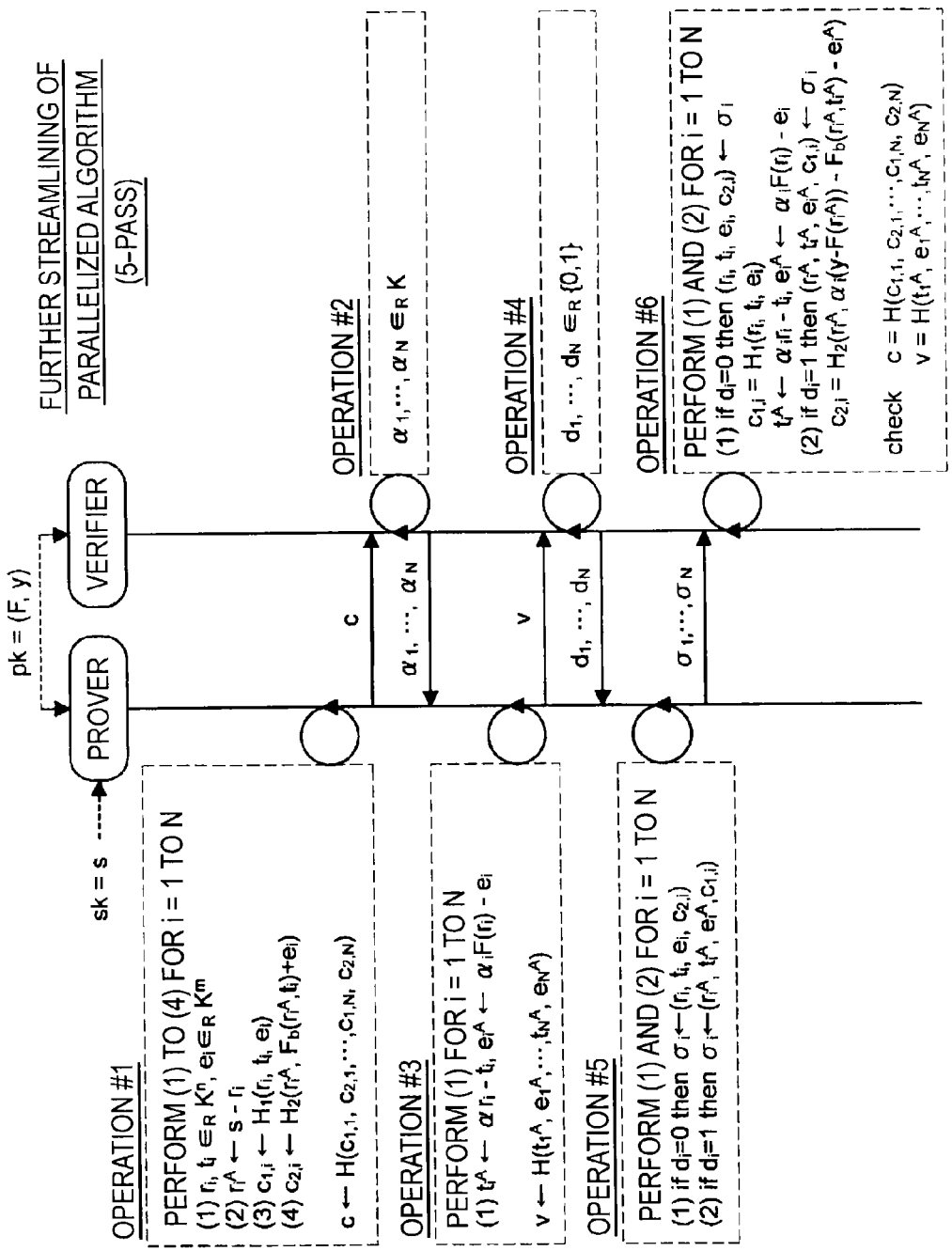
FIG. 31 is an explanatory diagram for describing further streamlining of the efficient algorithm of the public-key authentication scheme according to the same embodiment.

(Further Streamlining Of Parallelized Algorithm: FIG. 31)

The parallelized algorithm illustrated in FIG. 30 can be further streamlined as illustrated in FIG. 31. As illustrated in FIG. 31, the parallelized algorithm is configured to convert $(t_1^A, e_1^A, \ldots t_N^A, e_N^A)$ into a hash value v and send the hash value v from the prover algorithm P to the verifier algorithm V at the third pass in operation #3. Further, the parallelized algorithm is configured to generate a response $\sigma_i = (r_i, t_i, e_i, c_{2,i})$ when $d_i=0$ and generate a response $\sigma_i = (r_i^A, t_i^A, e_i^A, c_{1,i})$ when $d_i=1$ in operation #5. Further, the parallelized algorithm is configured to perform the following process in operation #6.

Operation #6:

First of all, the verifier algorithm V performs processes (1) and (2) for i=1 to N. Practically, when $d_i=0$, process (1) is performed, and when $d_i=1$, process (2) is performed.

Process (1): When $d_i=0$, the verifier algorithm V performs $(r_i, t_i, e_i, c_{2,i}) \leftarrow \sigma_i$. Then, the verifier algorithm V calculates $c_{1,i} = H_1(r_i, t_i, e_i)$. Further, the verifier algorithm V calculates $t_i^A \leftarrow \alpha_i r_i - t_i$ and $e_i^A \leftarrow \alpha_i F(r_i) - e_i$. Then, the verifier algorithm V holds $(c_{1,i}, c_{2,i})$ and $(t_i^A, e_i^A)$.

Process (2): When $d_i=1$, the verifier algorithm V performs $(r_i^A, t_i^A, e_i^A, c_{1,i}) \leftarrow \sigma_i$. Then, the verifier algorithm V calculates $c_{2,i} = H_2(r_i^A, \alpha_i (y - F(r_i^A)) - F_b(r_i^A, t_i^A) - e_i^A)$. Then, the verifier algorithm V holds $(c_{1,i}, c_{2,i})$ and $(t_i^A, e_i^A)$.

After processes (1) and (2) are performed for i=1 to N, the verifier algorithm V verifies whether or not the equality of $c = H(c_{1,1}, c_{2,1}, \ldots, c_{1,N}, c_{2,N})$ holds. Further, the verifier algorithm V verifies whether or not the equality of $v=H(t_1^A, e_1^A, \ldots, t_N^A, e_N^A)$ holds. The verifier algorithm V outputs a value 1 representing authentication success when the verifications succeed, and outputs a value 0 representing an authentication failure when the verifications fail.

The structure of further streamlining the parallelized algorithm has been described above. As described above, as a plurality of pieces of information exchanged between the prover algorithm P and the verifier algorithm V are converted into a hash value, it is possible to reduce the size of communication data of the third pass. Further, as the structure of the algorithm is modified to generate $r_i$, $t_i$, and $e_i$ from a single random number seed in the algorithm, an expectation value of a communication data size can be reduced. Further, when a limitation is set so that the number of 0s selected as the challenge $d_i$ is equal to the number of selected 1s, a communication data size is reliably reduced.

For example, when (q,n,m,N) is set to $(2^4,45,30,88)$, in the algorithm illustrated in FIG. 30, the public key occupies 120 bits, the secret key occupies 180 bits, and a communication data size occupies 42840 bits. Meanwhile, in the algorithm illustrated in FIG. 31, when (q,n,m,N) is set to $(2^4,45,30,88)$, the public key occupies 120 bits, the secret key occupies 180 bits, and a communication data size occupies 27512 bits. As the streamlining of the parallelized algorithm is further performed as described above, it is possible to remarkably reduce a communication data size.

[3-6: Serial Parallel Hybrid Algorithm]

In order to make a probability of a successful forgery negligibly small, the interactive protocol needs to be performed multiple times as described above. Further, as the method of performing the interactive protocol multiple times, the serial method and the parallel method have been introduced. Particularly, the parallel method has been described in connection with the specific parallelized algorithm. Here, a hybrid type algorithm in which the serial method is combined with the parallel method will be introduced.

(Hybrid Structure 1)

Figure 32:
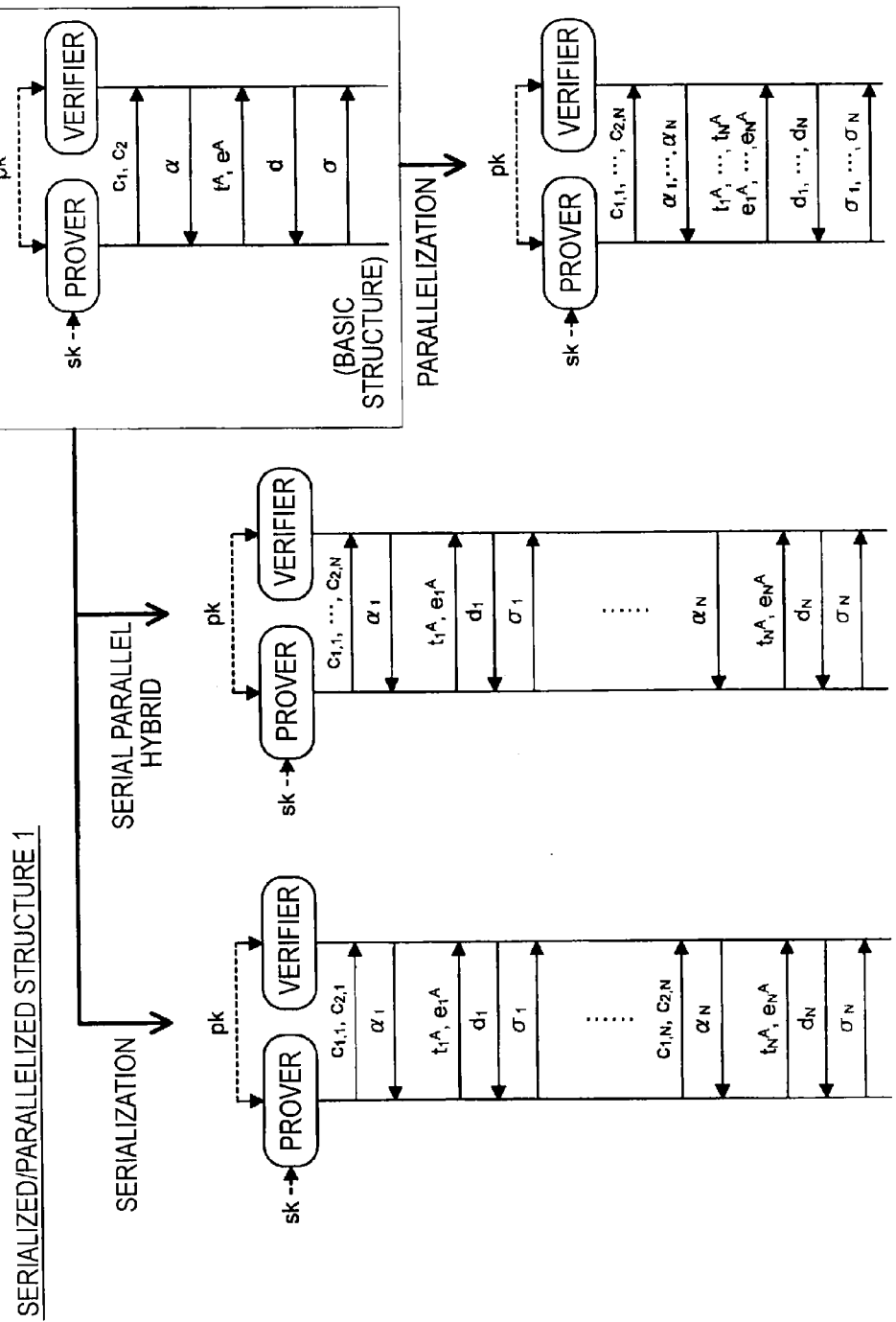
FIG. 32 is an explanatory diagram for describing a parallel serial structure of the efficient algorithm of the public-key authentication scheme according to the same embodiment.

A hybrid type algorithm (hereinafter referred to as a "parallel serial algorithm") will be described with reference to FIG. 32. FIG. 32 illustrates a basic structure related to the present technique, a serialized algorithm in which the basic structure is serialized, a parallelized algorithm in which the basic structure is parallelized, and a parallel serial algorithm.

In the basic structure, at the first pass, a message $(c_1,c_2,)$ is sent from the prover to the verifier. At the second pass, a number $\alpha$ is sent from the verifier to the prover. At the third pass, the vectors $t^A$ and $e^A$ are sent from the prover to the verifier. At the fourth pass, the challenge d is sent from the verifier to the prover. At the fifth pass, the response $\sigma$ is sent from the prover to the verifier.

When the basic structure is parallelized, at the first pass, messages $(c_{1,1}, c_{2,1}, \ldots, c_{1,N}, c_{2,N})$ of N times are sent from the prover to the verifier. At the second pass, numbers $(\alpha_1, \ldots, \alpha_N)$ of N times are sent from the verifier to the prover. At the third pass, the vectors $(t_1^A, \ldots, t_N^A, e_1^A, \ldots, e_N^A)$ of N times are sent from the prover to the verifier. At the fourth pass, challenges $(d_1, \ldots, d_N)$ of N times are sent from the verifier to the prover. At the fifth pass, responses $(\sigma_1, \ldots, \sigma_N)$ of N times are sent from the prover to the verifier.

The parallelized algorithm related to the present technique guarantees the security against the passive attack. Further, the number of interactivities is merely 5 times. Further, as messages of N times to be sent at the first pass or the vectors of N times to be sent at the third pass are converted into one hash value, the communication efficiency can be improved.

Meanwhile, when the basic structure is serialized, at the first pass, a message $(c_{1,1},c_{2,1})$ of one time is sent from the prover to the verifier. At the second pass, a number $\alpha_1$ of one time is sent from the verifier to the prover. At the third pass, a vector $(t_1^A,e_1^A)$ of one time is sent from the prover to the verifier. At the fourth pass, a challenge $d_1$ of one time is sent from the verifier to the prover. At the fifth pass, a response $\sigma_i$ of one time is sent from the prover to the verifier. Similarly, interactivity is repetitively performed until a response $\sigma_N$ is sent from the prover to the verifier. The serialized algorithm guarantees the security against the active attack. Further, it is possible to prove that a probability of false verification is reliably reduced.

The parallel serial algorithm is an algorithm having both the characteristics of the parallelized algorithm and the characteristics of the serialized algorithm. In the parallel serial algorithm illustrated in FIG. 32, at the first pass, messages $(c_{1,1}, c_{2,1}, \ldots, c_{1,N}, c_{2,N})$ of N times are sent from the prover to the verifier. At the second pass, a number $\alpha_1$ of one time is sent from the verifier to the prover. At the third pass, a vector $(t_1^A,e_1^A)$ of one time is sent from the prover to the verifier. At the fourth pass, a challenge $d_1$ of one time is sent from the verifier to the prover. At the fifth pass, a response $\sigma_1$ of one time is sent from the prover to the verifier. Thereafter, $\alpha_2, \ldots, \alpha_N$, $t_2^A, e_2^A, \ldots, t_N^A, e_N^A$, $d_2, \ldots d_N$, and $\sigma_2, \ldots, \sigma_N$ are exchanged between the prover and the verifier.

The parallel serial algorithm based on the present technique guarantees the security against the passive attack. Further, the number of interactivities is merely 4N+1 times. Further, when messages of N times sent at the first pass are collected with one hash value, the communication efficiency can be improved.

(Hybrid Structure 2)

Figure 33:
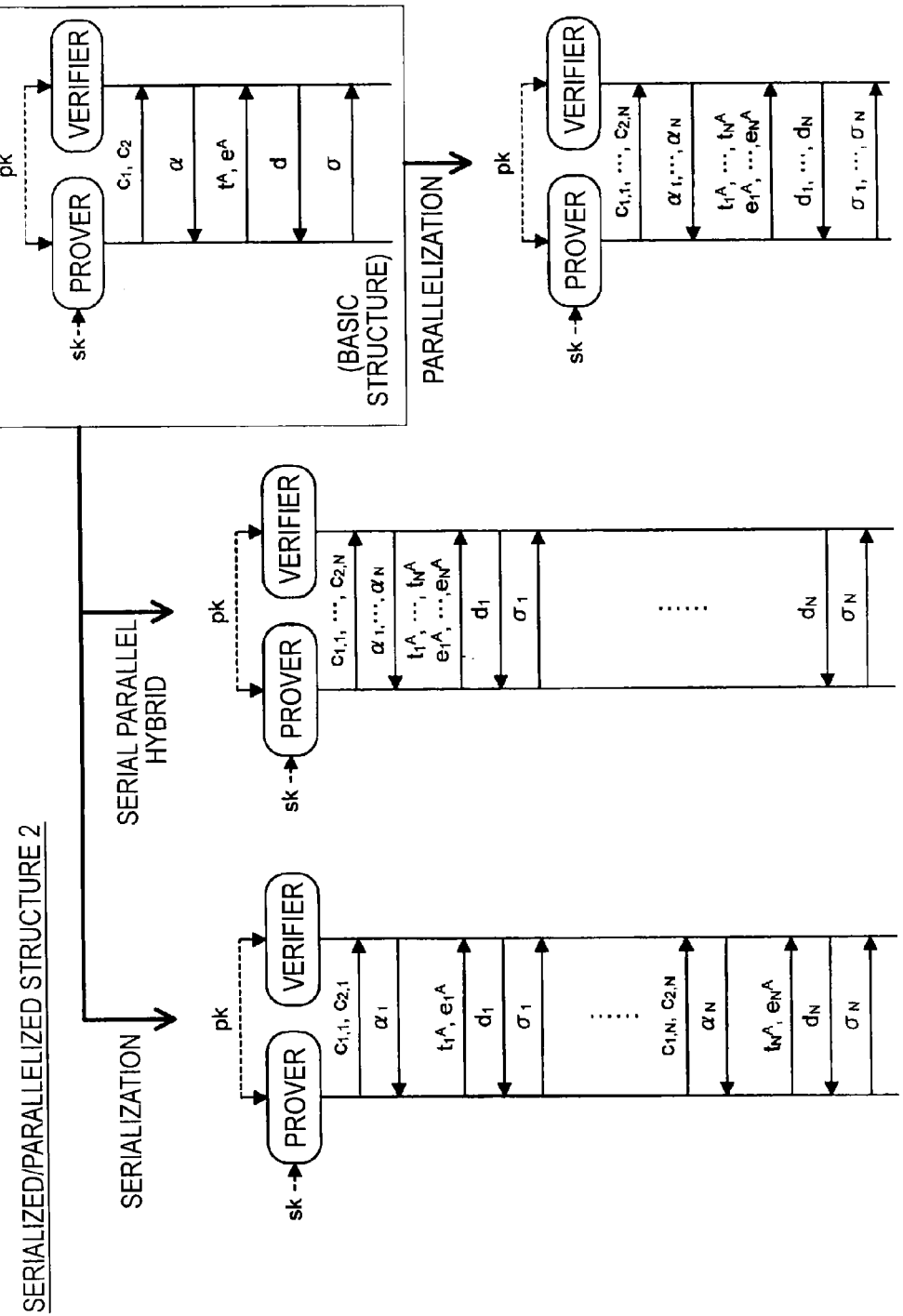
FIG. 33 is an explanatory diagram for describing a parallel serial structure of the efficient algorithm of the public-key authentication scheme according to the same embodiment.

Another parallel serial algorithm will be described with reference to FIG. 33. FIG. 33 illustrates a basic structure related to the present technique, a serialized algorithm in which the basic structure is serialized, a parallelized algorithm in which the basic structure is parallelized, and a parallel serial algorithm. The structures and characteristics of the basic structure, the serialized algorithm, and the parallelized algorithm are the same as described above.

The parallel serial algorithm illustrated in FIG. 33 is an algorithm having both the characteristics of the parallelized algorithm and the characteristics of the serialized algorithm. In this parallel serial algorithm, at the first pass, messages $(c_{1,1}, c_{2,1}, \ldots, c_{1,N}, c_{2,N})$ of N times are sent from the prover to the verifier. At the second pass, numbers $(\alpha_1, \ldots, \alpha_N)$ of N times are sent from the verifier to the prover. At the third pass, the vectors $(t_1^A, e_1^A, \ldots, t_N^A, e_N^A)$ of N times are sent from the prover to the verifier. At the fourth pass, a challenge $d_1$ of one time is sent from the verifier to the prover. At the fifth pass, a response $\sigma_1$ of one time is sent from the prover to the verifier. Thereafter, $d_2, \ldots, d_N$ and $\sigma_2, \ldots, \sigma_N$ are exchanged between the prover and the verifier.

The parallel serial algorithm based on the present technique guarantees the security against the passive attack. Further, the number of interactivities is merely 2N+3 times. Further, as messages of N times to be sent at the first pass are converted into one hash value, the communication efficiency can be improved.

(Hybrid Structure 3)

Figure 34:
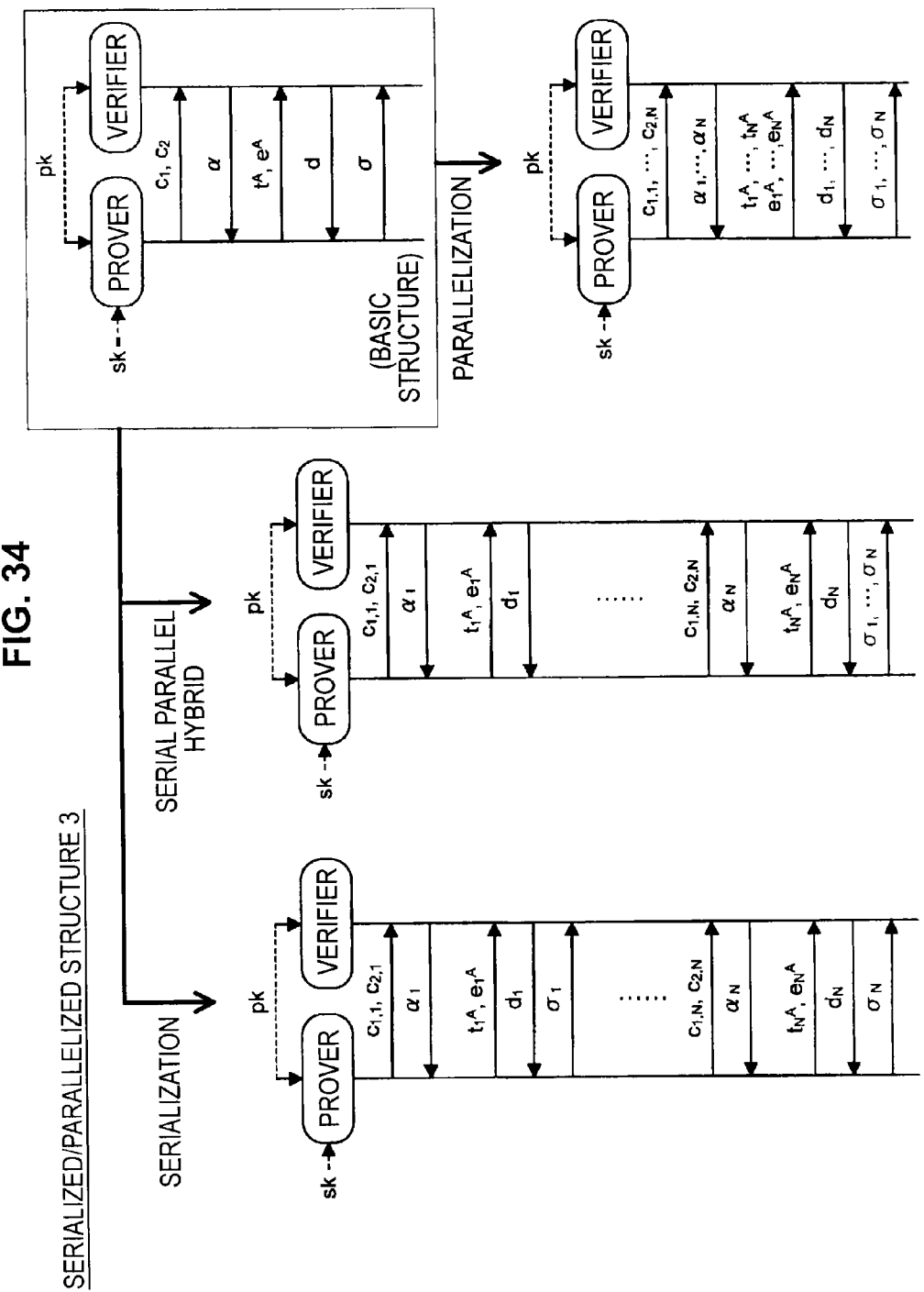
FIG. 34 is an explanatory diagram for describing a serial parallel structure of the efficient algorithm of the public-key authentication scheme according to the same embodiment.

Another hybrid type algorithm (hereinafter referred to as a "serial parallel algorithm") will be described with reference to FIG. 34. FIG. 34 illustrates a basic structure related to the present technique, a serialized algorithm in which the basic structure is serialized, a parallelized algorithm in which the basic structure is parallelized, and a serial parallel algorithm. The structures and characteristics of the basic structure, the serialized algorithm, and the parallelized algorithm are the same as described above.

The serial parallel algorithm illustrated in FIG. 34 is an algorithm having both the characteristics of the parallelized algorithm and the characteristics of the serialized algorithm. In this serial parallel algorithm, at the first pass, a message $(c_{1,1}, c_{2,1})$ of one time is sent from the prover to the verifier. At the second pass, a number $\alpha_1$ of one time is sent from the verifier to the prover. At the third pass, a vector $(t_1^A, e_1^A)$ of one time is sent from the prover to the verifier. At the fourth pass, a challenge $d_1$ of is sent from the verifier to the prover. Thereafter, $c_{1,2}, c_{2,2}, \ldots, c_{1,N}, c_{2,N}, \alpha_2, \ldots, \alpha_N, t_2^A, e_2^A \ldots, t_N^A, e_N^A$, and $d_2, \ldots, d_N$ are exchanged between the prover and the verifier. Finally, responses $(\sigma_1 \ldots, \sigma_N)$ of N times are sent from the prover to the verifier.

The serial parallel algorithm based on the present technique guarantees the security against the active attack. Further, the number of interactivities is merely 4N+1 times.

(Hybrid Structure 4)

Figure 35:
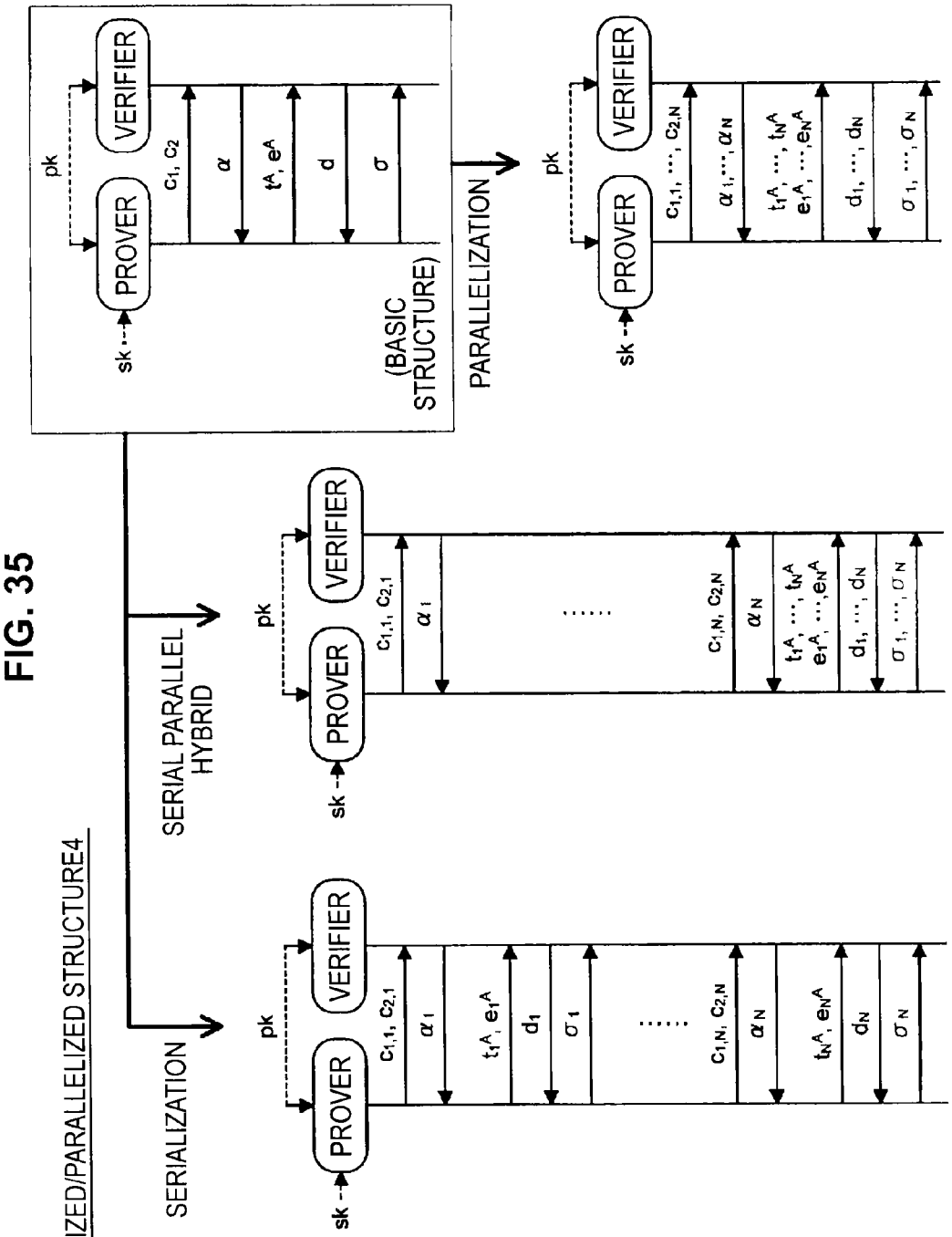
FIG. 35 is an explanatory diagram for describing a serial parallel structure of the efficient algorithm of the public-key authentication scheme according to the same embodiment.

Another serial parallel algorithm will be described with reference to FIG. 35. FIG. 35 illustrates a basic structure related to the present technique, a serialized algorithm in which the basic structure is serialized, a parallelized algorithm in which the basic structure is parallelized, and a serial parallel algorithm. The structures and characteristics of the basic structure, the serialized algorithm, and the parallelized algorithm are the same as described above.

The serial parallel algorithm illustrated in FIG. 35 is an algorithm having both the characteristics of the parallelized algorithm and the characteristics of the serialized algorithm. In this serial parallel algorithm, at the first pass, a message $(c_{1,1}, c_{2,1})$ of one time is sent from the prover to the verifier. At the second pass, a number $\alpha_1$ of one time is sent from the verifier to the prover. Thereafter, $c_{1,2}, c_{2,2}, \ldots, c_{1,N}, c_{2,N}$ and $\alpha_2, \ldots, \alpha_N$ are exchanged between the prover and the verifier. After $\alpha_N$ is exchanged, the vectors $(t_1^A, e_1^A, \ldots, t_N^A, e_N^A)$ of N times are sent from the prover to the verifier. Next, challenges $(d_1, \ldots, d_1)$ of N times are sent from the verifier to the prover. Finally, responses $(\sigma_1 \ldots, \sigma_N)$ of N times are sent from the prover to the verifier.

The serial parallel algorithm based on the present technique guarantees the security against the passive attack. Further, the number of interactivities is merely 2N+3 times.

The hybrid type algorithms based on the present technique have been described above.

The second embodiment of the present technology has been described above. A form of the multivariate simultaneous equations is the same as in the first embodiment.

<4: Extension of Efficient Algorithm>

Meanwhile, the efficient algorithms according to the first and second embodiments have the structure in which the second-order multivariate polynomial expressed by the following Formula (20) is used as the public key (or the system parameter). However, the efficient algorithms can be extended to have a structure in which a third- or higher-order multivariate polynomial is used as the public key (or the system parameter).

[4-1: High-Order Multivariate Polynomial]

For example, a structure in which a third- or higher-order multivariate polynomial (see the following Formula (21)) defined on a field of an order $q=p^k$ is used as the public key (or the system parameter) will be considered.

[Math 15]

$$f_l(x_1, \ldots, x_n) = \sum_{i=1}^{n}\sum_{j=1}^{n} a_{l,i,j} x_i x_j + \sum_{i=1}^{n} b_{l,i} x_i \quad (20)$$

$$f_l(x_1, \ldots, x_n) = \sum_{i=1}^{n}\sum_{j=1}^{n}\sum_{s=0}^{k-1}\sum_{t=0}^{k-1} a_{l,i,j,s,t} x_i^{p^s} x_j^{p^t} + \sum_{i=1}^{n}\sum_{s=0}^{k-1} b_{l,i,s} x_i^{p^s} \quad (21)$$

In the efficient algorithms according to the first and second embodiments, the multivariate polynomial $f_l$ is available as the public key when the following Formula (22) is bilinear for $(x_1, \ldots, x_1)$ and $(y_1, \ldots, y_n)$. In the multivariate polynomial expressed by Formula (20), bilinearity can be easily found (underlined parts are linear on each of $x_i$ and $y_i$ as expressed in the following Formula (23). Further, in the multivariate polynomial expressed by Formula (21), bilinearity can be similarly found as expressed in the following Formula (24). The underlined part in the following Formula (24) represents bilinearity in a field GF(p) of the order p. Thus, when the multivariate polynomial expressed by Formula (21) is used as the public key of the efficient algorithm according to the second embodiment, a number $\alpha$ to be sent to the verifier after operation #2 of the algorithm needs to be limited to an element of GF(p).

[Math 16]

$$f_l(x_1+y_1, \ldots, x_n+y_n) - f_l(x_1, \ldots, x_n) - f_l(y_1, \ldots, y_n) \quad (22)$$

$$f_l(x_1+y_1, \ldots, x_n+y_n) = \quad (23)$$

$$\sum_{i=1}^{n}\sum_{j=1}^{n} a_{l,i,j}(x_i+y_i)(x_j+y_j) + \sum_{i=1}^{n} b_{l,i}(x_i+y_i) =$$

$$\sum_{i=1}^{n}\sum_{j=1}^{n} a_{l,i,j}(x_i x_j + x_i y_j + y_i x_j + y_i y_j) + \sum_{i=1}^{n} b_{l,i}(x_i+y_i) =$$

$$f_l(x_1, \ldots, x_n) + f_l(y_1, \ldots, y_n) + \sum_{i=1}^{n}\sum_{j=1}^{n} a_{l,i,j}(x_i y_j + y_i x_j)$$

$$f_l(x_1+y_1, \ldots, x_n+y_n) = \quad (24)$$

$$\sum_{i=1}^{n}\sum_{j=1}^{n}\sum_{s=0}^{k-1}\sum_{t=0}^{k-1} a_{l,i,j,s,t}(x_i+y_i)^{p^s}(x_j+y_j)^{p^t} + \sum_{t=1}^{n}\sum_{s=0}^{k-1} b_{l,i,s}(x_i+y_i)^{p^t} =$$

$$\sum_{i=1}^{n}\sum_{j=1}^{n}\sum_{s=0}^{k-1}\sum_{t=0}^{k-1} a_{l,i,j,s,t}\left(x_i^{p^s}+y_i^{p^s}\right)\left(x_j^{p^t}+y_j^{p^t}\right) +$$

$$\sum_{t=1}^{n}\sum_{s=0}^{k-1} b_{l,i,s}\left(x_i^{p^s}+y_i^{p^s}\right) =$$

$$\sum_{i=1}^{n}\sum_{j=1}^{n}\sum_{s=0}^{k-1}\sum_{t=0}^{k-1} a_{l,i,j,s,t}\left(x_i^{p^s} x_j^{p^t} + x_i^{p^s} y_j^{p^t} + y_i^{p^s} x_j^{p^t} + y_i^{p^s} y_j^{p^t}\right) +$$

$$\sum_{t=1}^{n}\sum_{s=0}^{k-1} b_{l,i,s}\left(x_i^{p^s}+y_i^{p^s}\right) = f_l(x_1, \ldots, x_n) +$$

$$f_l(y_1, \ldots, y_n) + \sum_{i=1}^{n}\sum_{j=1}^{n}\sum_{s=0}^{k-1}\sum_{t=0}^{k-1} a_{l,i,j,s,t}\left(x_i^{p^s} y_j^{p^t} + y_i^{p^s} x_j^{p^t}\right)$$

For the above reason, it is possible to constitute an algorithm in which a third- or higher-order multivariate polynomial expressed by Formula (21) is used as the public key by extending the efficient algorithms according to the first and second embodiments.

Next, a relation between the multivariate polynomial (hereinafter, referred to as a "second-order polynomial") expressed by Formula (20) and the multivariate polynomial (hereinafter referred to as a "multi-order polynomial") expressed by Formula (20) will be reviewed. Here, an nk-variable second-order polynomial defined on a field of an order q=p and an n-variable multi-order polynomial defined on a field of an order $q=p^k$ are considered. In this case, difficulty in solving a simultaneous equation configured with mk second-order polynomials is equivalent to difficulty in solving a simultaneous equation configured with m multi-order polynomials. For example, a simultaneous equation configured with 80 80-variable second-order polynomials defined on a field of an order 2 is equivalent in solving difficulty to 10 10-variable multi-order polynomials defined on a field of an order $2^8$.

In other words, when an element of $GF(p^k)$ and an element of $GF(p)^k$ are considered to be the same by isomorphic mapping, there is a function expressed by m n-variable multi-order polynomial sets defined on a field of an order $q=p^k$ which is equivalent to a function expressed by mk nk-variable second-order polynomial sets defined on a field of an order q=p. For example, when an element of $GF(2^8)$ and an element of $GF(2)^8$ are considered to be the same by isomorphic mapping, there is a function expressed by 10 10-variable multi-order polynomial sets defined on a field of an order $2^8$ which is equivalent to a function expressed by 80 80-variable second-order polynomial sets defined on a field of an order 2. Thus, it is possible to arbitrarily select whether to use the second-order polynomial or the multi-order polynomial.

Here, let us review calculation efficiency when the second-order polynomial is used as calculation efficiency when the multi-order polynomial is used.

When the nk-variable second-order polynomial defined on a field of an order 2 is used, an operation included in the algorithm is performed on nk 1-bit variables. In other words, an operation unit is 1 bit. Meanwhile, when the n-variable multi-order polynomial defined on a field of an order $2^k$, an operation included in the algorithm is performed on n k-bit variables. In other words, an operation unit is k bits. k (k=2, 3, 4, . . . ) can be arbitrarily set. Thus, when implemented, by setting k to an appropriate value, it is possible to improve the calculation efficiency. For example, when an algorithm is implemented on a 32-bit architecture, a structure in which an operation is performed in units of 32 bits is higher in calculation efficiency than a structure in which an operation is performed in units of one bit.

As the efficient algorithms according to the first and second embodiments are extended so that the multi-order polynomial can be used as the public key as described above, it is possible to adjust an operation unit according to an architecture on which it is implemented. As a result, the calculation efficiency can be improved.

[4-2: Extension Scheme (Addition of High-Order Term)]

Meanwhile, as a method of using a third- or higher-order multi-order polynomial, a method of adding a third- or higher-order term to a second-order polynomial is considered as well. For example, as expressed in the following Formula (25), a method of adding a fourth-order term to the second-order polynomial expressed by Formula (20) is considered. When the multi-order polynomial $f_l$ is defined as in the following Formula (25), a term $g_l(x,y)$ defined by the following Formula (26) is expressed as in the following Formula (27). In the following, the term $g_l(x,y)$ is referred to as a "polar form."

[Math 17]

$$f_l(x_1, \ldots, x_n) = x_1 x_2 x_3 x_4 + \sum_{i=1}^{n}\sum_{j=1}^{n} a_{l,i,j} x_i x_j + \sum_{i=1}^{n} b_{l,i} x_i \quad (25)$$

$$g_l(x_1, \ldots, x_n, y_1, \ldots, y_n) = \quad (26)$$
$$f_l(x_1+y_1, \ldots, x_n+y_n) - f_l(y_1, \ldots, y_n) - f_l(x_1, \ldots, x_n)$$

$$g_l(x_1, \ldots, x_n, y_1, \ldots, y_n) = (x_1+y_1)(x_2+y_2)(x_3+y_3)(x_4+y_4) - \quad (27)$$
$$x_1 x_2 x_3 x_4 - y_1 y_2 y_3 y_4 + \sum_{i=1}^{n}\sum_{j=1}^{n}(a_{l,i,j}+a_{l,j,i})x_i y_j$$

As expressed in Formula (27), the term $g_l(x,y)$ is not bilinear. In this regard, 6 terms $x_i x_j$ having two variables selected from four variables $x_1$, $x_2$, $x_3$, and $x_4$ and 3 terms $x_i x_j x_k$ having three variables selected from four variables $x_1$, $x_2$, $x_3$, and $x_4$ are expressed by four variables $t_{ij}$, $t_{ij}^A$, $t_{ijk}$, and $t_{ijk}^A$ as in the following Formulas (28) and (29). When this expression is used, the efficient algorithm can be implemented using the third- or higher-order multivariate polynomial. In the example expressed in Formula (25), a fourth-order term is added to the second-order polynomial, a third-order (for example, $x_1 x_2 x_3$) or a fifth- or higher-order term (for example, $x_1 x_2 x_3 x_4 x_5$) may be added instead of the fourth-order term. By adding a third- or higher-order term, it is possible to improve robustness of an equation.

[Math 18]

$$x_i x_j = t_{ij} + t_{ij}^A \quad (28)$$

$$x_i x_j x_k = t_{ijk} + t_{ijk}^A \quad (29)$$

<5: Mechanism for Increasing Robustness>

Here, a mechanism for further increasing robustness of the algorithms according to the first and second embodiments will be introduced.

[5-1: Method of Setting System Parameters]

How to set coefficients of the multivariate polynomials and a random number seed (hereinafter, referred to as coefficients and the like of the multivariate polynomials) used to generate the coefficients have not been described above. The coefficients and the like of the multivariate polynomials may be parameters common to a system or may be parameters different for each user.

However, when the coefficients and the like of the multivariate polynomials are set to parameters common to a system, it may be necessary to update the setting of the entire system if weakness for the multivariate polynomials is found. Additionally, average robustness (difficulty of solving) is analyzed for the multivariate polynomials having randomly selected coefficients, but it is difficult to ensure sufficient robustness for the multivariate polynomials having certain specific coefficients.

Accordingly, the inventors of the present technology have devised a structure in which coefficients of multivariate polynomials are generated by using a character string or the like selected by each user in a seed of a pseudo-random number generator and generating the coefficients of the multivariate polynomials. For example, conceivable methods include a method of using an e-mail address of a user in a seed and a method of using a character string in which an e-mail address, an update date, and the like are combined in a seed. When such methods are used, an influence is limited only to a user using the multivariate polynomials having the coefficients even if weakness is found in the multivariate polynomials having the coefficients generated from a given character string. Additionally, since the multivariate polynomials are changed merely by changing a character string, the weakness can easily be resolved.

The method of setting system parameters has been described above. In the foregoing description, a character string has been given as an example, but a different number string or a different sign string may be used for each user.

[5-2: Method of Responding to Irregular Challenge]

Next, a method of responding to an irregular challenge will be described.

(5-2-1: Responding Method by Prover)

Figure 36:
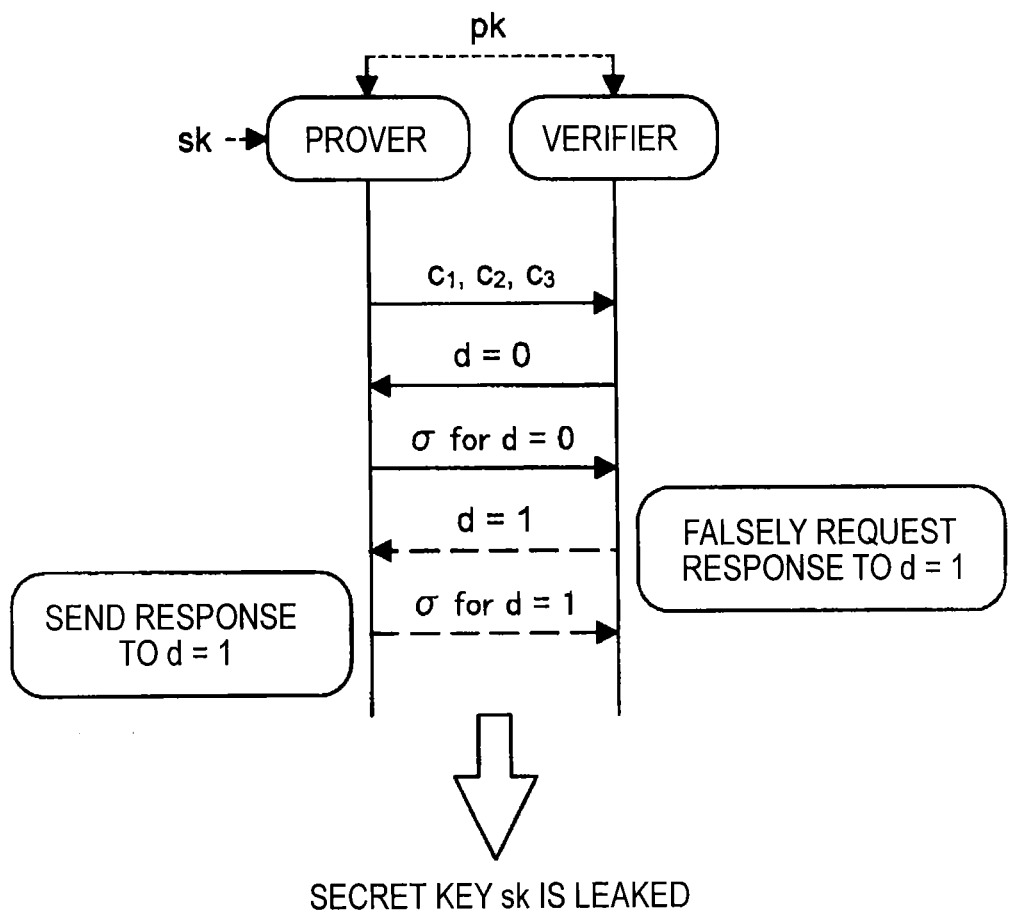
FIG. 36 is an explanatory diagram for describing a technique of improving robustness of an interactive protocol according to the first and second embodiments.

As illustrated in FIG. 36, the verifier is likely to provide a false challenge during the interactive protocol. In the example of FIG. 36, the prover sends a message $(c_1,c_2,c_3)$ to the verifier, the verifier sends a challenge d=0 to the prover, and then a response σ corresponding to the challenge d=0 is sent from the prover to the verifier. This process is a normal interactivity.

However, in the example of FIG. 36, the verifier further requests the prover to send a response σ corresponding to a challenge d=1. If the prover sends the response σ corresponding to the challenge d=1 to the verifier in response to the request, the secret key is leaked to the verifier. The leakage of the secret key is likely to occur practically. For example, the verifier may feign that the challenge d=0 was sent rather than the challenge d=1 at the second pass and may further challenge the response Rsp responding to the challenge d=1. On the other hand, the prover may misunderstand that bits of the challenge d sent at the second pass turn into different bits due to a communication error.

In this regard, the inventors of the present technology have devised a method of avoiding the leakage of the secret key. Specifically, the inventors of the present technology have devised a method of deciding whether interactivity is to be terminated or resumed from the first pass using a new random number when the prover requests responses corresponding to two or more challenges d on a single message. When this method is applied, the secret key is not leaked even when the verifier falsely requests responses corresponding to two or more challenges d.

The technique of preventing the secret key from being leaked by the irregular challenge has been described. Here, the 3-pass basic structure has been described as an example, but the same technique can be applied to the serial method, the parallel method, or the hybrid type algorithm, and in this case, the security can be improved. Of course, this technique is similarly applied even to the 5-pass algorithm.

(5-2-2: Responding Method by Verifier)

Figure 37:
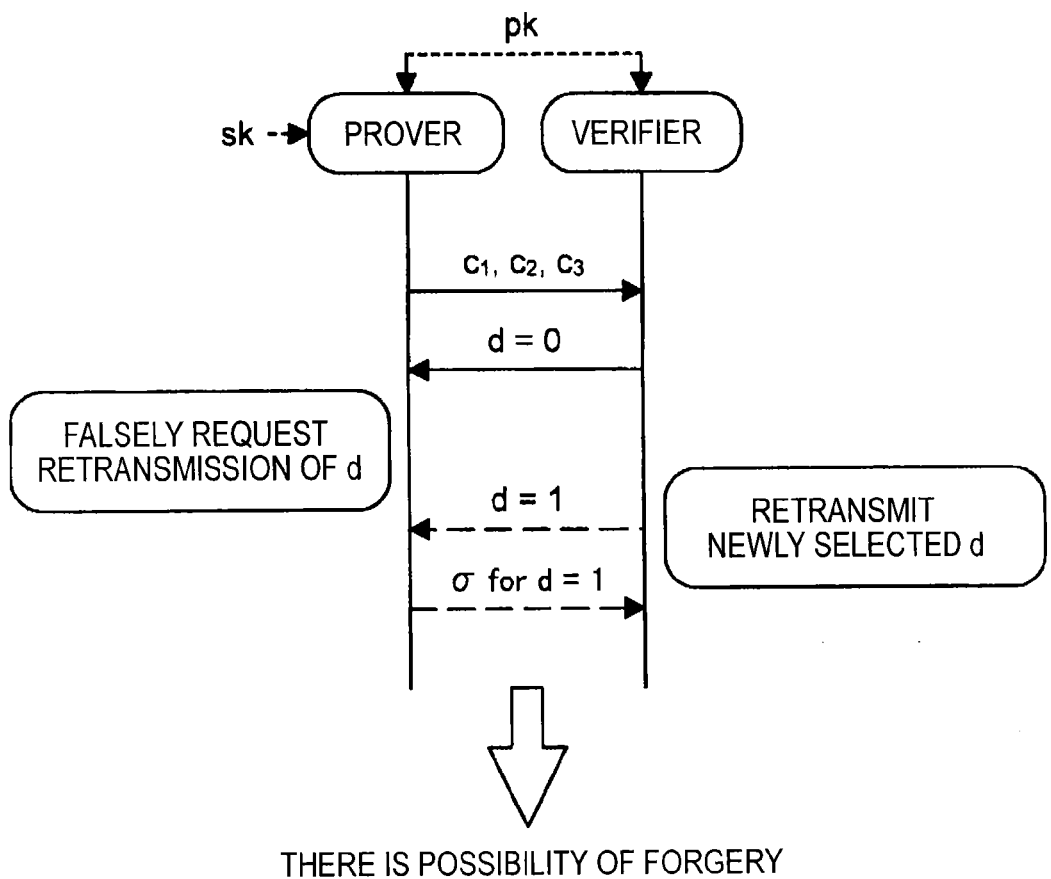
FIG. 37 is an explanatory diagram for describing a technique of improving robustness of an interactive protocol according to the first and second embodiments.

Further, as illustrated in FIG. 37, the prover may falsely request retransmission of the challenge d. In the example of FIG. 37, the prover sends a message $(c_1,c_2,c_3)$ to the verifier, the verifier sends a challenge d=0 to the prover, and then the prover requests retransmission of the challenge d. In response to this request, when the verifier randomly selects the challenge d again, the challenge d=1 different from the challenge d=0 which has been sent is likely to be selected. In this case, the challenge d=1 is sent from the verifier to the prover. In the example of FIG. 37, the prover sends the response σ corresponding to the challenge d=1 to the verifier.

However, there is a possibility of the prover being able to respond to the challenge d=1 but not to the challenge d=0. In other words, it is difficult to deny the risk of the prover committing forgery. For example, the prover may request to the verifier to retransmit the challenge d since the challenge d was lost. However, the verifier may think that the previously sent challenge was lost due to a communication error and retransmit the challenge d in response to the prover's request. Then, when the retransmitted challenge d is different from the previously transmitted challenge d, forgery succeeds.

As can be understood from the example of FIG. 37, when the challenge d is randomly selected, the prover faces a risk of forgery. In this regard, the inventors of the present technology have devised a method of preventing a risk of forgery. In this method, the interactive protocol is improved such that the verifier terminates interactivity or resends the same challenge d as the previous challenge without generating a new random number when the prover requests transmission of the challenge d again on a single message. When this method is applied, it is possible to prevent a risk of forgery using a retransmission request of the challenge d.

The method of preventing forgery from being successfully by an irregular challenge has been described above. Here, the 3-pass basic structure has been described as an example, but the same technique can be applied even to the serial method, the parallel method, or the hybrid type algorithm, and in this case, the security can be improved. This technique is similarly applied to the 5-pass algorithm.

<6: Hardware Configuration>

Each algorithm described above can be performed by using, for example, the hardware configuration of the information processing apparatus shown in FIG. 38. That is, processing of each algorithm can be realized by controlling the hardware shown in FIG. 38 using a computer program. Additionally, the mode of this hardware is arbitrary, and may be a personal computer, a mobile information terminal such as a mobile phone, a PHS or a PDA, a game machine, a contact or contactless IC chip, a contact or contactless IC card, or various types of information appliances. Moreover, the PHS is an abbreviation for Personal Handy-phone System. Also, the PDA is an abbreviation for Personal Digital Assistant.

As shown in FIG. 38, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control (hereinafter, remote control) that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<7: Summary>

Lastly, the technical contents according to the embodiment of the present technology will be briefly described. The technical contents stated here can be applied to various information processing apparatuses, such as a personal computer, a mobile phone, a game machine, an information terminal, an information appliance, a car navigation system, and the like. Further, the function of the information processing apparatus described below can be realized by using a single information processing apparatus or using a plurality of information processing apparatuses. Furthermore, a data storage means and an arithmetic processing means which are used for performing a process by the information processing apparatus described below may be mounted on the information processing apparatus, or may be mounted on a device connected via a network.

The elements of the information processing apparatus are implemented as follows. For example, the information processing apparatus described in the following (1) can show the verifier that it is aware of the secret key s without leaking information of the secret key s to the verifier at all by performing the interactive protocol with the verifier using the multi-order multivariate polynomial set F as the public key. In other words, the information processing apparatus described in the following (1) has an authentication function of the public-key authentication scheme in which safety is based on difficulty in solving the multi-order multivariate simultaneous equation.

Further, the information processing apparatus described in the following (1) uses not information common to the entire system, but information differing according to a user, when a multi-order multivariate polynomial set F is generated. Accordingly, even when the multi-order multivariate polynomial set F is not available, it is possible to make the disadvantageous effects minimum. In other words, the security is improved. The application of the technology according to the following (2) to (29) can realize the equal or higher security to or than the security realized by use of the information processing apparatus described in the following (1).

(1)

An information processing apparatus including:

a message generating unit that generates a message based on a multi-order multivariate polynomial set $F=(f_1, \ldots, f_m)$ defined on a ring K and a vector s that is an element of a set $K^n$;

a message providing unit that provides the message to a verifier holding the multi-order multivariate polynomial set F and a vector $y=(y_1, \ldots, y_m)=(f_1(s), \ldots, f_m(s))$; and a response providing unit that provides the verifier with response information corresponding to a verification pattern selected by the verifier from among k (where $k \geq 3$) verification patterns, wherein the vector s is a secret key, wherein the multi-order multivariate polynomial set F and the vector y are public keys, wherein the message is information obtained by performing an operation prepared for a verification pattern corresponding to the response information in advance using the public keys and the response information, and wherein the multi-order multivariate polynomial set F is generated using information differing according to a user who generates the public keys.

(2)

The information processing apparatus according to (1), wherein the multi-order multivariate polynomial set F is set in a manner that $F_b(x,y)$ defined as $F_b(x,y)=F(x+y)-F(x)-F(y)$ is bilinear for x and y.

(3)

The information processing apparatus according to (1) or (2), wherein the message generating unit generates messages of N times (where $N \geq 2$), wherein the message providing unit provides the verifier with the messages of N times through single interactivity, and wherein the response providing unit provides the verifier with the response information of N times corresponding to verification patterns selected by the verifier on the respective messages of N times through single interactivity.

(4)

The information processing apparatus according to (1) or (2), wherein the message generating unit generates messages of N times (where N≥2) and generates a single hash value based on the messages of N times, wherein the message providing unit provides the verifier with the hash value, and wherein the response providing unit provides the verifier with the response information of N times corresponding to the verification patterns selected by the verifier on the respective messages of N times and a part of messages through single interactivity, the part of messages not being obtained even when an operation prepared for a verification pattern corresponding to the response information in advance is performed using the public keys and the response information.

(5)

An information processing apparatus including:

an information holding unit that holds a multi-order multivariate polynomial set $F=(f_1, \ldots, f_m)$ defined on a ring K and a vector $y=(y_1, \ldots, y_m)=(f_1(s), \ldots, f_m(s))$;

a message acquiring unit that acquires a message generated based on the multi-order multivariate polynomial set F and a vector s that is an element of a set $K^n$;

a pattern information providing unit that provides a prover that has provided the message with information on a single verification pattern randomly selected from among k (where k≥3) verification patterns;

a response acquiring unit that acquires response information corresponding to the selected verification pattern from the prover; and a verifying unit that verifies whether the prover holds the vector s based on the message, the multi-order multivariate polynomial set F, the vector y, and the response information, wherein the vector s is a secret key, wherein the multi-order multivariate polynomial set F and the vector y are public keys, wherein the message is information obtained by performing an operation prepared for a verification pattern corresponding to the response information in advance using the public keys and the response information, and wherein the multi-order multivariate polynomial set F is generated using information differing according to a user who generates the public keys.

(6)

The information processing apparatus according to (5), wherein the multi-order multivariate polynomial set F is set in a manner that $F_b(x,y)$ defined as $F_b(x,y)=F(x+y)-F(x)-F(y)$ is bilinear for x and y.

(7)

The information processing apparatus according to (5) or (6), wherein the message acquiring unit acquires the messages of N times (where N≥2) through single interactivity, wherein the pattern information providing unit selects verification patterns on the respective messages of N times, and provides the prover with information on the selected verification patterns of N times through single interactivity, wherein the response acquiring unit acquires the response information of N times corresponding to the selected verification patterns of N times from the prover through single interactivity, and wherein the verifying unit determines that the prover holds the vector s, when verifications on all the messages of N times succeed.

(8)

The information processing apparatus according to (5) or (6), wherein the message acquiring unit acquires a single hash value generated based on the messages of N times (where N≥2), wherein the response acquiring unit acquires the response information corresponding to the selected verification pattern and a part of messages from the prover, the part of messages not being obtained even when an operation prepared for a verification pattern corresponding to the response information in advance is performed using, the public keys and the response information from the prover, and wherein the verifying unit verifies whether the prover holds the vector s based on the hash value, the part of messages, the public keys, and the response information.

(9)

An information processing apparatus including:

a message generating unit that generates a message based on a multi-order multivariate polynomial set $F=(f_1, \ldots, f_m)$ defined on a ring K and a vector s that is an element of a set $K^n$;

a message providing unit that provides the message to a verifier holding the multi-order multivariate polynomial set F and a vector $y=(y_1, \ldots, y_m)=(f_1(s), \ldots, f_m(s))$; and an interim information generating unit that generates third information using first information randomly selected by the verifier and second information obtained when the message is generated;

an interim information providing unit that provides the verifier with the third information; and a response providing unit that provides the verifier with response information corresponding to a verification pattern selected by the verifier from among k (where k≥2) verification patterns, wherein the vector s is a secret key, wherein the multi-order multivariate polynomial set F and the vector y are public keys, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys, (10)

The information processing apparatus according to (9), wherein the multi-order multivariate polynomial set F is set in a manner that $F_b(x,y)$ defined as $F_b(x,y)=F(x+y)-F(x)-F(y)$ is bilinear for x and y.

(11)

The information processing apparatus according to (9) or (10), wherein the message generating unit generates messages of N times (where N≥2), wherein the message providing unit provides the verifier with the messages of N times through single interactivity, wherein the interim information generating unit generates the third information of N times using the first information selected by the verifier on the respective messages of N times and the second information of N times obtained when the messages are generated, wherein the interim information providing unit provides the verifier with the third information of N times through single interactivity, and wherein the response providing unit provides the verifier with the response information of N times corresponding to the verification patterns selected by the verifier on the respective messages of N times through single interactivity.

(12)

The information processing apparatus according to (9) or (10), wherein the message generating unit generates messages of N times (where N≥2) and generates a single hash value based on the messages of N times, wherein the message providing unit provides the verifier with the hash value, wherein the interim information generating unit generates the third information of N times using the first information selected by the verifier on the respective messages of N times and the second information of N times obtained when the messages are generated, wherein the interim information providing unit provides the verifier with the third information of N times through single interactivity, and wherein the response providing unit provides the verifier with the response information of N times corresponding to the verification patterns selected by the verifier on the respective messages of N times and a part of messages through single interactivity, the part of messages not being obtained even when an operation prepared for a verification pattern corresponding to the response information in advance is performed using the public keys and the response information.

(13)

An information processing apparatus including:

an information holding unit that holds a multi-order multivariate polynomial set $F=(f_1, \ldots, f_m)$ defined on a ring K and a vector $y=(y_1, \ldots, y_m)=(f_1(s), \ldots, f_m(s))$;

a message acquiring unit that acquires a message generated based on the multi-order multivariate polynomial set F and a vector s that is an element of a set $K^n$;

an information providing unit that provides a prover that has provided the message with randomly selected first information;

an interim information acquiring unit that acquires third information generated by the prover using the first information and second information obtained when the message is generated;

a pattern information providing unit that provides the prover with information on a single verification pattern randomly selected from among k (where k≥3) verification patterns;

a response acquiring unit that acquires response information corresponding to the selected verification pattern from the prover; and a verifying unit that verifies whether the prover holds the vector s based on the message, the first information, the third information, the multi-order multivariate polynomial set F, and the response information, wherein the vector s is a secret key, wherein the multi-order multivariate polynomial set F and the vector y are public keys, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys.

(14)

The information processing apparatus according to (13), wherein the multi-order multivariate polynomial set F is set in a manner that $F_b(x,y)$ defined as $F_b(x,y)=F(x+y)-F(x)-F(y)$ is bilinear for x and y.

(15)

The information processing apparatus according to (13) or (14), wherein the message acquiring unit acquires the messages of N times (where N≥2) through single interactivity wherein the information providing unit randomly selects the first information on the respective messages of N times and provides the prover with the selected first information of N times through single interactivity, wherein the interim information acquiring unit acquires the third information of N times generated by the prover using the first information of N times and the second information of N times obtained when the messages of N times are generated, wherein the pattern information providing unit selects verification patterns on the respective messages of N times, and provides the prover with information on the selected verification patterns of N times through single interactivity, wherein the response acquiring unit acquires the response information of N times corresponding to the selected verification patterns of N times from the prover through single interactivity, and wherein the verifying unit determines that the prover holds the vector s, when verifications on all the messages of N times succeed.

(16)

The information processing apparatus according to (13) or (14), wherein the message acquiring unit acquires a single hash value generated based on the messages of N times (where N≥2), wherein the information providing unit randomly selects the first information on the respective messages of N times and provides the prover with the selected first information of N times through single interactivity, wherein the interim information acquiring unit acquires the third information of N times generated by the prover using the first information of N times and the second information of N times obtained when the messages of N times are generated, wherein the pattern information providing unit selects verification patterns on the respective messages of N times, and provides the prover with information on the selected verification patterns of N times through single interactivity, wherein the response acquiring unit acquires the response information corresponding to the selected verification pattern and a part of messages from the prover, the part of messages not being obtained even when an operation prepared for a verification pattern corresponding to the response information in advance is performed using the public keys, the first information, the third information, and the response information, and wherein the verifying unit verifies whether the prover holds the vector s based on the hash value, the part of messages, the public keys, and the response information, and determines that the prover holds the vector s, when verifications on all the messages of N times succeed.

(17)

An information processing method including:

generating a message based on a multi-order multivariate polynomial set $F=(f_1, \ldots, G)$ defined on a ring K and a vector s that is an element of a set $K^n$;

providing the message to a verifier holding the multi-order multivariate polynomial set F and a vector $y=(y_1, \ldots, y_m)=(f_1(s), \ldots, f_m(s))$; and providing the verifier with response information corresponding to a verification pattern selected by the verifier from among k (where k≥3) verification patterns, wherein the vector s is a secret key, wherein the multi-order multivariate polynomial set F and the vector y are public keys, wherein the message is information obtained by performing an operation prepared for a verification pattern corresponding to the response information in advance using the public keys and the response information, and wherein the multi-order multivariate polynomial set F is generated using information differing according to a user who generates the public keys.

(18)

An information processing method performed by an information processing apparatus that holds a multi-order multivariate polynomial set $F=(f_1, \ldots, f_m)$ defined on a ring K and a vector $y=(y_1, \ldots, y_m)=(f_1(s), \ldots, f_m(s))$, the information processing method including:

acquiring a message generated based on the multi-order multivariate polynomial set F and a vector s that is an element of a set $K^n$;

providing a prover that has provided the message with information on a single verification pattern randomly selected from among k (where k≥3) verification patterns;

acquiring response information corresponding to the selected verification pattern from the prover; and verifying whether the prover holds the vector s based on the message, the multi-order multivariate polynomial set F, the vector y, and the response information, wherein the vector s is a secret key, wherein the multi-order multivariate polynomial set F and the vector y are public keys, wherein the message is information obtained by performing an operation prepared for a verification pattern corresponding to the response information in advance using the public keys and the response information, and wherein the multi-order multivariate polynomial set F is generated using information differing according to a user who generates the public keys.

(19)

An information processing method including:

generating a message based on a multi-order multivariate polynomial set $F=(f_1, \ldots, f_n)$ defined on a ring K and a vector s that is an element of a set $K^n$;

providing the message to a verifier holding the multi-order multivariate polynomial set F and a vector $y=(y_1, \ldots, y_m)=(f_1(s), \ldots, f_m(s))$;

generating third information using first information randomly selected by the verifier and second information obtained when the message is generated;

providing the verifier with the third information; and providing the verifier with response information corresponding to a verification pattern selected by the verifier from among k (where k≥2) verification patterns, wherein the vector s is a secret key, wherein the multi-order multivariate polynomial set F and the vector y are public keys, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys.

(20)

An information processing method performed by an information processing apparatus that holds a multi-order multivariate polynomial set $F=(f_1, \ldots, f_m)$ defined on a ring K and a vector $y=(y_1, \ldots, y_m)=(f_1(s), \ldots, f_m(s))$, the information processing method including:

acquiring a message generated based on the multi-order multivariate polynomial set F and a vector s that is an element of a set $K^n$;

providing a prover that has provided the message with randomly selected first information;

acquiring third information generated by the prover using the first information and second information obtained when the message is generated;

providing the prover with information of a single verification pattern randomly selected from among k (where k≥3) verification patterns;

a response acquiring unit that acquires response information corresponding to the selected verification pattern from the prover; and verifying whether the prover holds the vector s based on the message, the first information, the third information, the multi-order multivariate polynomial set F, and the response information, wherein the vector s is a secret key, wherein the multi-order multivariate polynomial set F and the vector y are public keys, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys.

(21)

The information processing apparatus according to any one of (1) to (16), wherein m and n have a relation of m<n.

(22)

The information processing apparatus according to (21), wherein m and n have a relation of $2^{m-n} \ll 1$.

(23)

An information processing apparatus (signature generating apparatus) including:

a message generating unit that generates a message based on a multi-order multivariate polynomial set $F=(f_1, \ldots, f_m)$ defined on a ring K and a vector s that is an element of a set $K^n$;

a message providing unit that provides the message to a verifier holding the multi-order multivariate polynomial set F and a vector $y=(y_1, \ldots, y_m)=(f_1(s), \ldots, f_m(s))$;

a pattern selecting unit that selects one verification pattern from among k (where k≥3) verification patterns based on a numerical value obtained by inputting a document M and the message to a one-way function;

a response generating unit that generates response information corresponding to the selected verification pattern; and a signature providing unit that provides the verifier with the message and the response information as a signature, wherein the vector s is a secret key, wherein the multi-order multivariate polynomial set F and the vector y are public keys,

67 wherein the message is information obtained by performing an operation prepared for a verification pattern corresponding to the response information in advance using the public keys and the response information, and wherein the multi-order multivariate polynomial set F is generated using information differing according to a user who generates the public keys.

(24)

A program causing a computer to perform:

a message generating function of generating a message based on a multi-order multivariate polynomial set $F=(f_1, \ldots, f_m)$ defined on a ring K and a vector s that is an element of a set $K^n$;

a message providing function of providing the message to a verifier holding the multi-order multivariate polynomial set F and a vector $y=(y_1, \ldots, y_m)=(f_1(s), \ldots, f_m(s))$; and a response providing function of providing response information corresponding to a verification pattern selected by the verifier from among k (where k≥3) verification patterns to the verifier, wherein the vector s is a secret key, wherein the multi-order multivariate polynomial set F and the vector y are a public key, wherein the message is information obtained by performing an operation prepared for a verification pattern corresponding to the response information in advance using the public key and the response information, and wherein the multi-order multivariate polynomial set F is generated using information differing according to a user who generates the public keys.

(25)

A program causing a computer to perform:

an information holding function of holding a multi-order multivariate polynomial set $F=(f_1, \ldots, f_m)$ defined on a ring K and a vector $y=(y_1, \ldots, y_m)=(f_1(s), \ldots, f_m(s))$;

an information acquiring function of acquiring a message generated based on the multi-order multivariate polynomial set F and a vector s that is an element of a set $K^n$;

a pattern information providing function of providing a prover that has provided the message with information of one verification pattern randomly selected from among k (where k≥3) verification patterns;

a response acquiring function of acquiring response information corresponding to the selected verification pattern from the prover; and a verifying function of verifying whether the prover holds the vector s based on the message, the multi-order multivariate polynomial set F, the vector y, and the response information, wherein the vector s is a secret key, wherein the multi-order multivariate polynomial set F and the vector y are a public key, wherein the message is information obtained by performing an operation prepared for a verification pattern corresponding to the response information in advance using the public key and the response information, and wherein the multi-order multivariate polynomial set F is generated using information differing according to a user who generates the public keys.

(27)

A program causing a computer to perform:

a message generating function of generating a message based on a multi-order multivariate polynomial set $F=(f_1, \ldots, f_m)$ defined on a ring K and a vector s that is an element of a set $K^n$;

68 a message providing function of providing the message to a verifier holding the multi-order multivariate polynomial set F and a vector $y=(y_1, \ldots, y_m)=(f_1(s), \ldots, f_m(s))$; and an information generating function of generating third information using first information randomly selected by the verifier and second information obtained when the message is generated;

an interim information providing function of providing the verifier with the third information; and a response providing function of providing response information corresponding to a verification pattern selected by the verifier from among k (where k≥3) verification patterns to the verifier, wherein the vector s is a secret key, wherein the multi-order multivariate polynomial set F and the vector y are a public key, wherein the message is information obtained by performing an operation prepared for a verification pattern corresponding to the response information in advance using the public key, the first information, the third information, and the response information, and wherein the multi-order multivariate polynomial set F is generated using information differing according to a user who generates the public keys.

(28)

A program causing a computer to perform:

an information holding function of holding a multi-order multivariate polynomial set $F=(f_1, \ldots, f_m)$ defined on a ring K and a vector $y=(y_1, \ldots, y_m)=(f_1(s), \ldots, f_m(s))$;

an information acquiring function of acquiring a message generated based on the multi-order multivariate polynomial set F and a vector s that is an element of a set $K^n$;

an information providing unit that provides a prover that has provided the message with randomly selected first information;

an interim information acquiring function of acquiring third information generated by the prover using the first information and second information obtained when the message is generated;

a pattern information providing function of providing the prover with information of a single verification pattern randomly selected from among k (where k≥3) verification patterns;

a response acquiring function of acquiring response information corresponding to the selected verification pattern from the prover; and a verifying function of verifying whether the prover holds the vector s based on the message, the first information, the third information, the multi-order multivariate polynomial set F, and the response information, wherein the vector s is a secret key, wherein the multi-order multivariate polynomial set F and the vector y are a public key, wherein the message is information obtained by performing an operation prepared for a verification pattern corresponding to the response information in advance using the public key, the first information, the third information, and the response information, and wherein the multi-order multivariate polynomial set F is generated using information differing according to a user who generates the public keys.

(29)

A computer readable recording medium recording a program according to any one of (24) to (28) is provided.

(Remarks)

The prover algorithm P is an example of a message generating unit, a message providing unit, a response providing unit, an interim information generating unit, and an interim information providing unit. Further, the verifier algorithm V is an example of an information holding unit, an information acquiring unit, a pattern information providing unit, a response acquiring unit, a verifying unit, and an interim information acquiring unit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

Gen key generation algorithm
P prover algorithm
V verifier algorithm
Sig signature generation algorithm
Ver signature verifying algorithm

The invention claimed is:

1. An information processing apparatus comprising:
circuitry configured to:
generate a message based on (1) a multi-order multivariate polynomial set $F=(f_1, \ldots, f_m)$ defined on a ring K and (2) a vector s that is an element of a set $K^n$;
provide the message to a information processing apparatus holding the multi-order multivariate polynomial set F and a vector $y=(y_1, \ldots, y_m)=(f_1(s), \ldots, f_m$; and
provide the verifier information processing apparatus with response information corresponding to a verification pattern selected by the verifier information processing apparatus from among k (where k≥3) verification patterns,
wherein the vector s is a secret key,
wherein the multi-order multivariate polynomial set F is a public key or a system parameter, and the vector y is a public key,
wherein the message is information obtained by performing an operation prepared for a verification pattern corresponding to the response information in advance using the public keys and the response information,
wherein the multi-order multivariate polynomial set F is generated using information differing according to a user who generates the public keys, the public keys being generated without using secret information, and
wherein the message, the multi-order multivariate polynomial set F, the vector y, and the response information are used in the authentication of the information processing apparatus by the verifier information processing apparatus.

2. The information processing apparatus according to claim 1,
wherein the multi-order multivariate polynomial set F is set in a manner that $F_b(x,y)$ defined as $F_b(x,y)=F(x+y)-F(x)-F(y)$ is bilinear for x and y.

3. The information processing apparatus according to claim 1, wherein the circuitry is further configured to:
generate messages of N times (where N≥2),
provide the verifier information processing apparatus with the messages of N times through single interactivity, and
provide the verifier information processing apparatus with the response information of N times corresponding to verification patterns selected by the verifier information processing apparatus on the respective messages of N times through single interactivity.

4. The information processing apparatus according to claim 1, wherein the circuitry is further configured to:
generate messages of N times (where N≥2) and generate a single hash value based on the messages of N times,
provide the verifier information processing apparatus with the hash value, and
provide the verifier information processing apparatus with the response information of N times corresponding to the verification patterns selected by the verifier information processing apparatus on the respective messages of N times and a part of messages through single interactivity, the part of messages not being obtained even when an operation prepared for a verification pattern corresponding to the response information in advance is performed using the public keys and the response information.

5. An information processing apparatus comprising:
circuitry configured to:
hold (1) a multi-order multivariate polynomial set $F=(f_1, \ldots, f_m)$ defined on a ring K and (2) a vector $y=(y_1, \ldots, y_m)=(f_1(s), \ldots, f_{m(s)})$;
acquire a message generated based on the multi-order multivariate polynomial set F and a vector s that is an element of a set $K^n$;
provide a prover information processing apparatus that has provided the message with information on a single verification pattern randomly selected from among k (where k≥3) verification patterns;
acquire response information corresponding to the selected verification pattern from the prover information processing apparatus; and
verify whether the prover information processing apparatus holds the vector s based on the message, the multi-order multivariate polynomial set F, the vector y, and the response information; and
output an indication as to success or failure of authentication of the prover information processing apparatus based upon whether the prover information processing apparatus holds the vector s,
wherein the vector s is a secret key,
wherein the multi-order multivariate polynomial set F is a public key or a system parameter, and the vector y is a public key,
wherein the message is information obtained by performing an operation prepared for a verification pattern corresponding to the response information in advance using the public keys and the response information, and
wherein the multi-order multivariate polynomial set F is generated using information differing according to a user who generates the public keys, the public keys being generated without using secret information.

6. The information processing apparatus according to claim 5,
wherein the multi-order multivariate polynomial set F is set in a manner that $F_b(x,y)$ defined as $F_b(x,y)=F(x+y)-F(x)-F(y)$ is bilinear for x and y.

7. The information processing apparatus according to claim 5, wherein the circuitry is further configured to:
acquire the messages of N times (where N≥2) through single interactivity,
select verification patterns on the respective messages of N times, and provide the prover information processing apparatus with information on the selected verification patterns of N times through single interactivity, acquire the response information of N times corresponding to the selected verification patterns of N times from the prover information processing apparatus through single interactivity, and determine that the prover information processing apparatus holds the vector s, when verifications on all the messages of N times succeed.

8. The information processing apparatus according to claim 5, wherein the circuitry is further configured to:

acquire a single hash value generated based on the messages of N times (where N≥2), acquire the response information corresponding to the selected verification pattern and a part of messages from the prover information processing apparatus, the part of messages not being obtained even when an operation prepared for a verification pattern corresponding to the response information in advance is performed using, the public keys and the response information from the prover information processing apparatus, and verify whether the prover information processing apparatus holds the vector s based on the hash value, the part of messages, the public keys, and the response information.

9. An information processing apparatus comprising:
circuitry configured to:

generate a message based on (1) a multi-order multivariate polynomial set $F=(f_1, \ldots, f_m)$ defined on a ring K and (2) a vector s that is an element of a set $K^n$;

provide the message to a verifier information processing apparatus holding the multi-order multivariate polynomial set F and a vector $y=(y_1, \ldots, y_m)=(f_1(s), \ldots, f_m(s))$; and generate third information using first information randomly selected by the verifier information processing apparatus and second information obtained when the message is generated;

provide the verifier information processing apparatus with the third information; and provide the verifier information processing apparatus with response information corresponding to a verification pattern selected by the verifier information processing apparatus from among k (where k≥2) verification patterns, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys, the first information, the third information, and the response information, wherein the multi-order multivariate polynomial set F is generated using information differing according to a user who generates the public keys, the public keys being generated without using secret information, and wherein the message, the first information, the third information, the multi-order multivariate polynomial set F, and the response information are used in the authentication of the information processing apparatus by the verifier information processing apparatus.

10. The information processing apparatus according to claim 9, wherein the multi-order multivariate polynomial set F is set in a manner that $F_b(x,y)$ defined as $F_b(x,y)=F(x+y)-F(x)-F(y)$ is bilinear for x and y.

11. The information processing apparatus according to claim 9, wherein the circuitry is further configured to:

generate messages of N times (where N≥2), provide the verifier information processing apparatus with the messages of N times through single interactivity, generate the third information of N times using the first information selected by the verifier information processing apparatus on the respective messages of N times and the second information of N times obtained when the messages are generated, provide the verifier information processing apparatus with the third information of N times through single interactivity, and provide the verifier information processing apparatus with the response information of N times corresponding to the verification patterns selected by the verifier information processing apparatus on the respective messages of N times through single interactivity.

12. The information processing apparatus according to claim 9, wherein the circuitry is further configured to:

generate messages of N times (where N≥2) and generate a single hash value based on the messages of N times, provide the verifier information processing apparatus with the hash value, generate the third information of N times using the first information selected by the verifier information processing apparatus on the respective messages of N times and the second information of N times obtained when the messages are generated, provide the verifier information processing apparatus with the third information of N times through single interactivity, and provide the verifier information processing apparatus with the response information of N times corresponding to the verification patterns selected by the verifier information processing apparatus on the respective messages of N times and a part of messages through single interactivity, the part of messages not being obtained even when an operation prepared for a verification pattern corresponding to the response information in advance is performed using the public keys and the response information.

13. An information processing apparatus comprising:
circuitry configured to:

hold (1) a multi-order multivariate polynomial set $F=(f_1, \ldots, f_m)$ defined on a ring K and (2) a vector $y=(y_1, \ldots, y_m)=(f_1(s), \ldots, f_{m(s)})$;

acquire a message generated based on the multi-order multivariate polynomial set F and a vector s that is an element of a set $K^n$;

provide a prover information processing apparatus that has provided the message with randomly selected first information;

acquire third information generated by the prover information processing apparatus using the first information and second information obtained when the message is generated;

provide the prover information processing apparatus with information on a single verification pattern randomly selected from among k (where k≥3) verification patterns;

acquire response information corresponding to the selected verification pattern from the prover information processing apparatus;

verify whether the prover information processing apparatus holds the vector s based on the message, the first information, the third information, the multi-order multivariate polynomial set F, and the response information; and output an indication as to success or failure of authentication of the prover information processing apparatus based upon whether the prover information processing apparatus holds the vector s, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys, the public keys being generated without using secret information.

14. The information processing apparatus according to claim 13, wherein the multi-order multivariate polynomial set F is set in a manner that $F_b(x,y)$ defined as $F_b(x,y)=F(x+y)-F(x)-F(y)$ is bilinear for x and y.

15. The information processing apparatus according to claim 13, wherein the circuitry is further configured to:

acquire the messages of N times (where N≥2) through single interactivity randomly select the first information on the respective messages of N times and provide the prover information processing apparatus with the selected first information of N times through single interactivity, acquire the third information of N times generated by the prover information processing apparatus using the first information of N times and the second information of N times obtained when the messages of N times are generated, select verification patterns on the respective messages of N times, and provide the prover information processing apparatus with information on the selected verification patterns of N times through single interactivity, acquire the response information of N times corresponding to the selected verification patterns of N times from the prover information processing apparatus through single interactivity, and determine that the prover information processing apparatus holds the vector s, when verifications on all the messages of N times succeed.

16. The information processing apparatus according to claim 13, wherein the circuitry is further configured to:

acquire a single hash value generated based on the messages of N times (where N≥2), randomly select the first information on the respective messages of N times and provides the prover information processing apparatus with the selected first information of N times through single interactivity, acquire the third information of N times generated by the prover information processing apparatus using the first information of N times and the second information of N times obtained when the messages of N times are generated, select verification patterns on the respective messages of N times, and provide the prover information processing apparatus with information on the selected verification patterns of N times through single interactivity, acquire the response information corresponding to the selected verification pattern and a part of messages from the prover information processing apparatus, the part of messages not being obtained even when an operation prepared for a verification pattern corresponding to the response information in advance is performed using the public keys, the first information, the third information, and the response information, and verify whether the prover information processing apparatus holds the vector s based on the hash value, the part of messages, the public keys, and the response information, and determines that the prover information processing apparatus holds the vector s, when verifications on all the messages of N times succeed.

17. An information processing method comprising:

generating, via circuitry of an information processing apparatus, a message based on (1) a multi-order multivariate polynomial set $F=(f_1, \ldots, f_m)$ defined on a ring K and (2) a vector s that is an element of a set $K^n$;

providing, via the circuitry, the message to a verifier information processing apparatus holding the multi-order multivariate polynomial set F and a vector $y=(y_1, \ldots, y_m)=(f_1(s), \ldots, f_m(s))$; and providing, via the circuitry, the verifier information processing apparatus with response information corresponding to a verification pattern selected by the verifier information processing apparatus from among k (where k≥3) verification patterns, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys and the response information, wherein the multi-order multivariate polynomial set F is generated using information differing according to a user who generates the public keys, the public key being generated without using secret information, and wherein the message, the multi-order multivariate polynomial set F, the vector y, and the response information are used in the authentication of the information processing apparatus by the verifier information processing apparatus.

18. An information processing method performed by an information processing apparatus that holds (1) a multi-order multivariate polynomial set $F=(f_1, \ldots, f_m)$ defined on a ring K and (2) a vector $y=(y_1, \ldots, y_m)=(f_1(s), \ldots, f_m(s))$, the information processing method comprising:

acquiring, via circuitry of the information processing apparatus, a message generated based on the multi-order multivariate polynomial set F and a vector s that is an element of a set $K^n$;

providing, via the circuitry, a prover information processing apparatus that has provided the message with information on a single verification pattern randomly selected from among k (where k≥3) verification patterns;

acquiring, via the circuitry, response information corresponding to the selected verification pattern from the prover information processing apparatus;

verifying, via the circuitry, whether the prover information processing apparatus holds the vector s based on the message, the multi-order multivariate polynomial set F, the vector y, and the response information; and outputting, via the circuitry, an indication as to success or failure of authentication of the prover information processing apparatus based upon whether the prover information processing apparatus holds the vector s, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys and the response information, and wherein the multi-order multivariate polynomial set F is generated using information differing according to a user who generates the public keys, the public keys being generated without using secret information.

19. An information processing method comprising:

generating, via circuitry of an information processing apparatus, a message based on a multi-order multivariate polynomial set $F=(f_1, \ldots, f_m)$ defined on a ring K and a vector s that is an element of a set $K^n$;

providing, via the circuitry, the message to a verifier information processing apparatus holding the multi-order multivariate polynomial set F and a vector $y=(y_1, \ldots, y_m)=(f_1(s), \ldots, f_m(s))$;

generating, via the circuitry, third information using first information randomly selected by the verifier information processing apparatus and second information obtained when the message is generated;

providing, via the circuitry, the verifier information processing apparatus with the third information; and providing, via the circuitry, the verifier information processing apparatus with response information corresponding to a verification pattern selected by the verifier information processing apparatus from among k (where k≥2) verification patterns, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys, the first information, the third information, and the response information, wherein the multi-order multivariate polynomial set F is generated using information differing according to a user who generates the public keys, the public keys being generated without using secret information, and wherein the message, the first information, the third information, the multi-order multivariate polynomial set F, and the response information are used in the authentication of the information processing apparatus by the verifier information processing apparatus.

20. An information processing method performed by an information processing apparatus that holds (1) a multi-order multivariate polynomial set $F=(f_1, \ldots, f_m)$ defined on a ring K and (2) a vector $y=(y_1, \ldots, y_m)=(f_1(s), \ldots, f_m(s))$, the information processing method comprising:

acquiring, via circuitry of the information processing apparatus, a message generated based on the multi-order multivariate polynomial set F and a vector s that is an element of a set $K^n$;

providing, via the circuitry, a prover information processing apparatus that has provided the message with randomly selected first information;

acquiring, via the circuitry, third information generated by the prover information processing apparatus using the first information and second information obtained when the message is generated;

providing, via the circuitry, the prover information processing apparatus with information of a single verification pattern randomly selected from among k (where k≥3) verification patterns;

acquiring, via the circuitry, response information corresponding to the selected verification pattern from the prover information processing apparatus;

verifying, via the circuitry, whether the prover information processing apparatus holds the vector s based on the message, the first information, the third information, the multi-order multivariate polynomial set F, and the response information; and outputting, via the circuitry, an indication as to success or failure of authentication of the prover information processing apparatus based upon whether the prover information processing apparatus holds the vector s, wherein the vector s is a secret key, wherein the multi-order multivariate polynomial set F is a public key or a system parameter, and the vector y is a public key, wherein the message is information obtained by performing an operation prepared for a verification pattern corresponding to the response information in advance using the public keys, the first information, the third information, and the response information, and wherein the multi-order multivariate polynomial set F is generated using information differing according to a user who generates the public keys, the public keys being generated without secret information.

* * * * *